US011206467B2

(12) United States Patent
Beshai

(10) Patent No.: US 11,206,467 B2
(45) Date of Patent: Dec. 21, 2021

(54) GLOBAL CONTIGUOUS WEB OF FUSED THREE-STAGE NETWORKS

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 0 days.

(21) Appl. No.: 17/000,336

(22) Filed: Aug. 23, 2020

(65) Prior Publication Data

US 2021/0067850 A1 Mar. 4, 2021

Related U.S. Application Data

(63) Continuation-in-part of application No. 16/559,704, filed on Sep. 4, 2019, now Pat. No. 10,757,488.

(60) Provisional application No. 63/020,297, filed on May 5, 2020.

(51) Int. Cl.
*H04B 10/00* (2013.01)
*H04Q 11/00* (2006.01)
*H04J 14/02* (2006.01)

(52) U.S. Cl.
CPC ...... *H04Q 11/0005* (2013.01); *H04J 14/0228* (2013.01); *H04Q 2011/0016* (2013.01); *H04Q 2011/0058* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,487,177 B1* | 11/2002 | Weston-Dawkes | ..... | H04L 45/04 370/254 |
| 6,567,429 B1* | 5/2003 | DeMartino | ............. | H04J 14/02 370/395.64 |
| 7,016,608 B1* | 3/2006 | Ball | ..................... | H04J 14/0204 398/58 |
| 7,313,094 B2* | 12/2007 | Oki | ......................... | H04L 45/02 370/238 |
| 7,587,516 B2* | 9/2009 | Bhanot | .................... | H04L 45/16 709/238 |
| 7,613,187 B2* | 11/2009 | Choi | .................. | H04Q 11/0067 370/392 |
| 8,107,458 B1* | 1/2012 | Ranganathan | .......... | H04L 41/12 370/351 |
| 8,406,128 B1* | 3/2013 | Brar | ...................... | H04L 45/583 370/229 |

(Continued)

*Primary Examiner* — Agustin Bello

(57) ABSTRACT

Constellations of distributors interconnect access nodes to form a vast contiguous network. The access nodes are generally geographically spread and the constellations are generally geographically spread, however the distributors within each constellation are collocated. The access nodes are arranged into access groups. The access nodes of each access group interconnect through selected constellations, with each access node having a wavelength-division-multiplexed (WDM) link to each of the selected constellations, to form a three-stage network. The three-stage networks corresponding to the access groups are mutually fused so that an access node of any three-stage network has multiple paths, each traversing one distributor, to each other access node of the same three-stage network and a path to each other access node of the entire network traversing one distributor. The distributors are preferable configured as fast optical switches. The network is structured to provide global coverage without the need for conventional cross-connectors.

10 Claims, 58 Drawing Sheets

(56) References Cited

U.S. PATENT DOCUMENTS

| | | | | |
|---|---|---|---|---|
| 8,428,457 B2* | 4/2013 | Mizutani | H04B 10/272 | 398/25 |
| 8,972,603 B1* | 3/2015 | Brandwine | H04L 45/24 | 709/238 |
| 9,407,576 B1* | 8/2016 | Brar | H04L 49/15 | |
| 9,571,421 B1* | 2/2017 | Brar | H04L 49/1515 | |
| 10,412,472 B2* | 9/2019 | Beshai | H04J 14/0204 | |
| 2003/0020982 A1* | 1/2003 | Rychlicki | H04J 14/02 | 398/79 |
| 2003/0156536 A1* | 8/2003 | Oki | H04L 45/24 | 370/229 |
| 2005/0002405 A1* | 1/2005 | Gao | G06F 13/102 | 370/401 |
| 2005/0129400 A1* | 6/2005 | Kim | H04J 14/0227 | 398/67 |
| 2006/0126996 A1* | 6/2006 | Beshai | H04Q 11/0005 | 385/17 |
| 2007/0092252 A1* | 4/2007 | Bouda | H04J 14/0252 | 398/72 |
| 2007/0248009 A1* | 10/2007 | Petersen | H04L 12/66 | 370/230 |
| 2010/0239257 A1* | 9/2010 | Grossman | H04J 14/0239 | 398/68 |
| 2010/0254703 A1* | 10/2010 | Kirkpatrick | H04Q 11/0005 | 398/45 |
| 2011/0087799 A1* | 4/2011 | Padhye | H05K 7/1498 | 709/235 |
| 2011/0228767 A1* | 9/2011 | Singla | H04L 49/00 | 370/389 |
| 2012/0250574 A1* | 10/2012 | Marr | H04L 49/15 | 370/254 |
| 2012/0257616 A1* | 10/2012 | Beshai | H04J 14/0267 | 370/352 |
| 2012/0257636 A1* | 10/2012 | Beshai | H04J 14/0212 | 370/401 |
| 2012/0257637 A1* | 10/2012 | Beshai | H04J 14/0209 | 370/401 |
| 2012/0320753 A1* | 12/2012 | Vasseur | H04L 45/22 | 370/237 |
| 2014/0160939 A1* | 6/2014 | Arad | H04L 45/306 | 370/237 |
| 2014/0369184 A1* | 12/2014 | Keesara | H04L 12/4662 | 370/221 |
| 2015/0236980 A1* | 8/2015 | Brar | H04L 49/1515 | 370/400 |
| 2015/0304046 A1* | 10/2015 | Kramer | H04Q 11/0067 | 398/66 |
| 2018/0287818 A1* | 10/2018 | Goel | H04L 45/62 | |
| 2018/0288505 A1* | 10/2018 | Sindhu | H04J 14/0212 | |
| 2018/0375760 A1* | 12/2018 | Saavedra | H04L 12/4633 | |
| 2019/0014397 A1* | 1/2019 | Beshai | H04J 14/0284 | |
| 2020/0077166 A1* | 3/2020 | Beshai | H04Q 11/0005 | |
| 2021/0067850 A1* | 3/2021 | Beshai | H04Q 11/0005 | |
| 2021/0235173 A1* | 7/2021 | Sindhu | H04Q 11/0005 | |

* cited by examiner

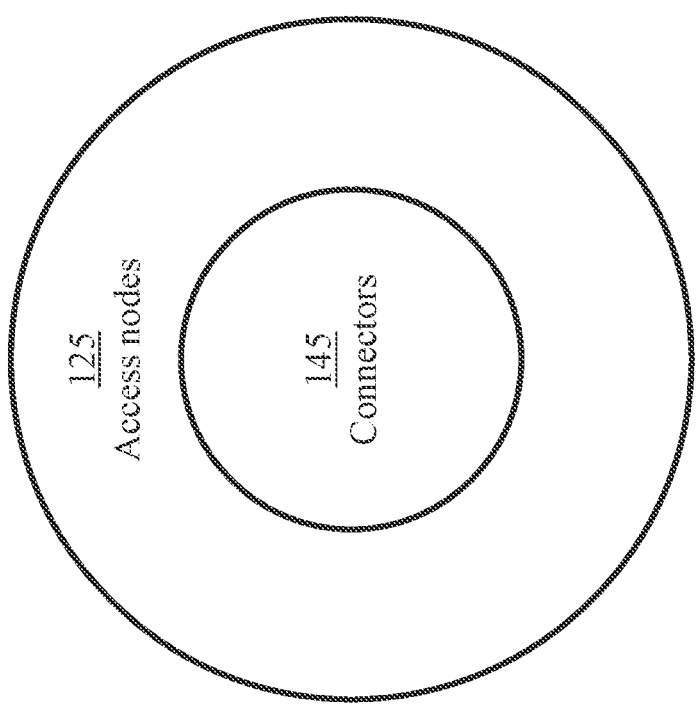
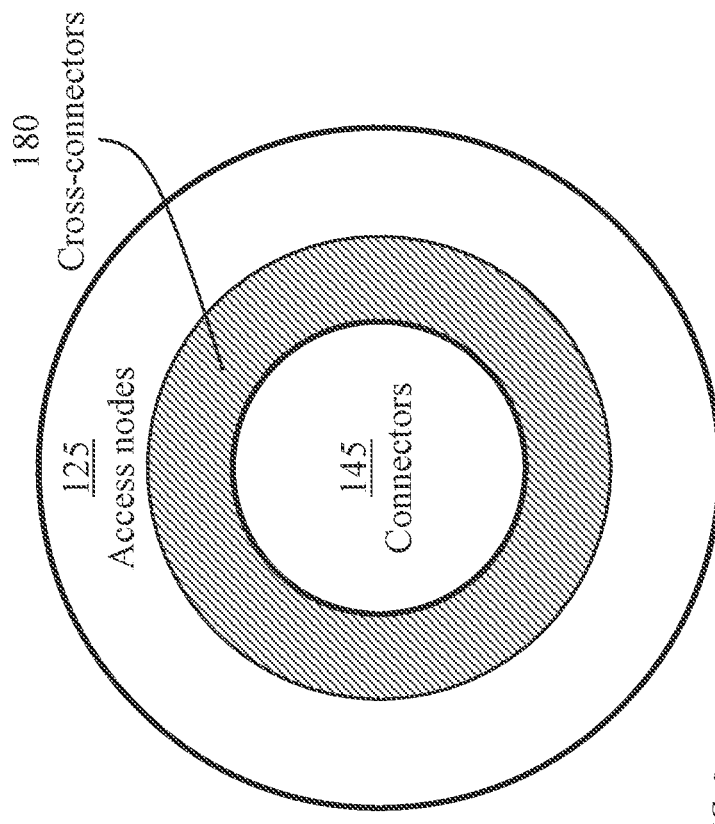
FIG. 2

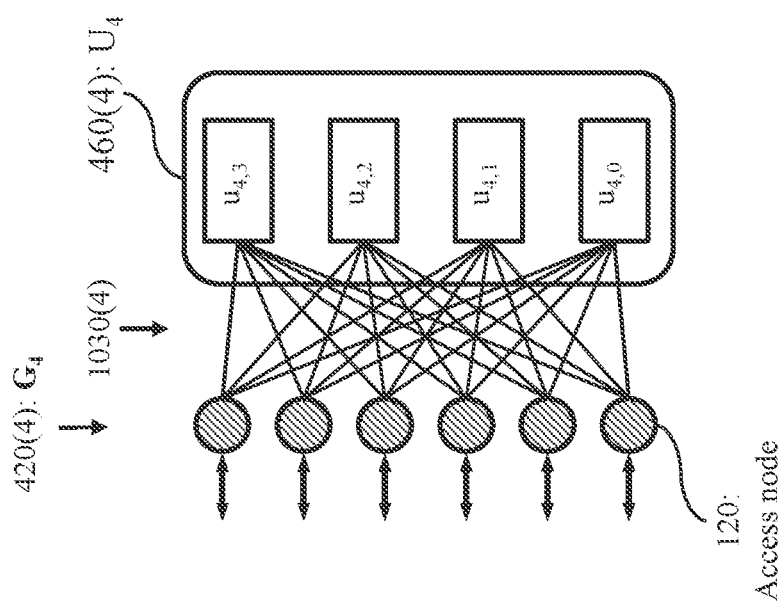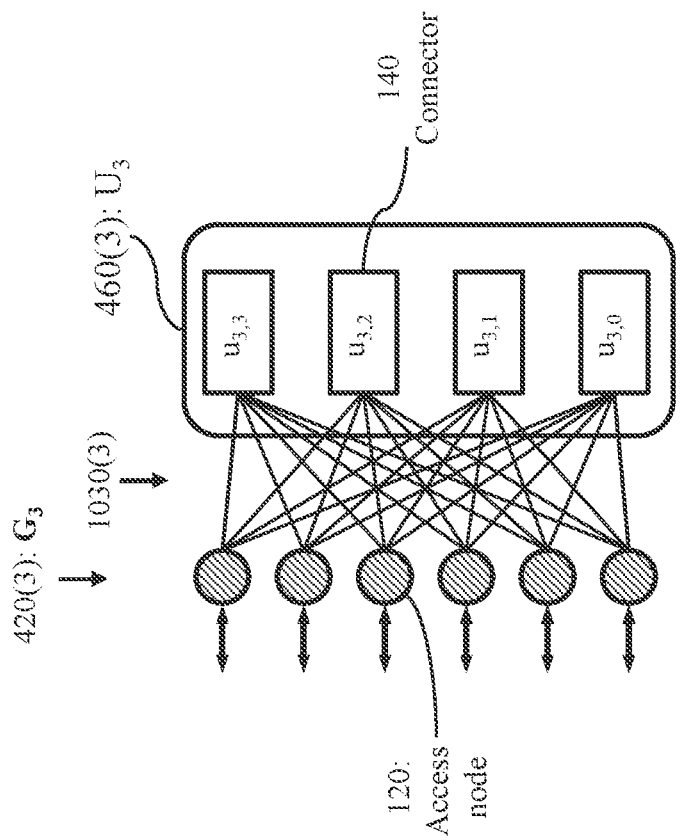
FIG. 11

FIG. 49

GLOBAL CONTIGUOUS WEB OF FUSED THREE-STAGE NETWORKS

CROSS-REFERENCE TO RELATED APPLICATIONS

The present application is a continuation-in-part of U.S. patent application Ser. No. 16/559,704 filed on Sep. 4, 2019, entitled "Fused Three-Stage Networks Forming A Global Contiguous Network", the specification of which is incorporated herein by reference in its entirety, and claims priority to provisional application 63/020,297 filed on May 5, 2020, entitled "Time alignment of access nodes to optical distributors of a global network", the specification of which is incorporated herein by reference in its entirety.

FIELD OF THE INVENTION

The invention is related to global data communication, data centers, cloud computing, and edge computing. In particular, the invention is concerned with efficient distribution of payload data and control data in a network having a large number of access nodes interconnected through distributors which may be optical-based or electronic-based.

BACKGROUND

A major challenge in the art of telecommunication-network design is the enablement of graceful network growth while maintaining structural simplicity, ease of control, and high performance. There is a need to explore methods and apparatus for meeting the challenge.

SUMMARY

In accordance with an aspect, the invention provides a contiguous network of a plurality of access nodes interconnected through a set of constellations of distributors of a plurality of distributors. The access nodes are arranged into a plurality of access groups with each access group comprising a respective set of access nodes. The plurality of access groups is arranged into a plurality of access bands with each access band comprising a predetermined number of access groups.

The set of constellations comprises a set of intra-band constellations and a set of inter-band constellations. An intra-band constellation is established for each access band of the plurality of access bands to interconnect each pair of access groups of the each access band through a distributor. An inter-band constellation is established for each pair of access bands of the plurality of access bands to interconnect each pair of access groups of different access bands of the each pair of access bands through a distributor; Each access node connects directly to each constellation that is established to connect to an access band to which the each access node belongs through a respective dual multichannel link each channel of which connecting to a respective distributor.

Thus, each access node of each access group has multiple paths, each traversing a single distributor, to each access node of the each access group and a path traversing a single distributor to each access node of each other access group.

The set of access nodes of an access group comprises a number of access nodes not exceeding a target upper bound $m$, $m>1$. Thus, each distributor of the plurality of distributors is configured to scale to interconnect at least $2 \times m$ access nodes.

The plurality of access bands comprises a specified number, $\Pi$, of access bands, $\Pi>1$. The predetermined number of access groups per access band, denoted $\Omega$, is determined as $\Omega \geq \lceil \mu/\Pi \rceil$, $\mu$ being a target number of access groups of the plurality of access groups, $\mu \geq (2 \times \Pi)$.

The set of intra-band constellations comprises $\Pi$ intra-band constellations. The set of inter-band constellations comprises $(\Pi \times (\Pi-1))/2$ inter-band constellations.

The access bands are indexed sequentially as 0 to $(\Pi-1)$. An intra-band constellation established for an access band of index $\alpha$, is denoted $Q(\alpha, \alpha)$, $0 \leq \alpha \leq \Pi$. An inter-band constellation established for a pair of access bands of indices $\alpha$ and $\beta$ is denoted $Q(\alpha, \beta)$, $0 \leq \alpha < (\Pi-1)$, $\alpha < \beta < \Pi$. An access node belonging to access-band $\gamma$, $0 \leq \gamma < \Pi$, has:

a dual multichannel link to intra-band constellation $Q(\gamma, \gamma)$; and a dual multichannel link to each of inter-band constellations:

$Q(j, \gamma)$, $0 \leq j < \gamma$, for $\gamma > 0$, and $Q(\gamma, k)$, $\gamma < k < \Pi$, for $\gamma < (\Pi-1)$.

Each distributor of the plurality of distributors comprises a distributing mechanism and a distributor controller employing a hardware processor configured to schedule paths through the distributing mechanism and exchange control data with all subtending access nodes coupled to the distributing mechanism. The distributor controller is coupled to a collocated distributor-time indicator and is configured to:

communicate downstream time indications determined according to the collocated distributor-time indicator to a selected access node connecting to the distributing mechanism;

receive upstream time indications from the selected access node determined according to an access-time indicator collocated with the selected access node; and instruct the selected access node to adjust timing of upstream data transmission based on discrepancy between the downstream time indications and the upstream time indications.

The plurality of access groups may include vacant access groups reserved for future network expansion. Thus, at least one access band may comprise less than the predetermined number of access groups. Each dual multichannel link to a specific intra-band constellation carries a number of spectral channels equal to a number of present access groups of the specific intra-band constellation minus one. Each dual multichannel link from an access node belonging to either of two access bands connecting to a specific inter-band constellation carries a number of spectral channels equal to a number of present access groups of the other access band.

In accordance with another aspect, the invention provides a contiguous network of a plurality of access groups and a plurality of distributors. Each access group comprises a respective set of access nodes of a plurality of access nodes. The plurality of access groups is arranged into a first number $\Pi$ of access bands, each access band comprising a second number $\Omega$ of access groups, $\Pi>1$, $\Omega>1$.

The plurality of distributors is arranged into a number of intra-band constellations and a number of inter-band constellations. Each pair of access groups within each access band connects to a respective distributor of an intra-band constellation corresponding to the each access band. Each pair of access groups belonging to different access bands of each pair of access bands connects to a respective distributor of an inter-band constellation corresponding to the each pair of access bands;

Each access node has a multichannel link of (Ω−1) dual channels to a respective intra-band constellation and a multichannel links of Ω dual channels to each of respective (Π−1) inter-band constellations.

In accordance with a further aspect. The invention provides a contiguous network comprising a plurality of access nodes arranged into a plurality of access groups clustered into access bands and a plurality of distributors, each distributor connecting to all access nodes of a respective pair of access groups of the plurality of access groups. Each access group comprises a respective number of access nodes and each access band comprises a predetermined number of access groups.

The plurality of distributors are clustered into constellations such that all distributors connecting to access groups of each access band are collocated to form a respective intra-band constellation corresponding to the each access band and all distributors connecting to access groups of each pair of access bands are collocated to form an inter-band constellation corresponding to the each pair of access bands.

Each access node of each access group has a direct dual multichannel link to each constellation formed to contain at least one distributor connecting to the each access group. Thus, each access node of any access group has multiple paths, each traversing a single distributor, to each access node of the access group and a path traversing a single distributor to each access node of each other access group.

BRIEF DESCRIPTION OF THE DRAWINGS

Features and implementations will be further described with reference to the accompanying exemplary drawings, in which:

FIG. 2 is a schematic of a first network configuration where signals from a plurality of access nodes are transferred to a plurality of connectors through a layer of cross-connectors, and a second network configuration where signals are transferred from the plurality of access nodes to the plurality of connectors without use of intermediate cross-connectors;

FIG. 5 illustrates an example of spatially interleaved access groups;

FIG. 11 illustrates internal connectivity of remaining three-stage networks of the plurality of independent three-stage networks;

FIG. 49 details two paths traversing a first distributor pair of the set of alternate paths of FIG. 48;

TERMINOLOGY

Figure 1:
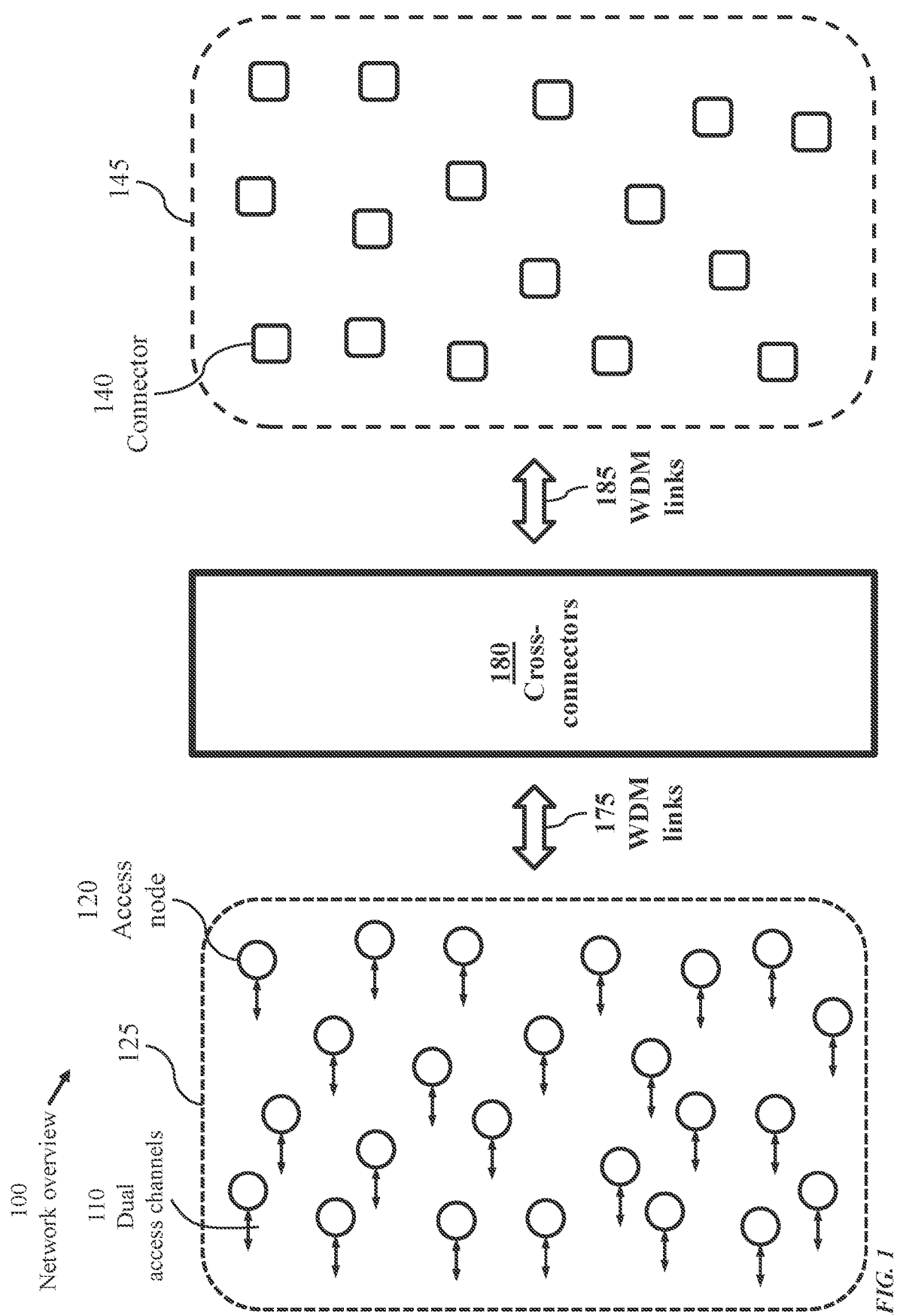
FIG. 1 illustrates a network of a plurality of access nodes exchanging signals through a plurality of connectors and a plurality of cross-connectors.

Terms used in the present specification are defined below.
Monitoring period: The time domain is organised into monitoring periods, each monitoring period comprising a predefined number of time slots. During each monitoring period, each input port of a distributor has access to a controller of the distributor during a respective reserved time slot for periodic verification of signal temporal alignment.
Scheduling period: A scheduling period comprises an integer multiple of monitoring periods.
Allocating a flow rate for a data stream may be based on allocating a number of time slots per scheduling period.
Control segment versus content segment: A data stream is preferably organized into segments including control segments and content segments. Each segment is transferred during a single time slot. A control segment is directed to a controller of a distributor while a content segment is directed to an output port of a distributor. The segments of a data stream are preferably indexed sequentially so that segments of a data stream transferred during a scheduling period of N time slots are indexed as sequentially as 0, 1, . . . , (N−1).
Access node: A switching device connecting to data sources and data sinks, and configured to transfer data from the data sources to another switching device and transfer data from another switching device to the data sinks is referenced as an access node or an edge node.
Access group: An access group comprises a number of access nodes that connect to each distributor of a respective set of distributors. The number of access nodes per access group may vary from one access group to another. In order to simplify addressing of access nodes in a growing network, the number of access nodes per access group is limited to a predefined upper bound.
Access band: The accesses nodes of the entire network are arranged into access groups. The access groups are arranged into a plurality of access bands, each access band comprising a predetermined number of access groups.
Switch: A switch comprises a switching mechanism for transferring data from a set of input ports to a set of output ports. In the switching system of the present application, a switch transfers data from one set of access nodes connecting to input ports of the switch to another set, or the same set, of access nodes connecting to output ports of the switch. A switch may use an electronic or a photonic switching mechanism.

Distributor: A device comprising a plurality of input ports and a plurality of output ports where any input port may transfer data to any output port is herein referenced as a distributor. The transfer of data may be selective or cyclic. A distributor configured to transfer data from any input port to selected output port is conventionally called a "switch, as defined above. A distributor configured to cyclically transfer data from each input port to each output port is conventionally called a "rotator". Thus, the term "distributor" refers to either a switch or a rotator. Certain architectural aspects of the contiguous network of the present invention are independent of the type of distributor.

Constellation of distributors: A number of distributors may be spatially collocated to enable direct communication with access nodes through wavelength-division-multiplexed (WDM) links avoiding the need for intermediate spectral routers.

Contiguous network: A network supporting access nodes interconnected through distributors in which any access node may transfer data to any other access node through a path traversing only one distributor is herein referenced as a "contiguous network).

Global network: A network comprising a large number of nodes covering a wide geographical area is traditionally referenced as a global network.

Content port: A content port is a distributor port connecting to an access node. A dual content port comprises an input content port configured to receive content data (payload data) as well as control data from an access node and an output content port configured to transmit content data as well as control data to an access node.

Control port: A control port is a dual port, having an input side and an output side, configured to receive control data from a distributor controller and transmit control data to the distributor controller.

Connector: The term "connector" is used herein to refer to a distributor which connects to one access group.

Spectral band: The term refers to a frequency band (bandwidth) occupied by a signal in a transmission medium, such as a fiber-optic link.

Dual channel: A dual channel comprises a channel from a first device to a second device and a channel from the second device to the first device. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Multichannel link: The term refers to a transmission link comprising multiple channels—a wavelength-division-multiplexed link (WDM link) carrying multiple spectral bands is a multichannel link.

Dual multichannel link: The term refers to a transmission link comprising multiple dual channels where a dual channel comprises two channels of opposite transmission directions. A dual multichannel link may comprise two physical links of opposite transmission directions.

Dimension of a distributor: The number of input ports and output ports, excluding ports used exclusively for control purposes, defines a "dimension" of a switch. The input ports and output ports of a switch handle payload data (content data) while a control inlet or a control outlet of a switch handle control data relevant to scheduling and timing.

Collocation: The term refers to spatial proximity of devices which may be interconnected using relatively short links, such as fiber links each carrying a single spectral band. In some implementations, the lengths of the (short) links may be selected to equalize propagation delays.

Spectral multiplexer: A spectral multiplexer combines spectral bands of separate input channels onto an output wavelength-division-multiplexed link (WDM link).

Spectral demultiplexer: A spectral demultiplexer directs individual spectral bands of an input WDM link to separate output channels.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "access controller", "switch controller", or "global controller" is a hardware entity.

Software instructions: The term refers to processor-executable instructions which may be applied to cause a processor to perform specific functions.

Configuring a controller or a processor: The term refers to an action of installing appropriate software for a specific function.

Spectral router: A spectral router (also called "wavelength router") is a passive device connecting a number of input WDM links to a number of output WDM links where each output WDM link carries a spectral band from each input WDM link.

$\lfloor r \rfloor$: $\lfloor r \rfloor$ denotes the nearest integer lower than or equal to a real number "r"; $\lfloor q \rfloor = q$, if "q" is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

$\lceil r \rceil$: $\lceil r \rceil$ denotes the nearest integer higher than or equal to a real number "r"; $\lceil q \rceil = q$, if "q" is an integer Modulo operation: The operation J modulo K, herein denoted $J_{modulo\ K}$, where J is any integer and K is a positive integer is a remainder determined as:

$$J_{modulo\ K} = J - K \times \lfloor J/K \rfloor, \text{Thus}, 7_{modulo\ 8} = 7,$$
$$(-7)_{modulo\ 8} = \{-7 - (-1) \times 8\} = 1, 8_{modulo\ 8} = 0,$$
$$(-8)_{modulo\ 8} = 0, 9_{modulo\ 8} = 1, \text{and } (-9)_{modulo\ 8} = 7.$$

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

A reference numeral may individually or collectively refer to items of a same type. A reference numeral may further be indexed to distinguish individual items of a same type.

REFERENCE NUMERALS

A reference numeral may individually or collectively refer to items of a same type. A reference numeral may further be indexed to distinguish individual items of a same type.

100: Overview of a network
110: Dual access channels
120: Access node
125: Plurality of access nodes
140: Connector (switch, rotator, or core router)
145: Plurality of connectors
175: Dual Wavelength-Division-Multiplexed (WDM) links between access nodes and cross connectors
180: Plurality of cross-connectors
185: Dual WDM links between cross-connectors and connectors
200: Overview of alternate network configurations
210: Schematic of a network employing cross-connectors
250: Schematic of a network configured to avoid use of cross-connectors
350: Dual WDM links between access nodes and connectors
400: Grouping access nodes into access groups and connectors into connector groups
420: Access group of access nodes
460: Connector group
500: Spatially interleaved access groups
600: Independent three-stage networks each comprising an access group and a respective connector group
630: Dual WDM link connecting an access group and a respective connector group to form a three-stage network
700: Fused three-stage networks
740: Distributor combining two connectors of different connector groups
750: Distributor group
760: Dual WDM link connecting an access group and a respective distributor group to form a fused three-stage network
800: Globally distributed access nodes
900: Globally spread distributors
1000: Internal connectivity of independent three-stage networks
1030: Dual channels connecting access nodes to respective connectors
1100: Connectivity of independent three-stage networks (continued)
1200: Arrangement of fused connectors of different connector groups to form distributors
1220: Distributor index
1300: Fused connectors according to the arrangement of FIG. 12
1400: Connectors' association with distributors
1430: Dual channels connecting access nodes of an access group to distributors of a corresponding distributor group
1500: Mutually fused three-stage networks (continued)
1600: A set of distributors resulting from fusing twelve independent three-stage networks
1700: Plurality of access groups to be logically arranged into access bands
1800: Formation of access bands and respective connector bands
1820: Access band
1840: Connector band
1900: Formation of an intra-band constellation and an inter-band constellation
1920: Intra-band constellation of fused connector groups
1925: Pairwise fusion of connectors within an intra-band constellation
1940: Inter-band constellation of fused connector groups
1945: Pairwise fusion of connectors within an inter-band constellation 2000: Exemplary arrangement of a plurality of connectors into complementing intra-band and inter-band constellations
2100: Form of an intra-band constellation and an inter-band constellation
2120: Intra-band constellation of distributors interconnecting access groups of an access band
2140: Inter-band constellation of distributors connecting access groups of an access band to access groups of another access band
2200: Complementing intra-band and inter-band constellations
2300: Detailed intra-band constellations
2400: Detailed inter-band constellation
2500: Arrangement of distributors of a global network into spatially distributed constellations
2600: Exemplary constellations of a large-scale network
2700: Connectivity of an access band to respective constellations
2720: Dual WDM link carrying multiple spectral bands to and from a respective intra-band constellation
2740: Multiple dual WDM links each carrying multiple spectral bands to and from a respective inter-band constellation
2800: Global network connectivity
2900: Access-group connectivity to respective constellations
3000: Geographically distributed constellations of collocated distributors
3025: A single constellation (intra-band or inter-band)
3100: First access node 120A connectivity to a first set of constellations
3120: Constellation to which first access-node 120A connects
3125: Constellation not connecting to first access-node 120A
3200: Second access-node 120B connectivity to a second set of constellations, the first set and second set intersection in a common constellation
3220: Constellation to which second access-node 120B connects
3225: Constellation not connecting to second access-node 120B
3300: Internal connectivity of inter-band constellation
3310: Dual WDM link from an access node of a first access band
3312: Spectral demultiplexer connecting to dual WDM link 3310
3314: Spectral multiplexer connecting to dual WDM link 3310
3316: Dual channels of dual WDM link 3310
3320: Dual WDM link from an access node of a second access band
3322: Spectral demultiplexer connecting to dual WDM link 3320
3324: Spectral multiplexer connecting to dual WDM link 3320
3326: Dual channels of dual WDM link 3320
3340: Access group connecting to first set of distributors
3350: Access group connecting to a second set of distributors
3360: Access group connecting to a third set of distributors
3370: Access group connecting to a fourth set of distributors intersecting said first, second, and third sets of distributors
3380: Access group connecting to a fifth set of distributors intersecting said first, second, and third sets of distributors
3390: Access group connecting to a sixth set of distributors intersecting said first, second, and third sets of distributors 3400: Internal connectivity of intra-band constellation
3410: Dual WDM link from an access node of a respective access group
3412: Spectral demultiplexer connecting to dual WDM link 3410
3414: Spectral multiplexer connecting to dual WDM link 3410
3416: Dual channels of dual WDM link 3410
3440: Access group connecting to dual WDM links from a first access group connecting to an intra-band constellation
3450: Access group connecting to dual WDM links from a middle access group connecting to the intra-band constellation
3460: Access group connecting to dual WDM links from a last access group connecting to the intra-band constellation
3500: Formation of constellations of distributors—example 1
3600: Formation of constellations of distributors—example 2
3700: Internal connectivity of a specific inter-band constellation
3761: Index of an access group connecting to a specific distributor
3762: Index of another access group connecting to the specific distributor
3800: Access-group connectivity to a first set of distributors of an inter-band constellation
3810: Dual WDM links from access nodes of an access group connecting to a column of distributors of the inter-band constellation
3840: Dual channels, one from/to each access node of an access group
3900: Access-group connectivity to a second set of distributors of the inter-band constellation
3910: Dual WDM links from access nodes of an access group connecting to the second set of distributors of the inter-band constellation
3940: Dual channels, one from/to each access node of an access group
4000: Internal connectivity of a specific intra-band constellation
4100: Internal connectivity of a large inter-band constellation
4200: Connectivity of an access group to relevant constellations
4250: A specific access group
4260: A WDM link from an access node of access group 4250
4280: Spectral demultiplexer
4290: Spectral multiplexer-demultiplexer
4300: Connectivity of a first access node to a second access node of the same access group and connectivity of the first access node to a third access node of a different access group
4310: A first three-stage network
4320: A second three-stage network
4400: A set of alternate paths within a constellation for a specific pair of access nodes
4412: A set of distributors within constellation 2140
4420: A channel from originating access node to a specific distributor connecting to destination access node
4430: An internal path through the specific distributor connecting the originating access node to the destination access node
4435: Internal paths through the specific distributor
4440: Internal paths through an intermediate distributor connecting to destination access node
4470: Channel from the specific distributor to the destination access node
4480: Channel from an intermediate distributor to destination access node
4500: A path of set 4400
4510: Dual port of the specific distributor connecting the originating access node to the destination access node
4520: Intermediate dual port of the specific distributor
4540: A channel from dual port 4510 to the intermediate dual port of the specific distributor
4550: Path from the specific distributor to an intermediate distributor through an intermediate access node
4552: Dual port of destination access node connecting to the specific distributor
4560: Dual port of the intermediate distributor
4568: Dual port of the intermediate distributor connecting to the destination access node
4570: Dual port of the specific distributor connecting to the destination access node
4572: Dual port of destination access node connecting to the intermediate distributor
4580: A dual channel between dual port 4552 and dual port 4570
4590: A dual channel between dual port 4572 and dual port 4568
4595: dual channel from destination access node to a destination device
4600: Another set of alternate paths within a constellation for a specific pair of access nodes
4612: A set of distributors within constellation 4410
4620: A channel from originating access node to a distributor connecting to destination access node
4630: Internal paths through an intermediate distributor
4640: Internal paths through a specific distributor connecting to destination access node
4700: Two paths of set 4600
4702: Dual channel from a device
4705: A dual channel between a dual port of originating access node and a dual port of a specific distributor D(1,9) connecting to destination access node
4708: Dual port of originating access node connecting to distributor D(1,8) starting a first alternate path
4709: Dual port of originating access node connecting to distributor D(1,11) starting a second alternate path
4710: Dual channel from dual port 4708 to a dual port of distributor D:1,8
4720: Dual channel from dual port 4709 to a dual port of distributor D:1,11
4750: Dual port of specific distributor D(1,9)
4760: Internal path through the specific distributor D(1,9)
4800: A set of alternate paths traversing two constellations for a specific pair of access nodes
4830: Internal paths through a distributor connecting to originating access node
4840: Internal paths through a distributor connecting to destination access node
4900: Two paths of set 4800 through a first distributor
4940: Dual port of the first distributor connecting to originating access node
4942: an intermediate dual port of the first distributor
4943: an alternate intermediate dual port of the first distributor
4950: a path through an intermediate access node from dual port 4942 to a second distributor connecting to destination access node 4951: a path through an intermediate access node from dual port 4943 to the second distributor
4960: dual port of the second distributor connecting to destination access node
5000: Two paths of set 4800 through a third distributor
5040: Dual port of the third distributor connecting to originating access node
5042: an intermediate dual port of the third distributor
5043: an alternate intermediate dual port of the third distributor
5050: a path through an intermediate access node from dual port 5042 to a fourth distributor connecting to destination access node
5051: a path through an intermediate access node from dual port 5043 to the fourth distributor
5060: dual port of the fourth distributor connecting to destination access node
5100: A first configuration of an optical distributor
5110: A set of upstream channels from access nodes of a first access group
5112: A set of upstream channels from access nodes of a second access group
5114: Optical splitter
5120: Optical-electrical convertor
5122: Unit for detecting origination-time indicator and inserting receipt time according to local time indication
5124: Control-data buffer (short buffer)
5130: Distributing mechanism
5131: Input port of distributing mechanism 5130
5132: Output port of distributing mechanism 5130
5135: Steering mechanism
5140: Distributor controller
5145: Time indicator
5150: Electrical-to-optical convertor
5160: Temporal demultiplexer
5170: Optical combiner
5190: A set of downstream channels directed to the access nodes of the first access group
5192: A set of downstream channels directed to the access nodes of the second access group
5210: Input-port index
5220: Monitoring period
5230: Control time slot
5240: Content time slot
5400: A second configuration of a distributor
5420: Temporal multiplexer
5425: Optical-electrical convertor
5440: Distributor controller
5500: A third configuration of a distributor
5530: Distributing mechanism
5531: Input port connecting to an input channel
5532: Output port connecting to an output channel
5533: Input port connecting to output of distributor controller 5540
5534: Output port connecting to input of distributor controller 5540
5540: Distributor controller
5550: Optical-electrical convertor
5552: Electrical-optical convertor
5600: Temporal-misalignment of upstream signals
5610: Designated organization of monitoring period 5220 for upstream signals originating from a specific access node connecting to input port of index 2 of distributing mechanism 5130 or 5530
5620: Organization of signal stream received from the specific access node
5630: Designated control time slot for the input port of index 2
5632: Misaligned control time slot
5640: Detected start time of a control time slot within a monitoring period
5660: Detected segment index during designated control time slot 5630
5700: A first configuration of an electronic distributor
5720: Optical-to-electrical convertor
5724: 1:2 fan-out unit
5726: Temporal multiplexer
5728: Input buffers
5730: Electronic distributing mechanism
5731: Input ports
5732: Output ports
5735: Steering controller
5740: Distributor controller
5770: Temporal demultiplexer
5780: 2:1 temporal multiplexer
5785: Electrical-to-optical convertor
5800: A second configuration of a distributor
5828: Input buffer
5830: Electronic distributing mechanism
5831: Input port
5832: Output port
5833: Input port connecting to output of distributor controller 5840
5834: Output port connecting to input of distributor controller 5840
5835: Steering controller
5840: Distributor controller

DETAILED DESCRIPTION

FIG. 1 illustrates a network 100 comprising a plurality 125 of access nodes 120 exchanging signals through a plurality 145 of connectors 140. Channels from each of the access nodes are routed to respective connectors 140 through respective cross-connectors of a plurality 180 of dual cross connectors. A connector 140 may be configured as a switch, a rotator, or a core router. A cross-connector switches entire spectral channels (spectral bands). The cross connectors are preferably optical spectral routers. Each access node 120 connects to at least one cross-connector through dual wavelength-division-multiplexed (WDM) links. Each connector 140 connects to at least one cross-connector through dual WDM links. The dual WDM links between the plurality 125 of access nodes and the plurality 180 of dual cross-connectors are collectively referenced as 175. The dual WDM links connecting the plurality 180 of dual cross-connectors to the plurality 145 of connectors are collectively referenced as 185.

An access node 120 may connect to respective data sources and data sinks through at least one dual access channel 110. However, an access node may not support external data sources or sink and may be used only for enabling internal paths through network 100. Optionally, an access node may support a global network controller (not illustrated).

FIG. 2 is a schematic 200 of alternate network configurations. A first network configuration 210 employs the plurality 180 of cross-connectors of FIG. 1. Signals between the plurality 125 of access nodes and the plurality 145 of connectors are transferred through the dual cross-connectors. A second network configuration 250 avoids use of any intermediate channel-switching stage (cross-connector stage) so that signals between the plurality of access nodes and the plurality of connectors are transferred without undergoing intermediate switching. FIGS. 18 to 29 illustrate a network organization, according to the present invention, which eliminates the need for cross-connectors.

Figure 3:
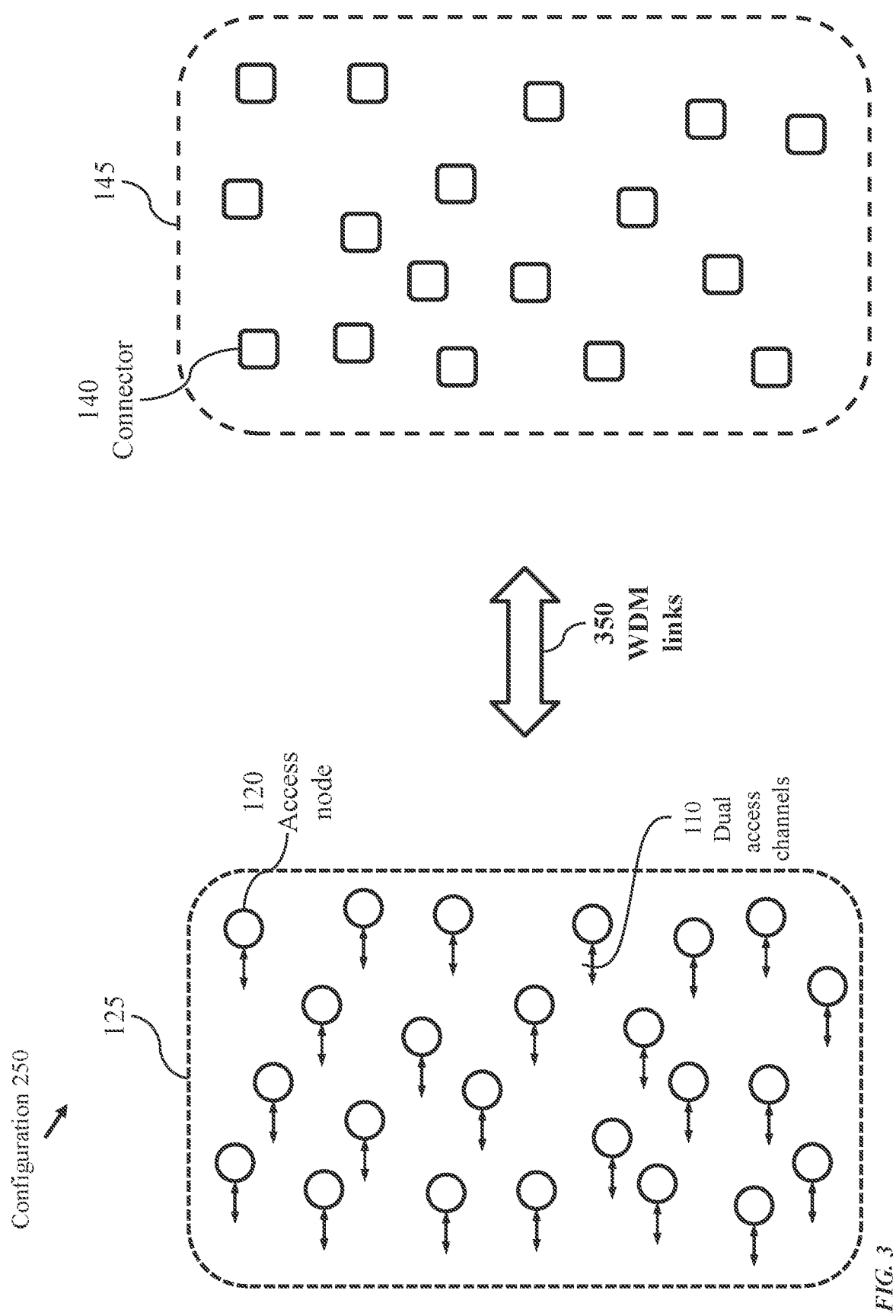
FIG. 3 further illustrates the second network configuration of FIG. 2.

FIG. 3 further illustrates the second network configuration 250. The plurality 125 of access nodes connects to the plurality of connectors through dual WDM links, collectively referenced as 350.

Figure 4:
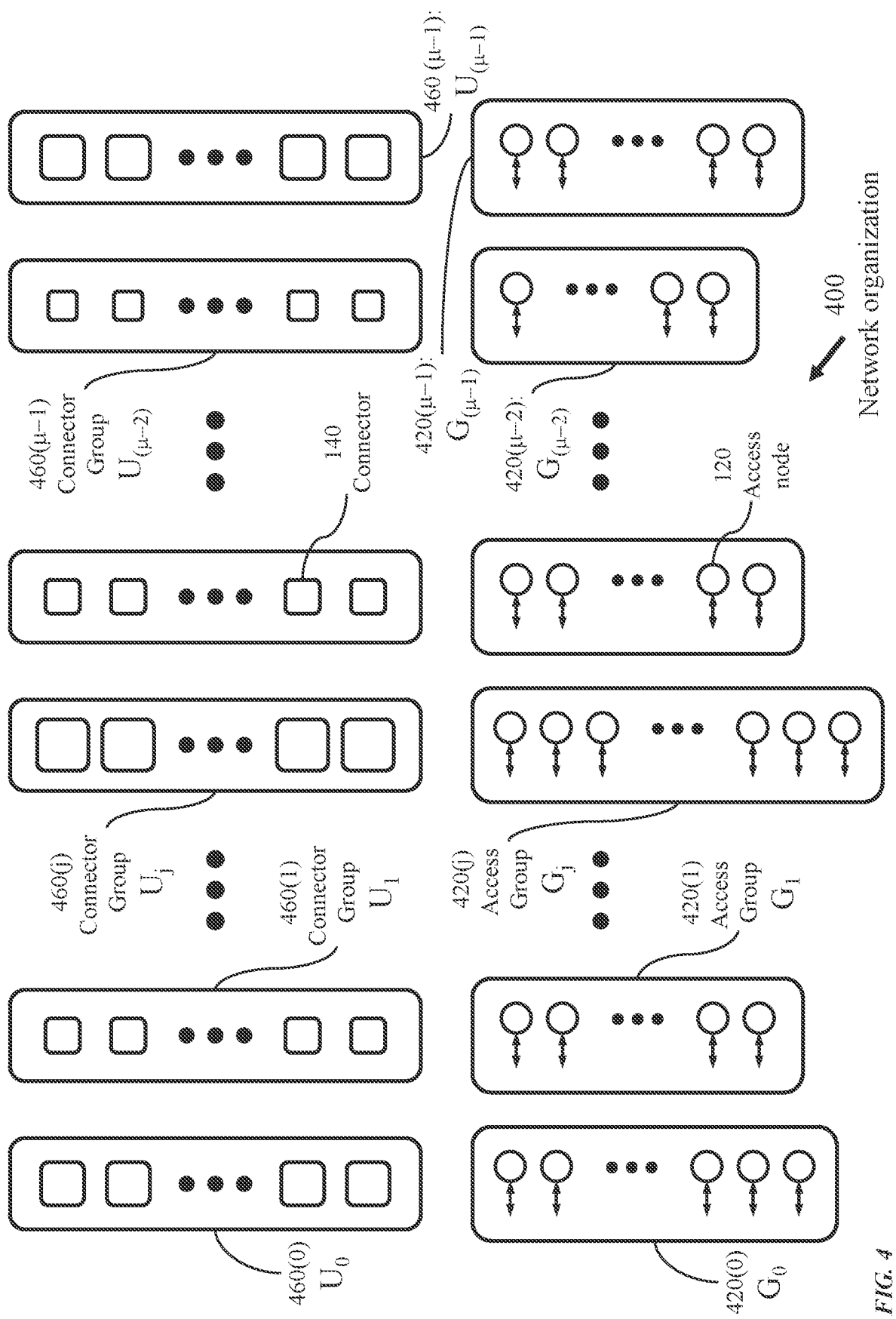
FIG. 4 illustrates a discipline of organizing the plurality of access nodes into access groups and organizing the plurality of connectors into connector groups in accordance with an embodiment of the present invention.
Figure 3:
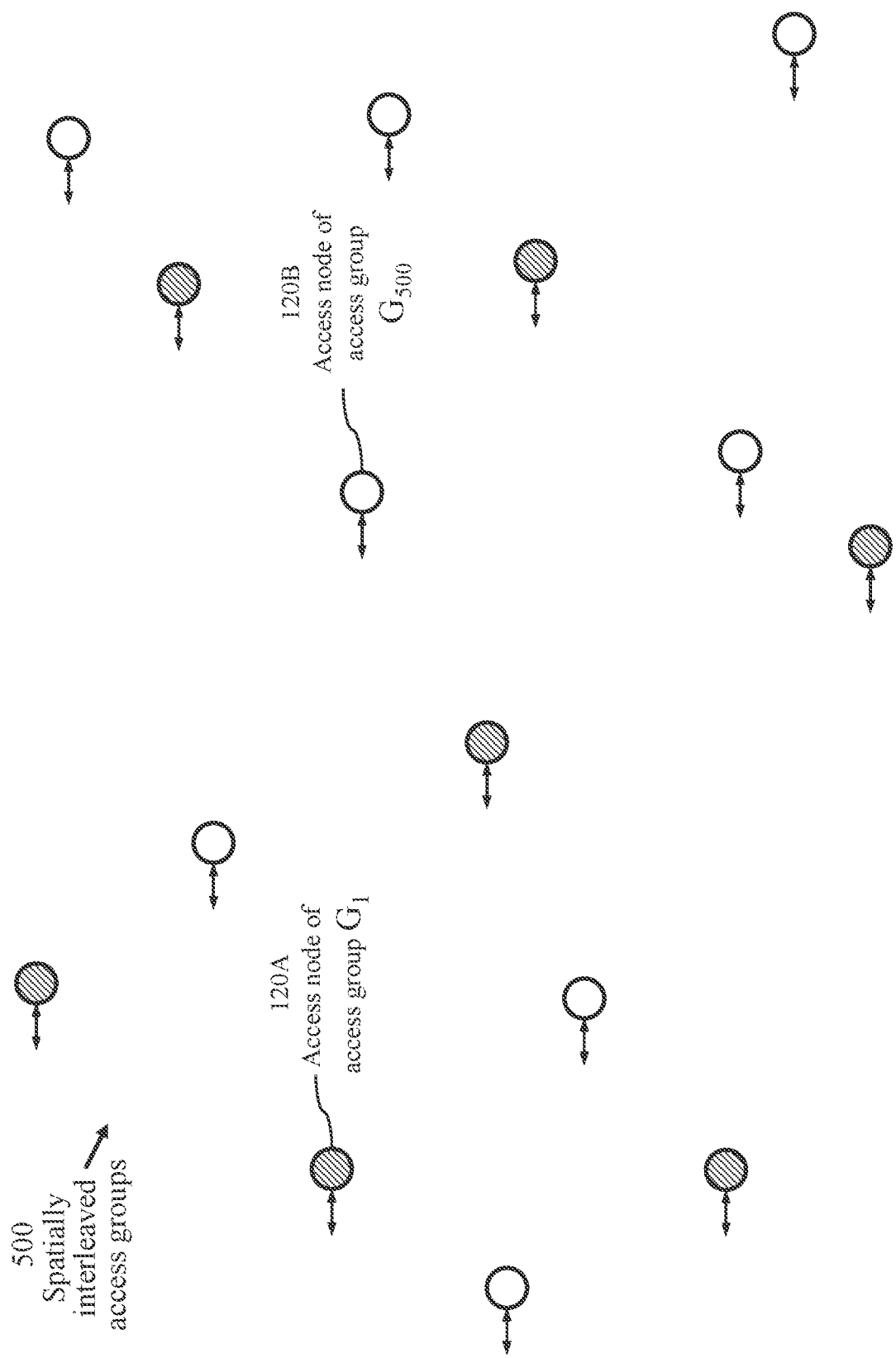

FIG. 4 illustrates an arrangement 400 of the plurality 125 of access nodes into a number, $\mu$, of access groups 420 and the plurality 145 of connectors into $\mu$ connector groups 460, $\mu>1$. The access groups 420 are individually labeled as $G_0$, $G_1, \ldots, G_{\mu-1}$. A connector group 460 comprises ($\mu-1$) connectors 140. The $\mu$ connector groups 460 are individually labeled as $U_0, U_1, \ldots, U_{\mu-1}$. Each access group 420 connects to a respective connector group 460, with an access group labeled $G_j$ corresponding to a connector group $U_j$, $0 \le j < \mu$. The dimension (number of ports) of a connector 140 of a connector group at least equals the number of access nodes of a corresponding access group. The access nodes of the plurality 125 of access nodes are generally geographically distributed. Arranging the access nodes 120 into access groups is done solely for facilitating routing and control. The access nodes of any access group are generally geographically distributed.

FIG. 5 illustrates an example 500 of spatially interleaved access groups 420. Nodes 120A of an access group 420, labelled $G_1$, and nodes 120B of an access group 420, labelled $G_{500}$, may be spread over a wide area.

Figure 6:
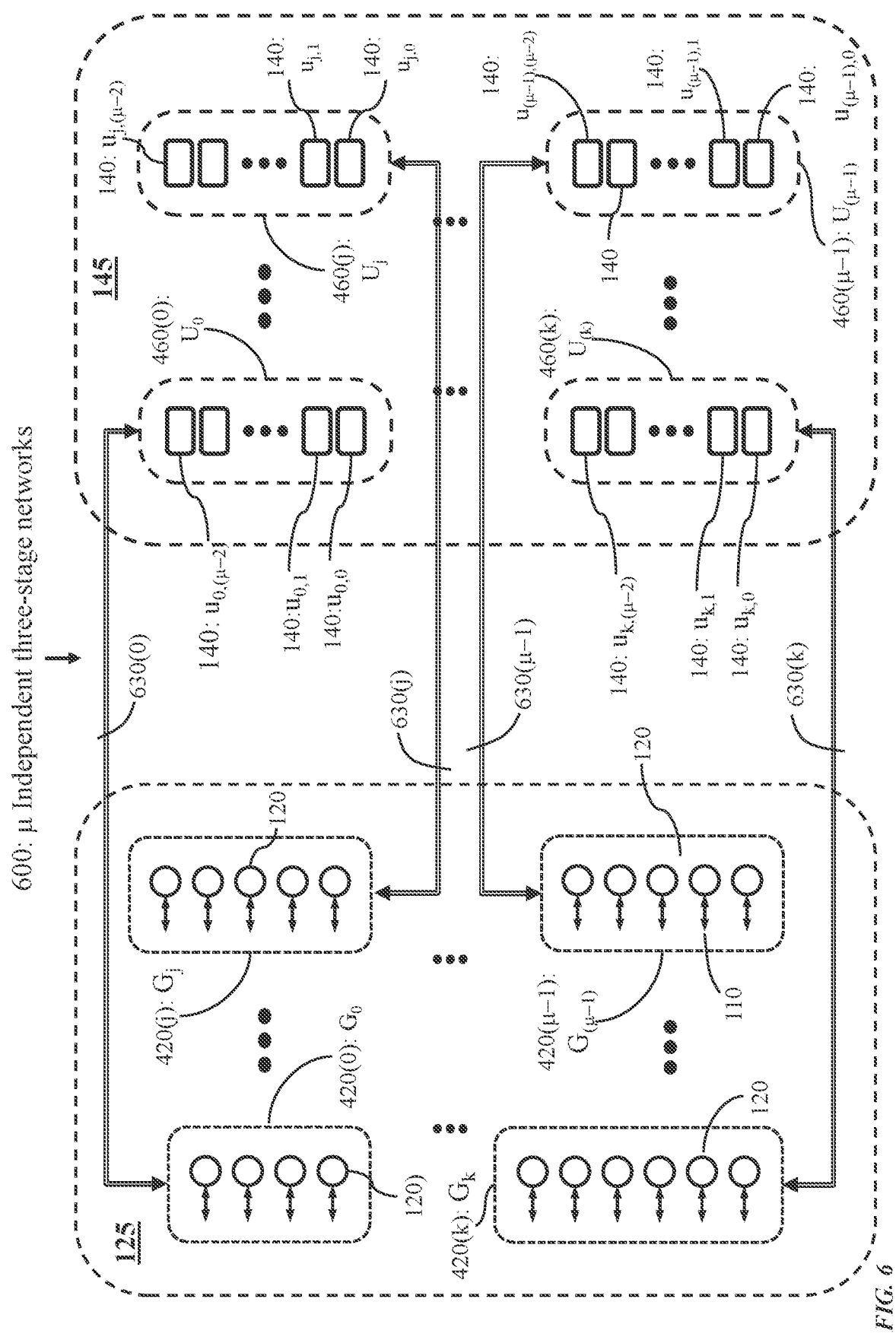
FIG. 6 illustrates connectivity of each access group to a corresponding connector group to form a plurality of independent three-stage networks, each three-stage network comprising an access group and a respective connector group.

FIG. 6 illustrates connectivity of each access group to a corresponding connector group to form a plurality 600 of $\mu$ independent three-stage networks, $\mu>1$, each three-stage network comprising an access group 420 and a respective connector group 460. The plurality 125 of access nodes 120 is organized into $\mu$ access groups 420 and the plurality 145 of connectors 140 is organized into $\mu$ connector groups 460 as illustrated in FIG. 4. Dual multi-channel links 630 connect the access groups 420 to corresponding connector groups 460 to form the plurality 600 of independent three-stage networks which comprises $\mu$ three-stage networks. The number $\mu$ of three-stage network may vary significantly depending on the intended coverage and capacity of the network. For a global network, the number of constituent three-stage networks may be several thousands.

Figure 7:
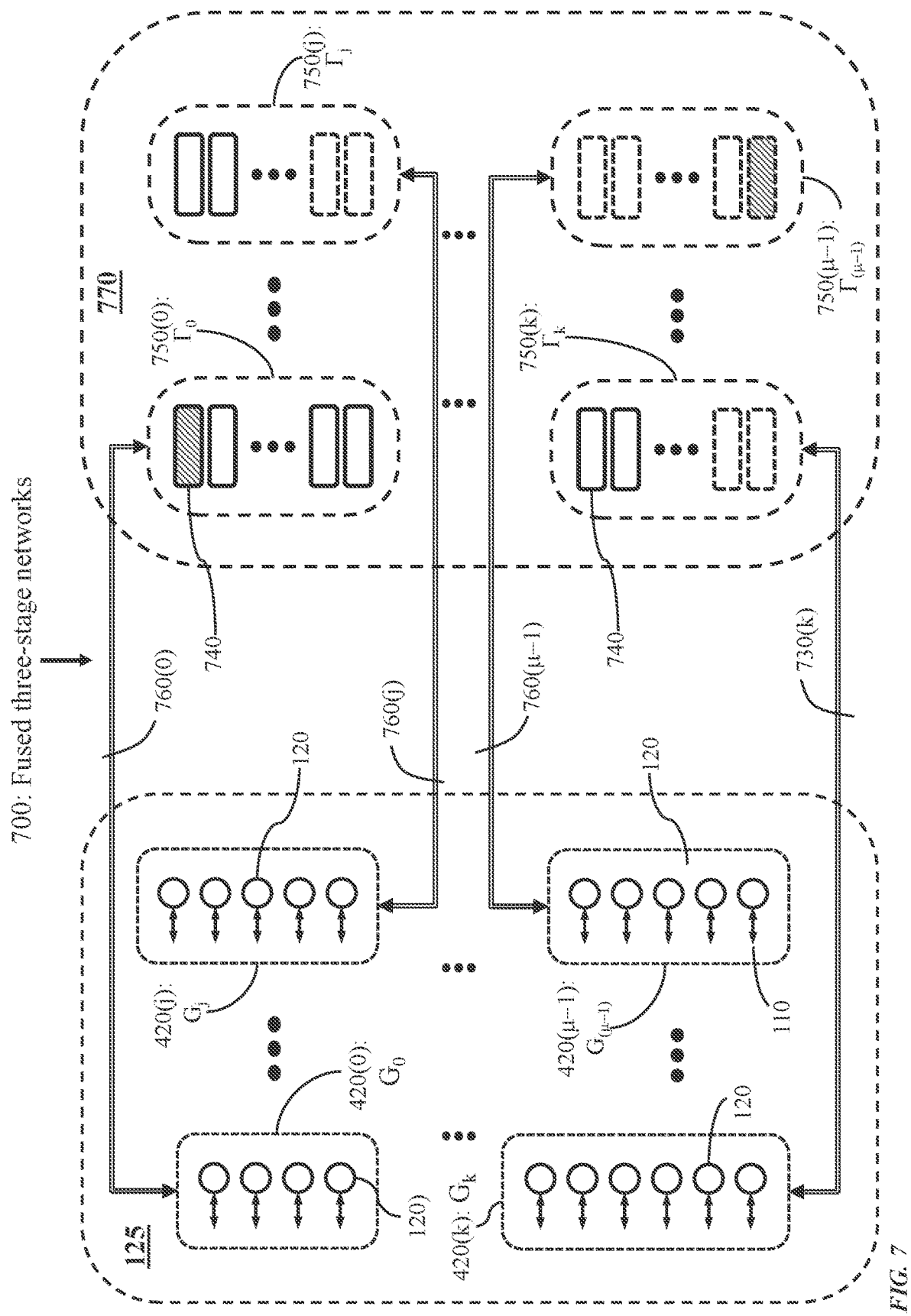
FIG. 7 illustrates a scheme of mutually fusing the three-stage networks of FIG. 6 to form a contiguous network of the plurality of access nodes interconnected through a plurality of distributors, in accordance with an embodiment of the present invention.

FIG. 7 illustrates a scheme 700 of mutually fusing the three-stage networks of FIG. 6 to form a contiguous network. Each of selected pairs of connectors 140 of different connector groups share a common distributing mechanism to form a distributor 740. A distributor 740 combines two connectors of different connector groups. Each connector 140 of any connector group 460 fuses with a connector of another connector group 460 so that each pair of connector groups 460 forms a distributor. Thus, creating a plurality 770 of distributor groups 750 which comprises $\mu$ distributor groups 750. The distributor groups 750 are individually labeled as $\Gamma_0, \Gamma_1, \ldots, \Gamma_{\mu-1}$. Each distributor group 750 interconnects access nodes 120 of a respective access group, forming a respective three-stage network, and connects the access nodes of the respective access group to access nodes of each other access group. Dual multi-channel links 760 connect the access groups 420 to corresponding distributor groups 750 to form the plurality 700 of mutually-fused three-stage networks. The total number of connectors 140 of network 600 of FIG. 6 is $\mu \times (\mu-1)$. The total number of distributors 740 of the network 700 of FIG. 7 is $(\mu \times (\mu-1))/2$. A connector 140 may have a number of dual ports not exceeding a predetermined upper-bound m. A distributor 740 combining two connectors 140 has a number of dual ports equal to the total number of dual ports of the two constituent connectors.

Figure 8:
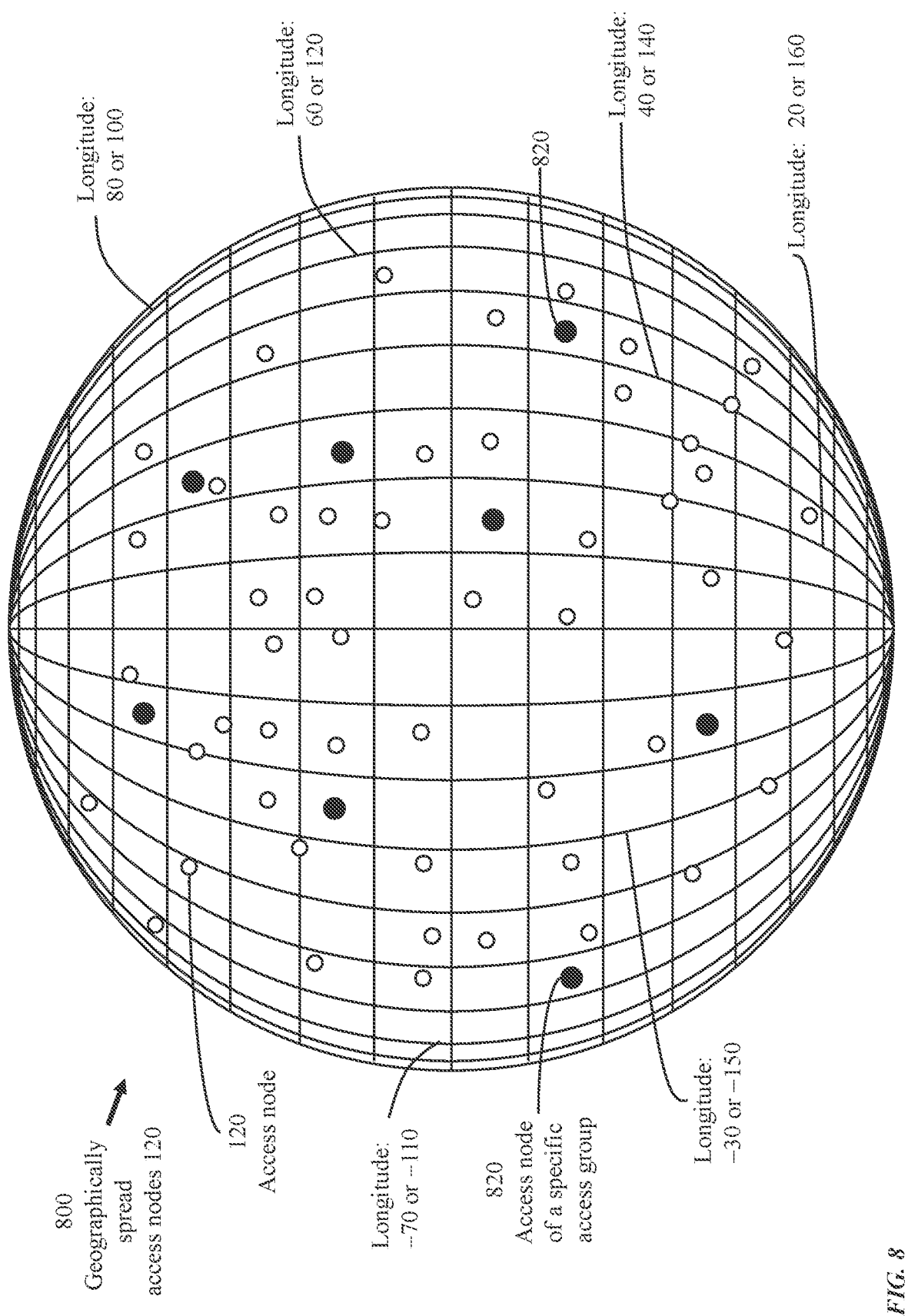
FIG. 8 illustrates a plurality of globally distributed access nodes.

FIG. 8 illustrates a plurality 800 of globally distributed access nodes 120. The access nodes of any access group 420 may be geographically spread. As illustrated, access nodes referenced as 820 which are spread over the planet, belong to one access group 420.

Figure 9:
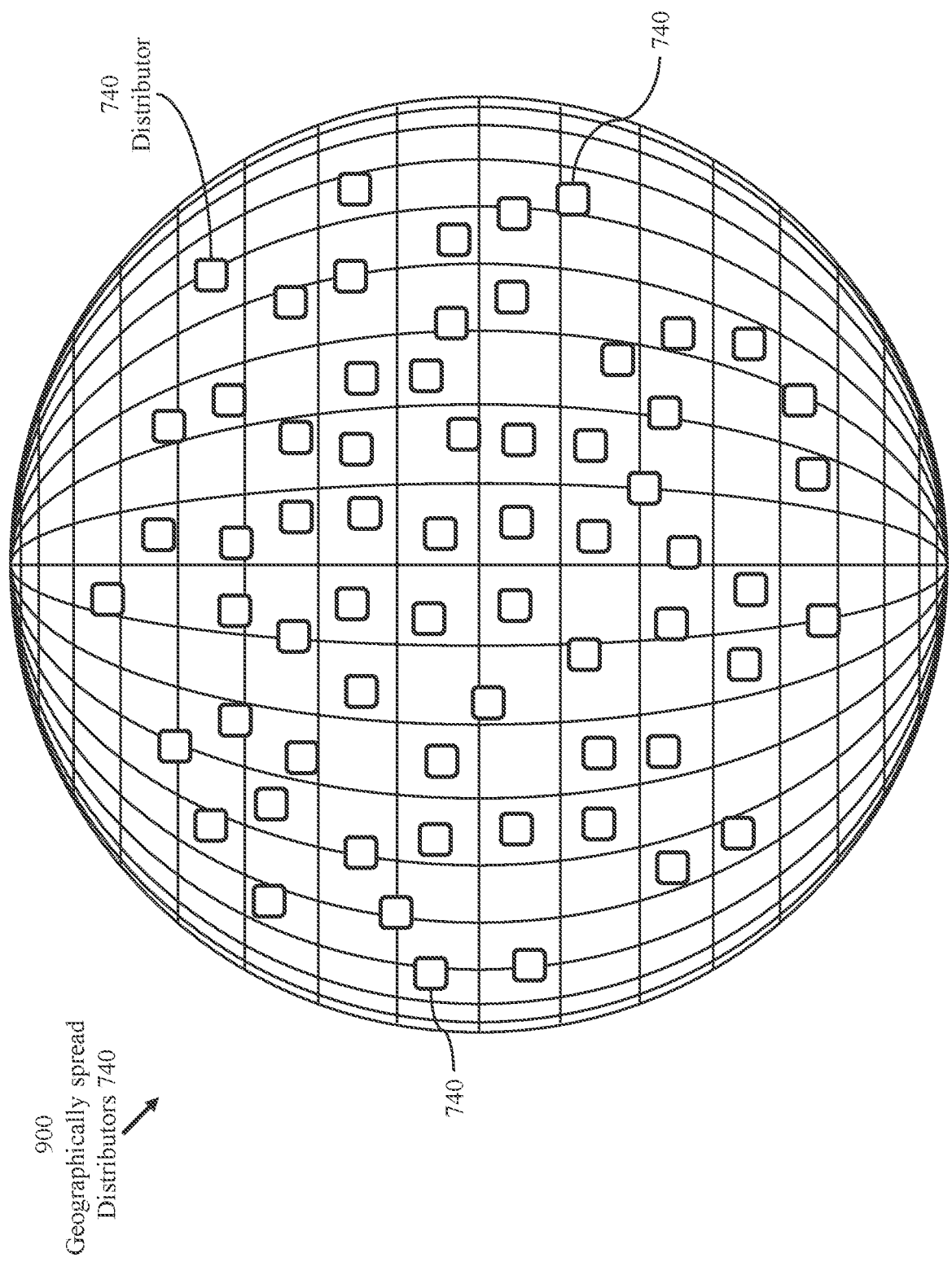
FIG. 9 illustrates a plurality of globally spread distributors.

FIG. 9 illustrates a plurality 900 of globally spread distributors 740. Each access node connects to ($\mu-1$) distributors, $\mu$ being a total number of access groups 420, which is the total number of mutually-fused three-stage networks illustrated in FIG. 7. With a large number of channels connecting the plurality 125 of access nodes 120 to the plurality of distributors 740, WDM links, each carrying multiple channels, are used to connect the plurality 125 of access nodes 120 to the plurality of distributors 740 either through cross-connectors or directly, as illustrated in FIG. 2. Direct connection of the access nodes 120 to the distributors 740 through WDM links requires appropriate grouping of distributors 740 into constellations of collocated distributors as will be described below with reference to FIGS. 18 to 29.

Figure 10:
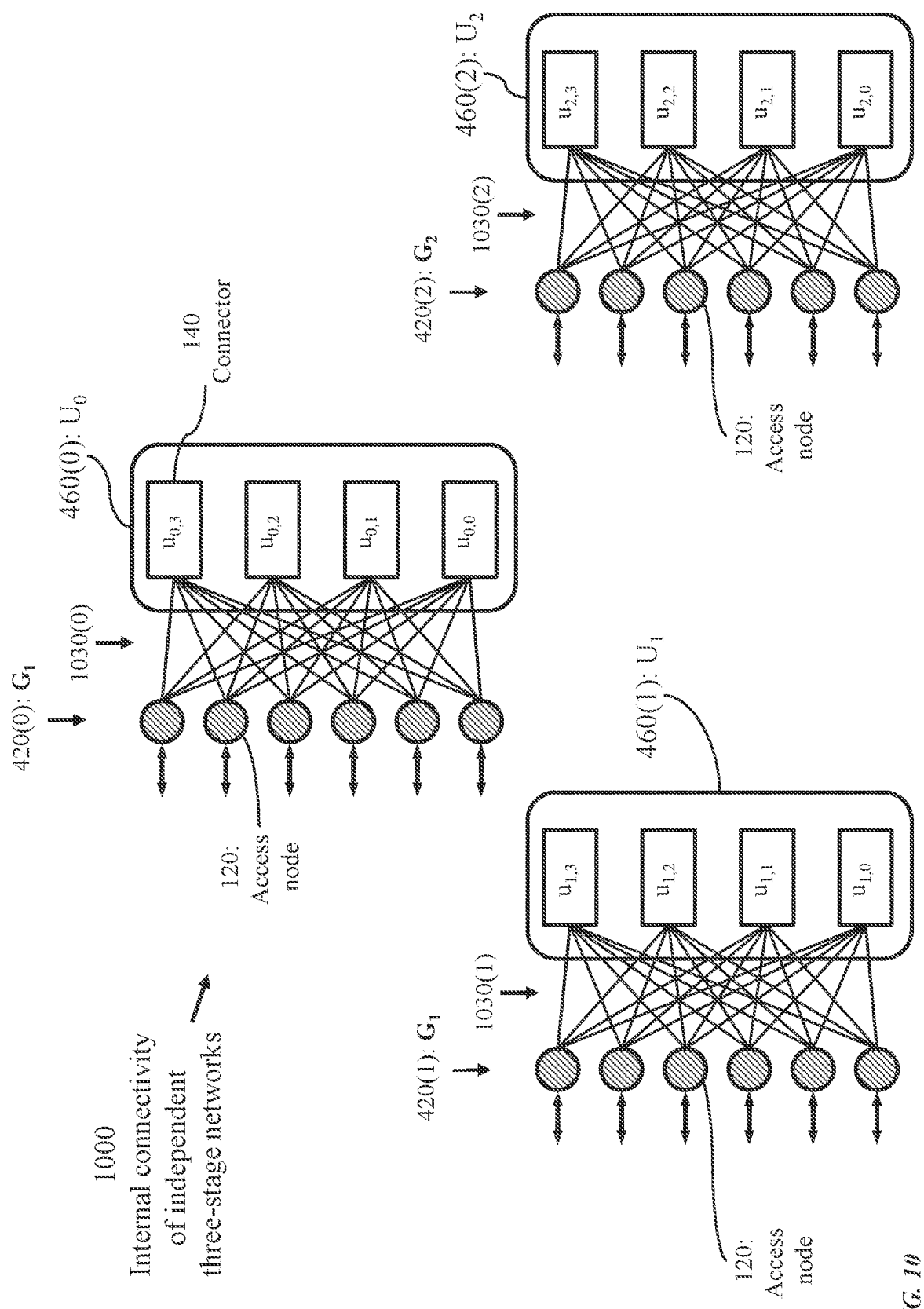
FIG. 10 illustrates internal connectivity of three-stage networks of the plurality of independent three-stage networks of FIG. 6.

FIG. 10 illustrates internal connectivity 1000 of three-stage networks of the plurality of independent three-stage networks of FIG. 6. Each access node 120 of an independent three-stage network connects to ($\mu-1$) dual channels 1030, each leading to a respective connector 140 of a respective connector group 460.

FIG. 11 illustrates internal connectivity 1100 of remaining three-stage networks of the plurality of independent three-stage networks with $\mu=5$.

Figure 12:
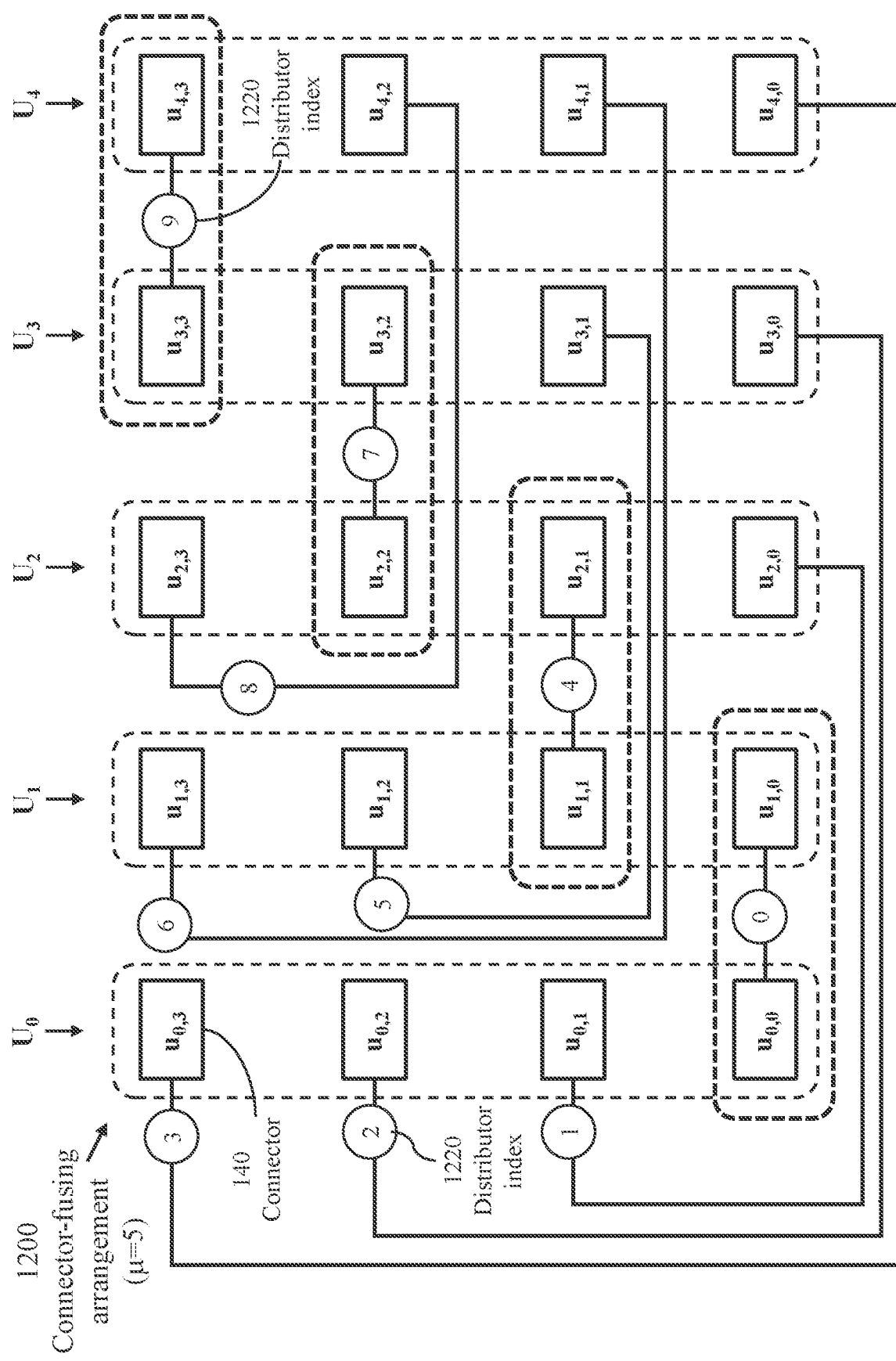
FIG. 12 illustrates a scheme of fusing independent three-stage networks to form a contiguous network, in accordance with an embodiment of the present invention.

FIG. 12 illustrates a scheme 1200 of fusing independent three-stage networks to form a contiguous network. Each of the $\mu$ connector groups 460 comprises ($\mu-1$) connectors 140. The connector groups are indexed as 0 to ($\mu-1$). The connectors 140 of a connector group 460 of index j are labelled $u_{j,k}$, $0 \le j < \mu$, $0 \le k < (\mu-1)$. FIG. 12 illustrates five access groups ($\mu=5$). To create a contiguous network, each connector 140 of each connector group 460 fuses with only one connector of each other connector group. Several fusing patterns may be formed to produce distributors each fusing two three-stage networks. The number of distributors thus produced is $(\mu \times (\mu-1))/2$. With $\mu=5$, the number of distributors is 10, indexed in FIG. 12 as 0, 1, ..., 9 (reference 1220). According to the fusing pattern of FIG. 12, a connector $u_{j,k}$ fuses with a connector $u_{(k+1),j}$, $0 \le j < (\mu-1)$, $j \le k < (\mu-1)$ to form a distributor D(j, k+1). Connector pair $\{u_{0,0}, u_{1,0}\}$ forms a first distributor of index 0, connector pair $\{u_{1,2}, u_{3,1}\}$ forms a distributor of index 5, and connector pair $\{u_{3,3}, u_{4,3}\}$ forms a distributor of index 9.

Figure 13:
FIG. 13 illustrates a pattern of connector pairing where each connector-pair forms a distributor for a network of twelve access groups.

FIG. 13 illustrates a pattern 1300 of connector pairing where each connector-pair forms a distributor for a network of five access groups ($\mu=5$). Each of pair of $\mu \times (\mu-1)$ connectors fuse to form a respective distributor. Each of the independent three-stage networks of FIG. 6 comprises a connector group 460 interconnecting access nodes 120 of a respective access group 420. Each connector 140 of a connector group 460(j) has a dual channel to each access node of access group 420(j), $0 \le j < \mu$. Thus, a distributor replacing a connector of a first independent three-stage network and a connector of a second independent three-stage network interconnects the access group of the first three-stage network and the access-group of the second three-stage network.

According to the fusing scheme of FIG. 12, a connector $u_{j,k}$, which belongs to connector group 460(j), fuses with a connector $u_{(k+1),j}$, which belongs to connector group 460(k+

1), 0≤j<μ. 0≤k<(μ−1), to form a distributor D(j, k+1) which interconnects access group 420(*j*) and access group 420(*k*+ 1). Any distributor which replaces connectors 140 of any pair of three stage networks interconnects all access nodes of the two three-stage networks.

Figure 14:
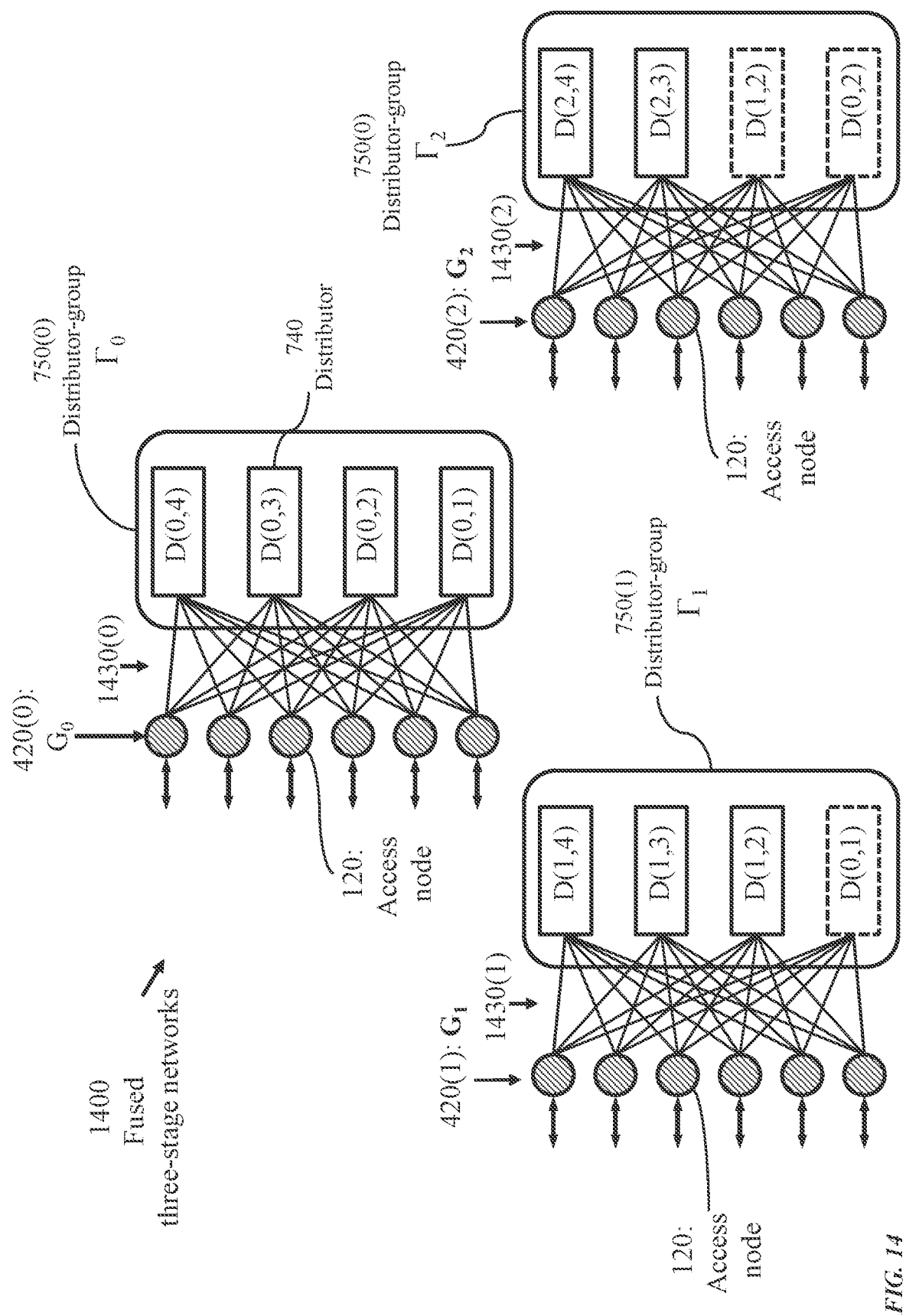
FIG. 14 illustrates internal connectivity of three of five mutually fused three-stage networks produced according to the fusing scheme of FIG. 12.

FIG. 14 illustrates internal connectivity 1400 of three of five mutually fused three-stage networks produced according to the fusing scheme of FIG. 12. Each access node of a fused three-stage network connects to (μ−1) dual channels 1430, each leading to a respective distributor 740 of a respective distributor group 750.

Figure 15:
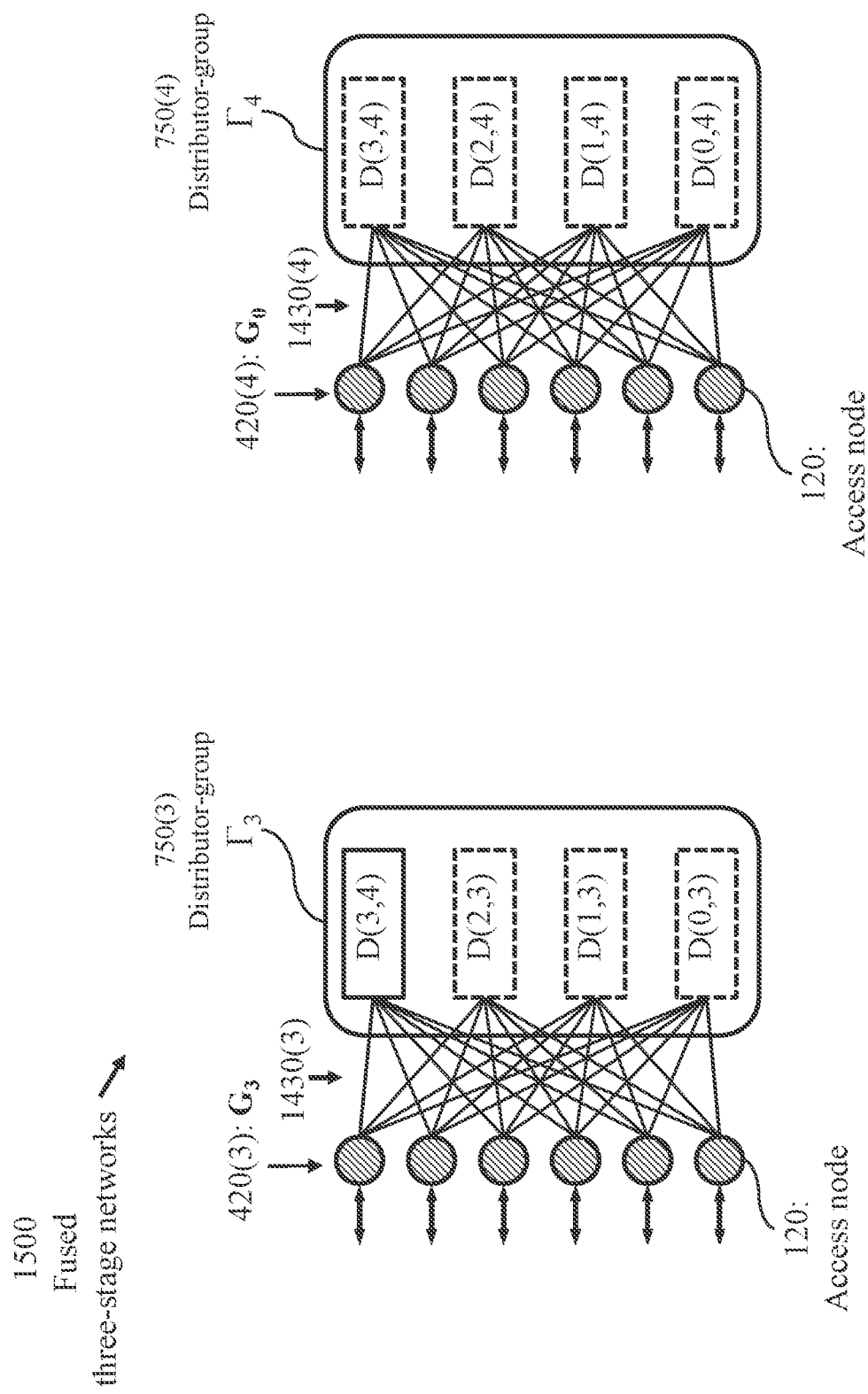
FIG. 15 illustrates internal connectivity of remaining fused networks produced according to the fusing scheme of FIG. 12.

FIG. 15 illustrates internal connectivity 1500 of remaining fused networks produced according to the fusing scheme of FIG. 12.

Figure 16:
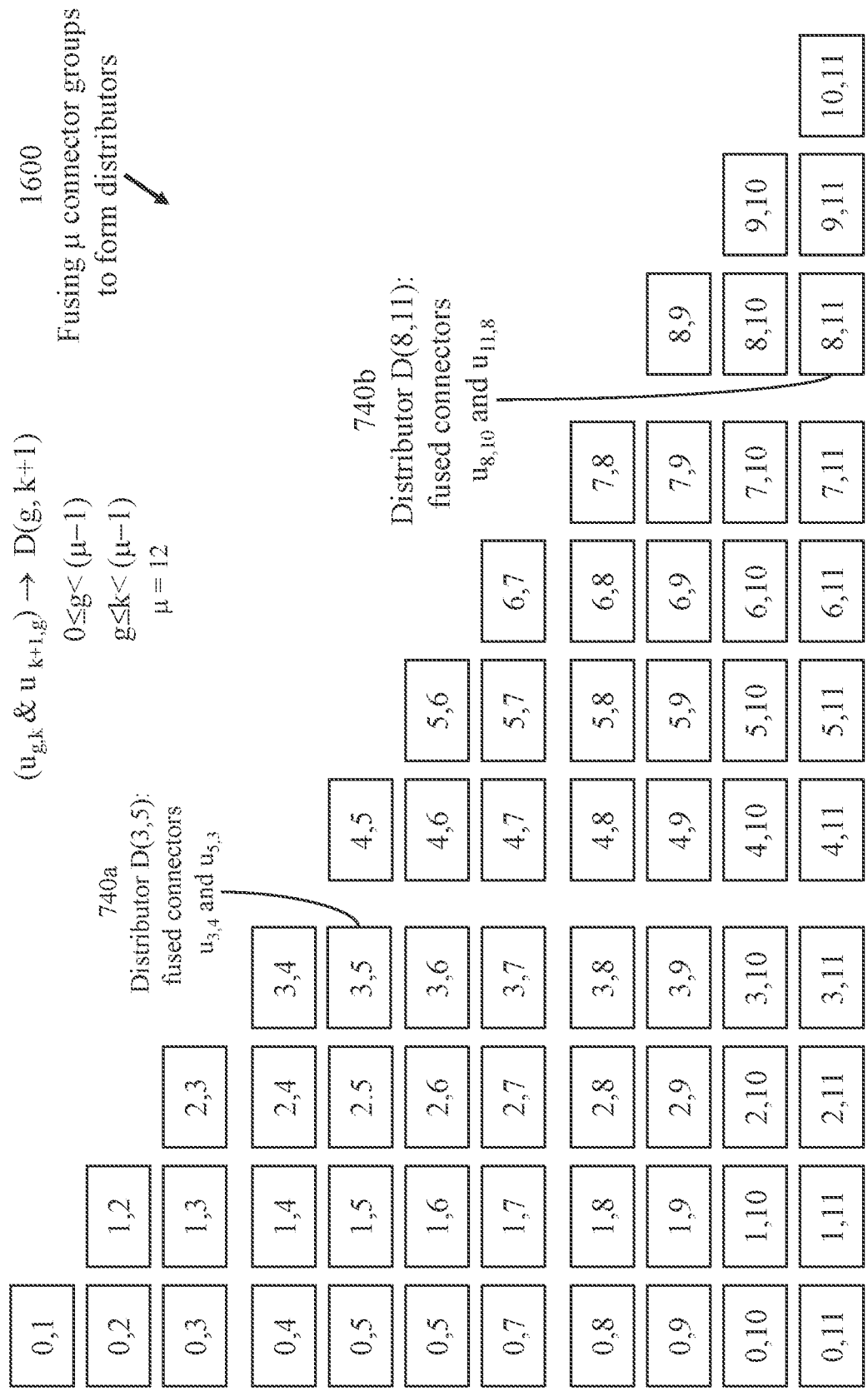
FIG. 16 illustrates a set of distributors formed according to the fusing scheme of FIG. 12 for a network of twelve access groups.

FIG. 16 illustrates a set 1600 of distributors 740 formed according to the fusing scheme of FIG. 12 for a network of twelve access groups. A connector 140 of connector group 460(3) and a connector 140 of connector group 460(5) fuse to form distributor 740*a* which interconnects all access nodes 120 of access groups 420(3) and 420(5). Likewise, a connector 140 of connector group 460(8) and a connector 140 of connector group 460(11) fuse to form distributor 740*b* which interconnects all access nodes 120 of access groups 420(8) and 420(11).

The set 1600 of distributors represents twelve mutually fused three-stage networks. Table-I below explicitly identifies the individual fused three-stage networks, which are indexed as 0 to 11. Each column of the table lists 12 distributors 740 identifying indices of access groups 420 connecting to each distributor. The access groups are indexed as 0 to 11. Each pair of three-stage networks has one common distributor. For example, the three-stage networks of indices 5 and 11 (columns 5 and 7 of the table) have a common distributor D(5,11).

Given a specified number, μ, of access groups and a specified number, Π, of access bands, Π>1, μ≥(2×Π), Ω is determined Ω=⌈μ/Π⌉.

Figure 18:
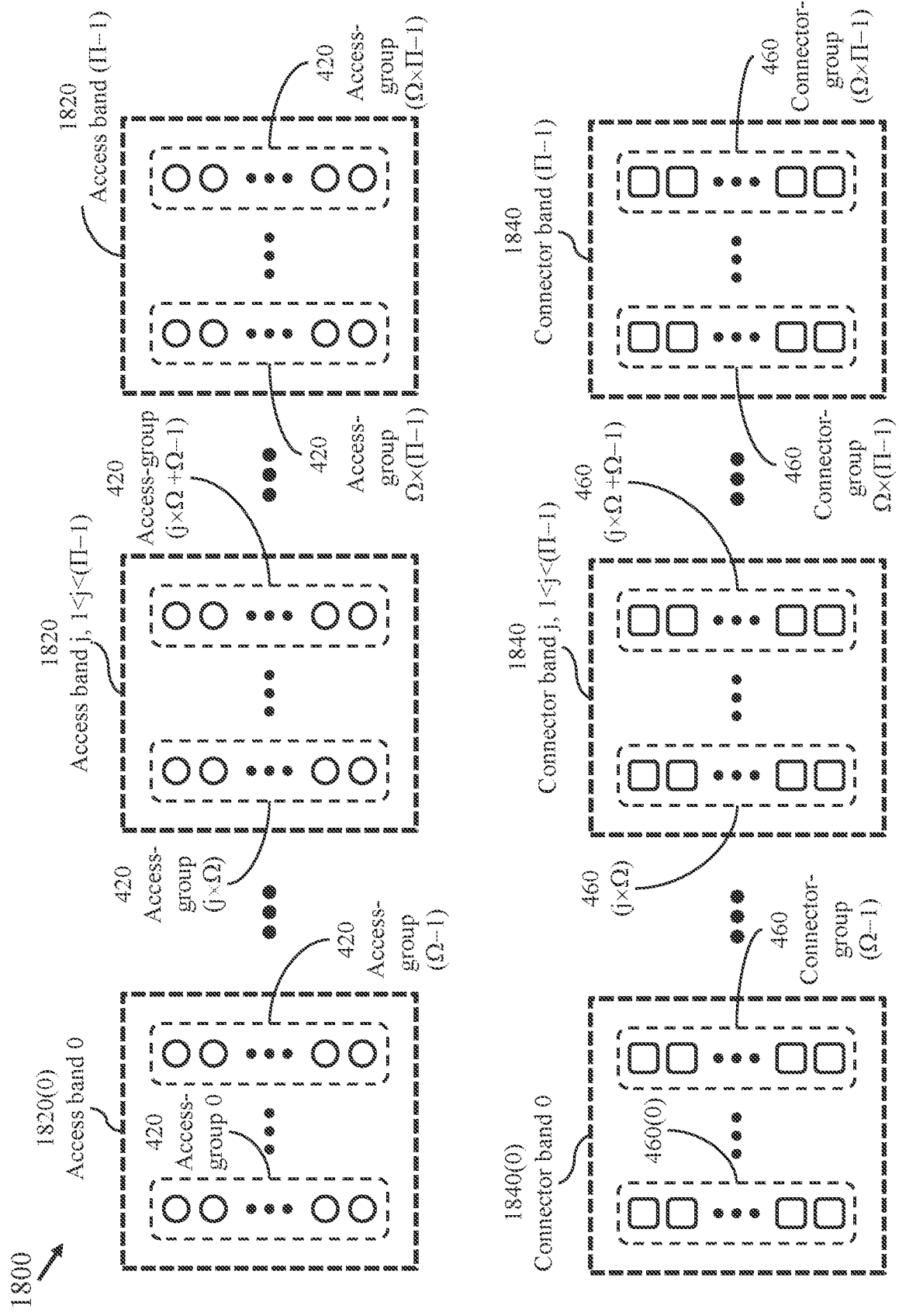
FIG. 18 illustrates a plurality of access bands each containing a number of access groups, not exceeding a predefined limit, and a plurality of corresponding connector bands, in accordance with an embodiment of the present invention.

The access-bands are individually indexed as 0 to (Π−1). A first access-band 1820(0) may comprise access-groups 420 of indices 0 to (Ω−1). An intermediate access-band of index j, 0≤j<Π, may comprise access groups 420 of indices j×Ω to (j×Ω+Ω−1). The last access-band of index (Π−1) may comprise access groups of indices Ω×(Π−1) to (Ω×Π−1). The connector bands are likewise indexed as illustrated in FIG. 18.

Figure 19:
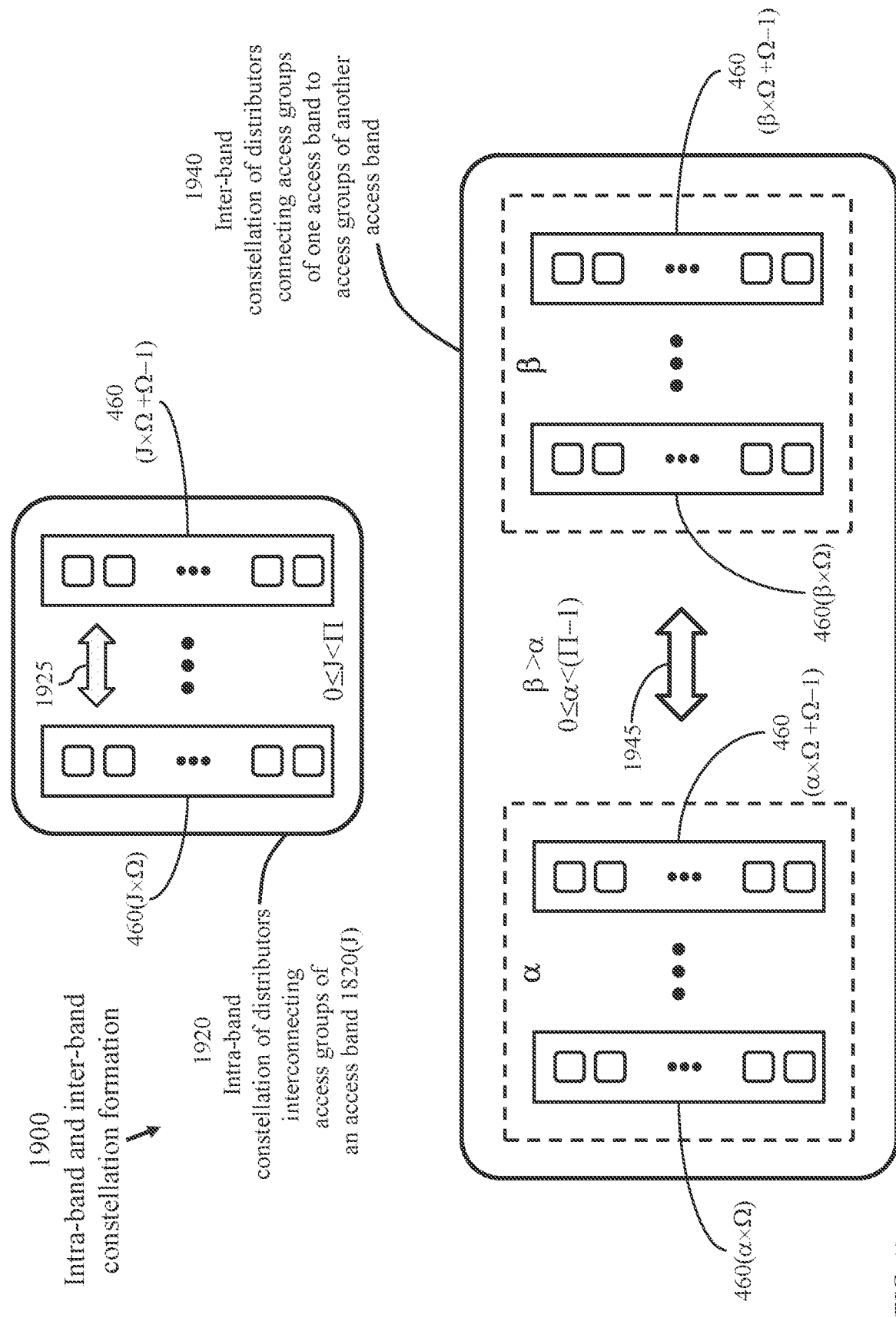
FIG. 19 illustrates formation of an intra-band constellation and an inter-band constellation as fused connector-groups, in accordance with an embodiment of the present invention.

FIG. 19 illustrates formation 1900 of an intra-band constellation and an inter-band constellation. An intra-band constellation 1920 comprises mutually fused connector groups 460 of a connector band. Pairwise fusion 1925 of connectors of different connector groups 460, where each connector 140 of each connector group 460 is fused with a respective connector of another connector group 460, forms (Ω×(Ω−1)/2 distributors of the intra-band constellation. An inter-band constellation 1940 comprises connector groups of a connector band fused to connector-groups of another connector band. Pairwise fusion 1945 of connectors of a first connector band, corresponding to a first access band, to connectors of a second connector band, corresponding to a second access band, forms $\Omega^2$ distributors within the inter-band constellation.

Figure 33:
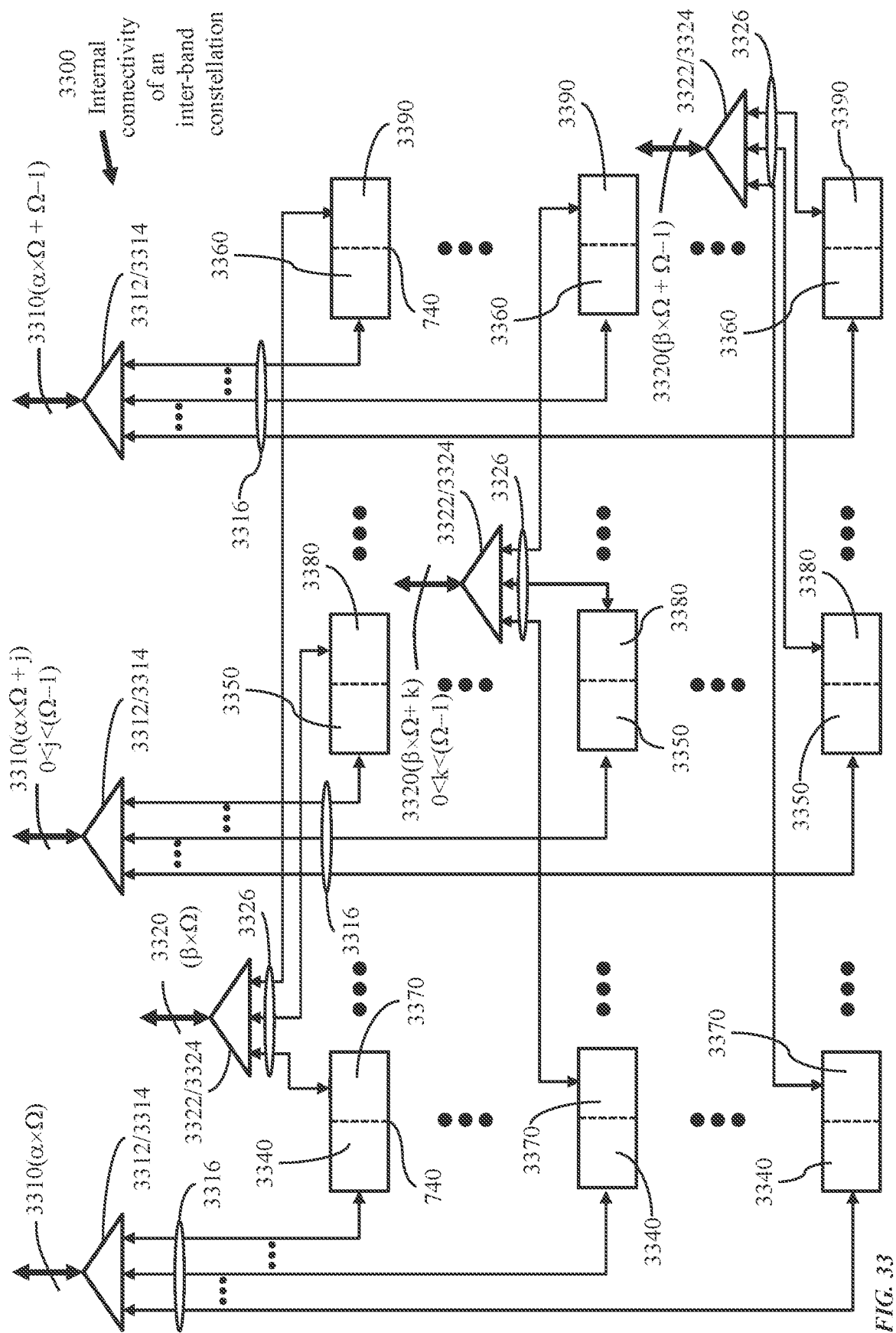
FIG. 33 illustrates internal connectivity of an inter-band constellation, in accordance with an embodiment of the present invention.
Figure 37:
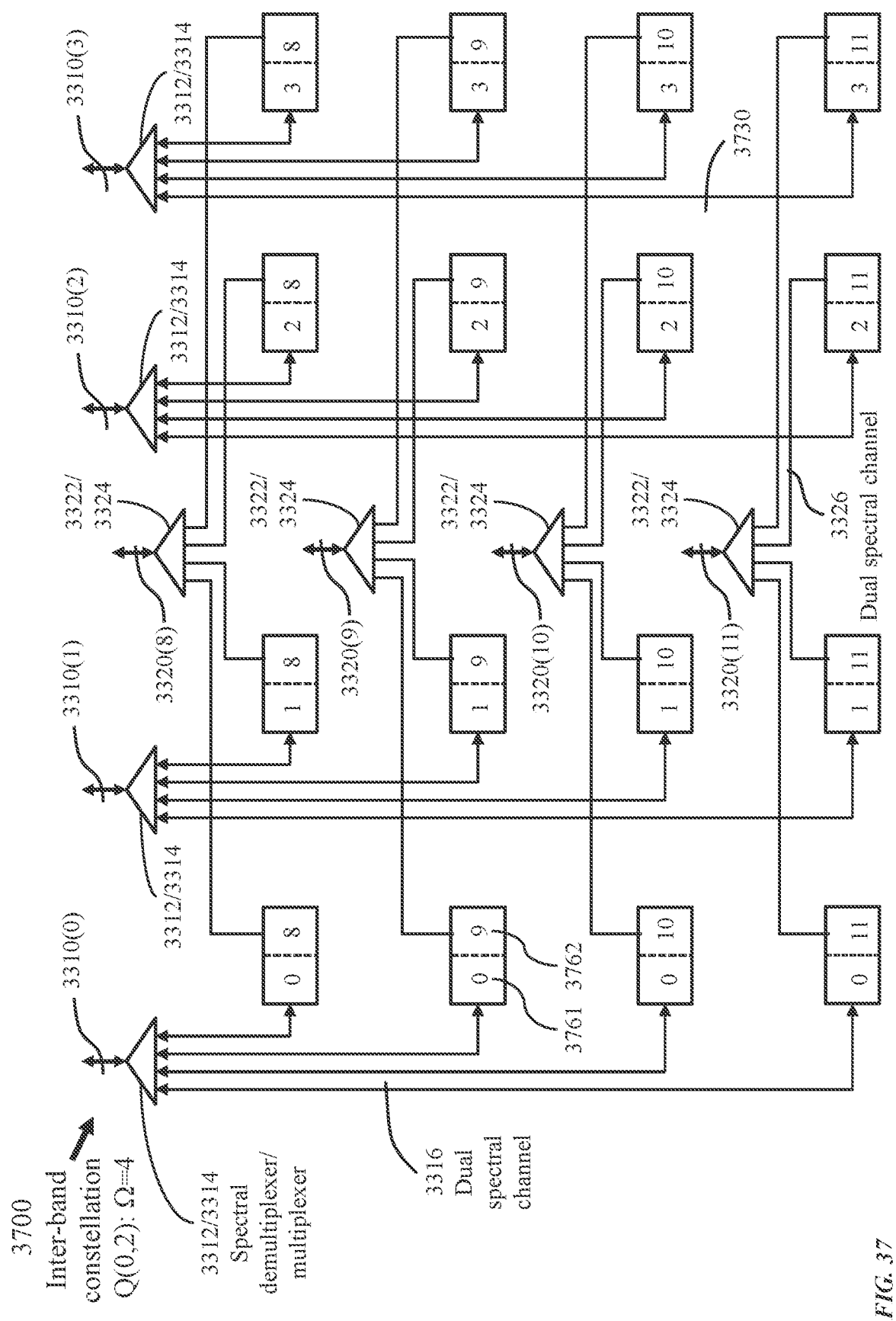
FIG. 37 illustrates internal connectivity of a specific inter-band constellation, in accordance with an embodiment of the present invention.
Figure 41:
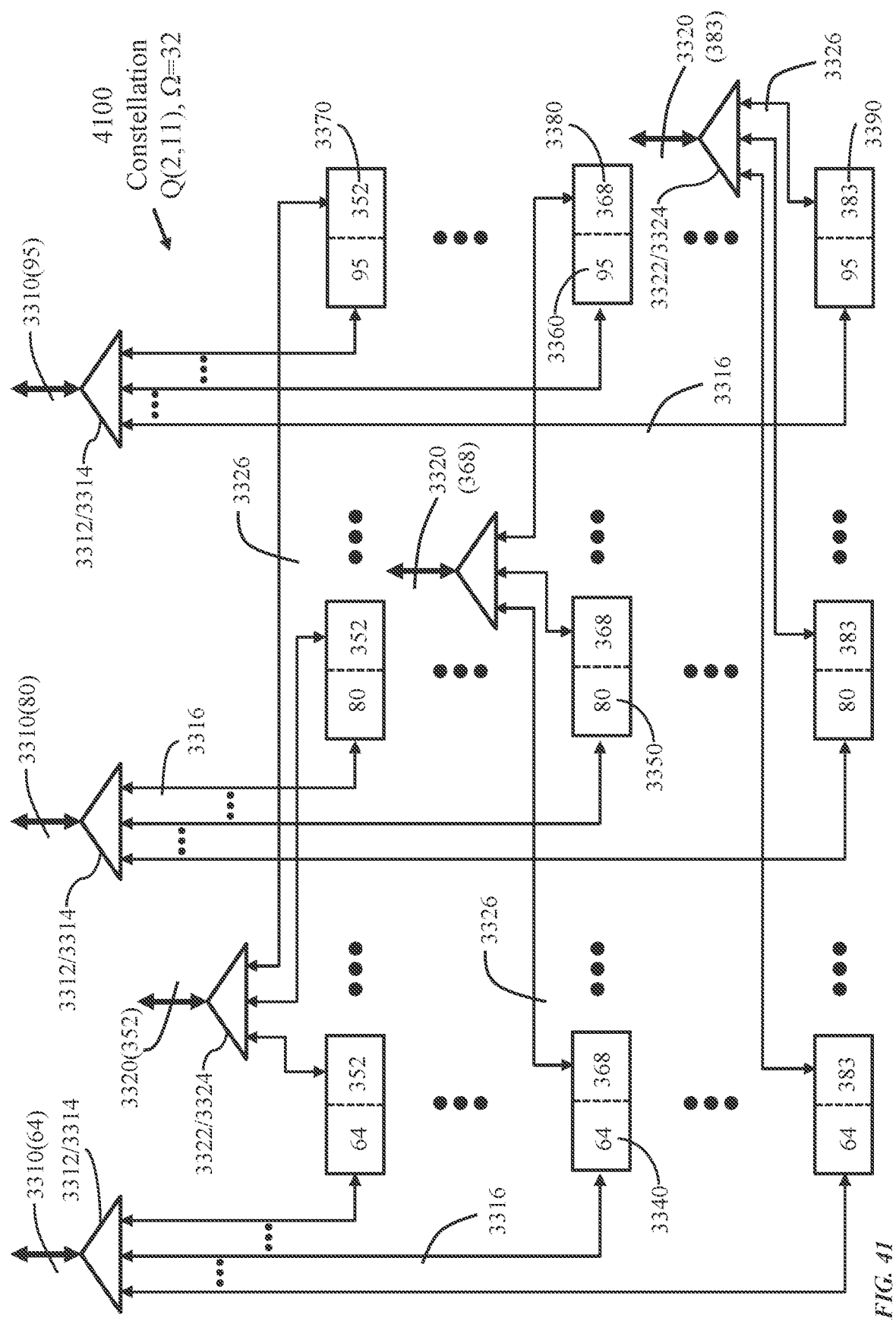
FIG. 41 illustrates internal connectivity of a large-scale inter-band constellation, in accordance with an embodiment of the present invention.

Each connector 140 of each connector group 460 of the first band is fused with a respective connector 140 of a connector group 460 of the second connector band to form a distributor so that each access group of the first access band connects to each access group of the second access band through a respective distributor as illustrated in FIGS. 33, 37, and 41.

TABLE I

Figure 36:
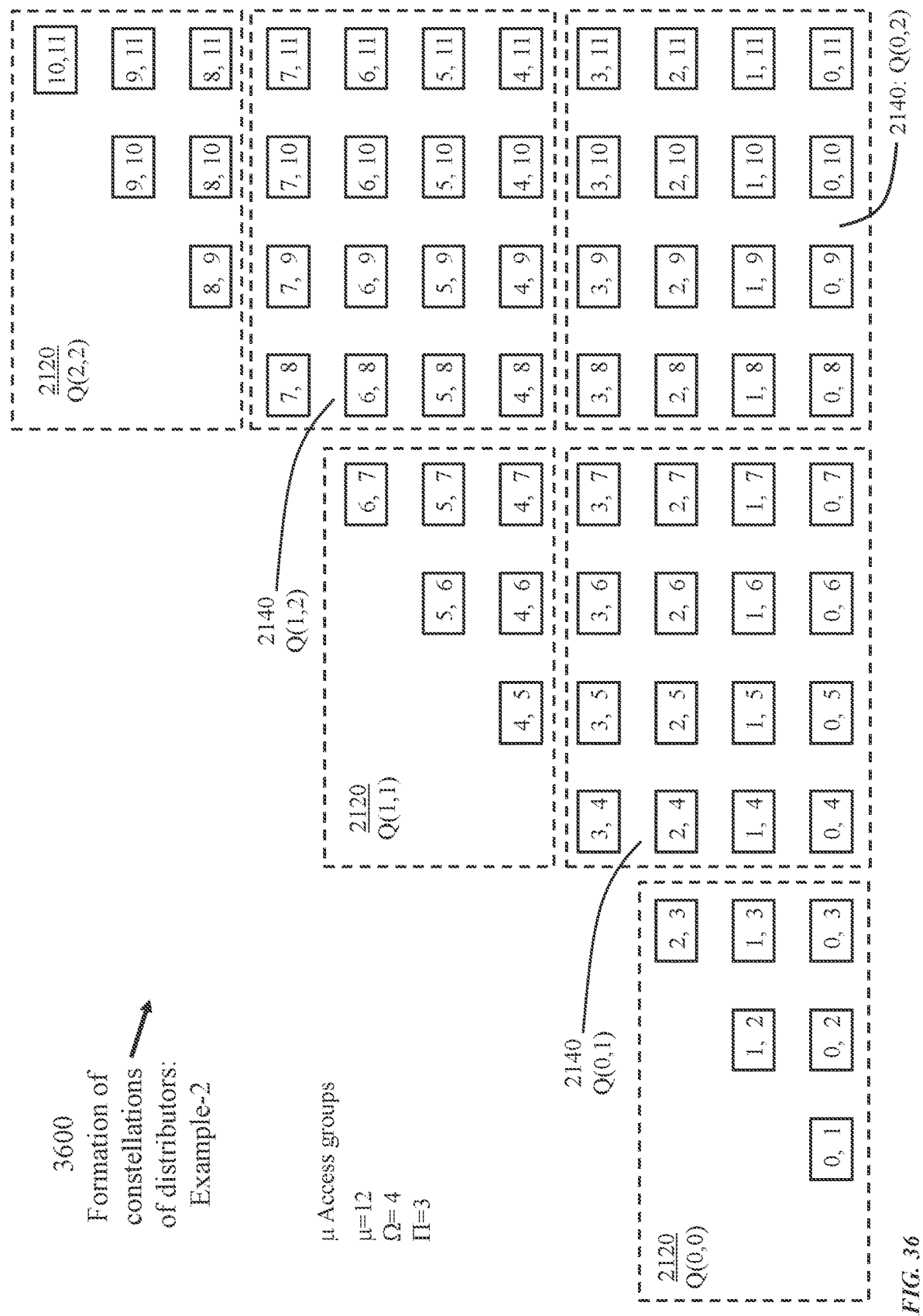
FIG. 36 illustrates a second example of constellations of distributors for a network comprising 12 access groups arranged into three access bands.

Identifiers of distributors of each constituent three-stage network of the global network of FIG. 36
Index of constituent three-state network

| 0 | 1 | 2 | 3 | 4 | 5 | 6 | 7 | 8 | 9 | 10 | 11 |
|---|---|---|---|---|---|---|---|---|---|---|---|
| 0, 1 | 0, 1 | 0, 2 | 0, 3 | 0, 4 | 0, 5 | 0, 6 | 0, 7 | 0, 8 | 0, 9 | 0, 10 | 0, 11 |
| 0, 2 | 1, 2 | 1, 2 | 1, 3 | 1, 4 | 1, 5 | 1, 6 | 1, 7 | 1, 8 | 1, 9 | 1, 10 | 1, 11 |
| 0, 3 | 1, 3 | 2, 3 | 2, 3 | 2, 4 | 2, 5 | 2, 6 | 2, 7 | 2, 8 | 2, 9 | 2, 10 | 2, 11 |
| 0, 4 | 1, 4 | 2, 4 | 3, 4 | 3, 4 | 3, 5 | 3, 6 | 3, 7 | 3, 8 | 3, 9 | 3, 10 | 3, 11 |
| 0, 5 | 1, 5 | 2, 5 | 3, 5 | 4, 5 | 4, 5 | 4, 6 | 4, 7 | 4, 8 | 4, 9 | 4, 10 | 4, 11 |
| 0, 6 | 1, 6 | 2, 6 | 3, 6 | 4, 6 | 5, 6 | 5, 6 | 5, 7 | 5, 8 | 5, 9 | 5, 10 | 5, 11 |
| 0, 7 | 1, 7 | 2, 7 | 3, 7 | 4, 7 | 5, 7 | 6, 7 | 6, 7 | 6, 8 | 6, 9 | 6, 10 | 6, 11 |
| 0, 8 | 1, 8 | 2, 8 | 3, 8 | 4, 8 | 5, 8 | 6, 8 | 7, 8 | 7, 8 | 7, 9 | 7, 10 | 7, 11 |
| 0, 9 | 1, 9 | 2, 9 | 3, 9 | 4, 9 | 5, 9 | 6, 9 | 7, 9 | 8, 9 | 8, 9 | 8, 10 | 8, 11 |
| 0, 10 | 1, 10 | 2, 10 | 3, 10 | 4, 10 | 5, 10 | 6, 10 | 7, 10 | 8, 10 | 9, 10 | 9, 10 | 9, 11 |
| 0, 11 | 1, 11 | 2, 11 | 3, 11 | 4, 11 | 5, 11 | 6, 11 | 7, 11 | 8, 11 | 9, 11 | 10, 11 | 10, 11 |

Figure 17:
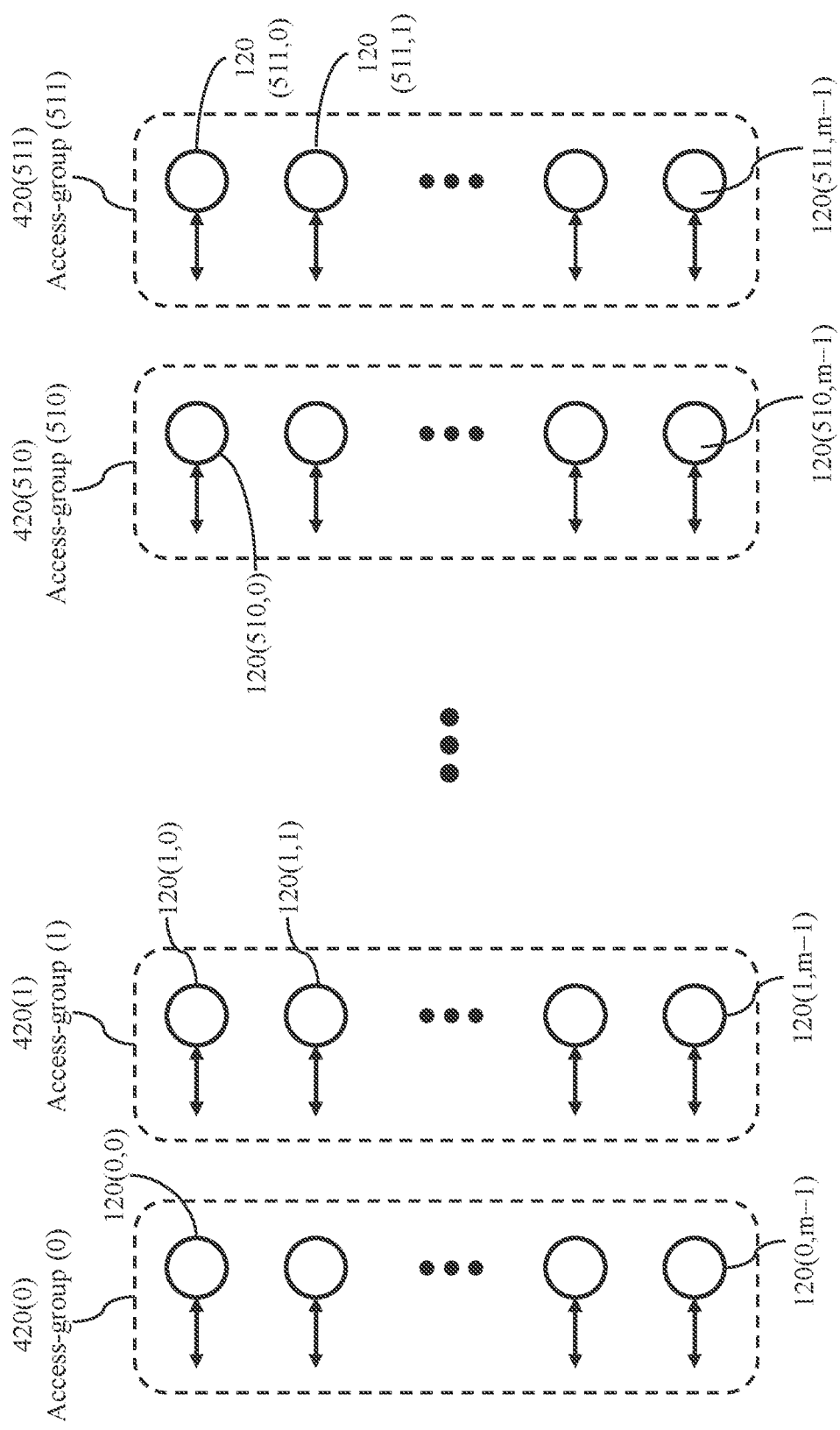
FIG. 17 illustrates a plurality of access groups to be logically arranged into access bands, in accordance with an embodiment of the present invention.

FIG. 17 illustrates a plurality 1700 of access groups 420 to be logically arranged into access bands; the total number of access groups being 512 (μ=512) indexed as 0 to 511. An access group 420 may be provisioned to contain an arbitrary number of access nodes 120, with more access nodes added as the need arises, up to a predetermined upper bound m. The illustrated access nodes of FIG. 17 are fully provisioned access groups.

FIG. 18 illustrates a plurality 1800 of access bands 1820 and corresponding connector bands 1840. Each access band 1820 contains a number of access groups 420 not exceeding a predefined limit Ω, Ω>1. Each connector band 1840 contains Ω connector groups 460. The number, Π, of access bands and the predefined limit Ω are selected so that ⌈×Ω≥μ.

Figure 20:
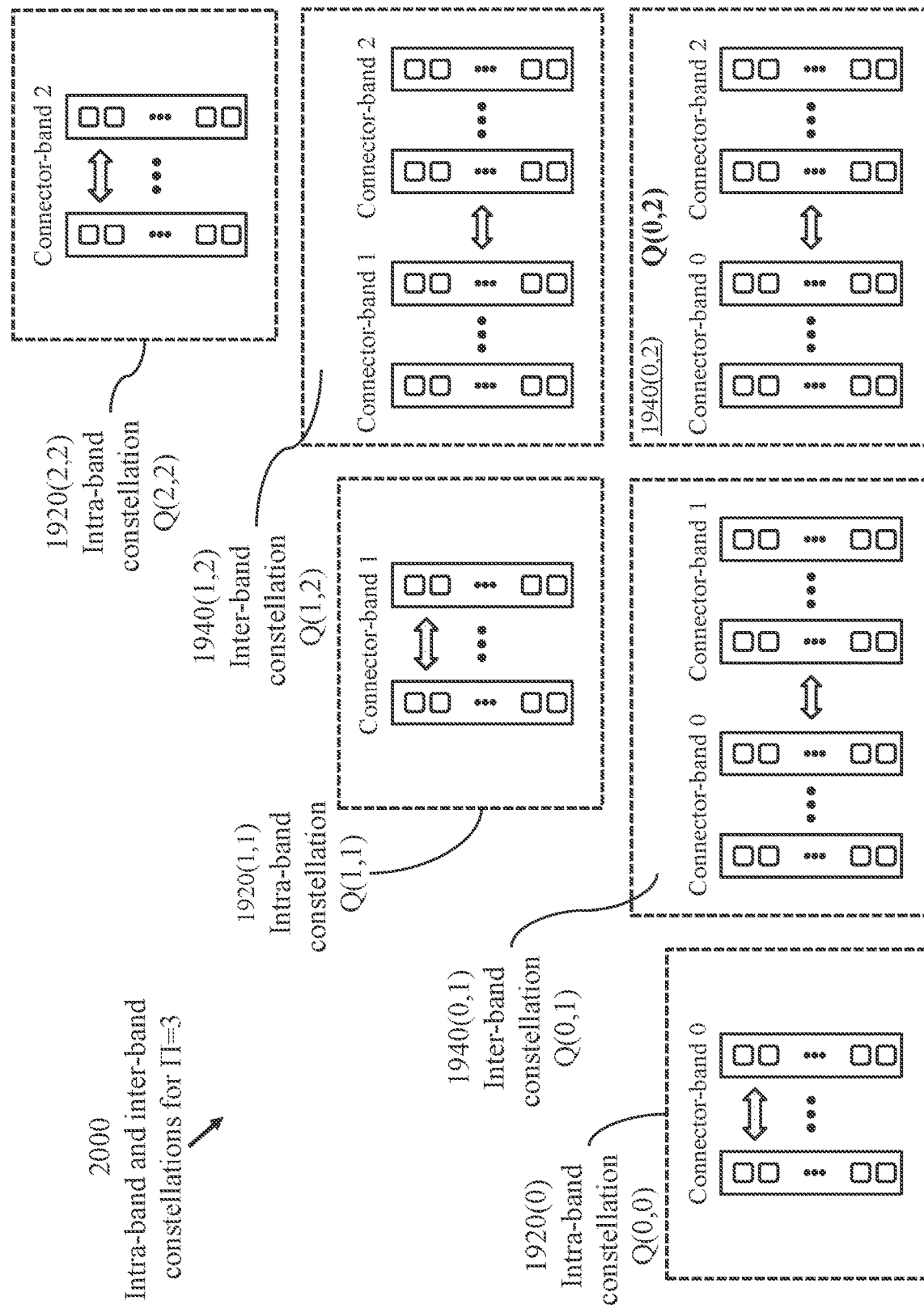
FIG. 20 illustrates an exemplary arrangement of complementing intra-band and inter-band constellations of a contiguous network, in accordance with an embodiment of the present invention.

FIG. 20 illustrates an exemplary arrangement 2000 of complementing intra-band and inter-band constellations of a contiguous network. With Π access bands, Π>1, the network comprises Π intra-band constellations 1920 and (Π×(Π−1)/2 inter-band constellations 1940. Each access group 420 connects to (Ω−1) distributors within a respective intra-band constellation 1920 and to Ω distributors within each of respective (Π−1) inter-band constellations. Noting that (Ω−1)+Ω×(Π−1)=(μ−1), each access group connects to (μ−1) distributors forming a respective three-stage network where each access node of the access group has (μ−1) paths, each traversing only one distributor, to each other access node of the access group. Each pair of access groups connects to a respective distributor, thus providing a path from each access node of each access group to each access node of each other access group traversing only one distributor.

Figure 21:
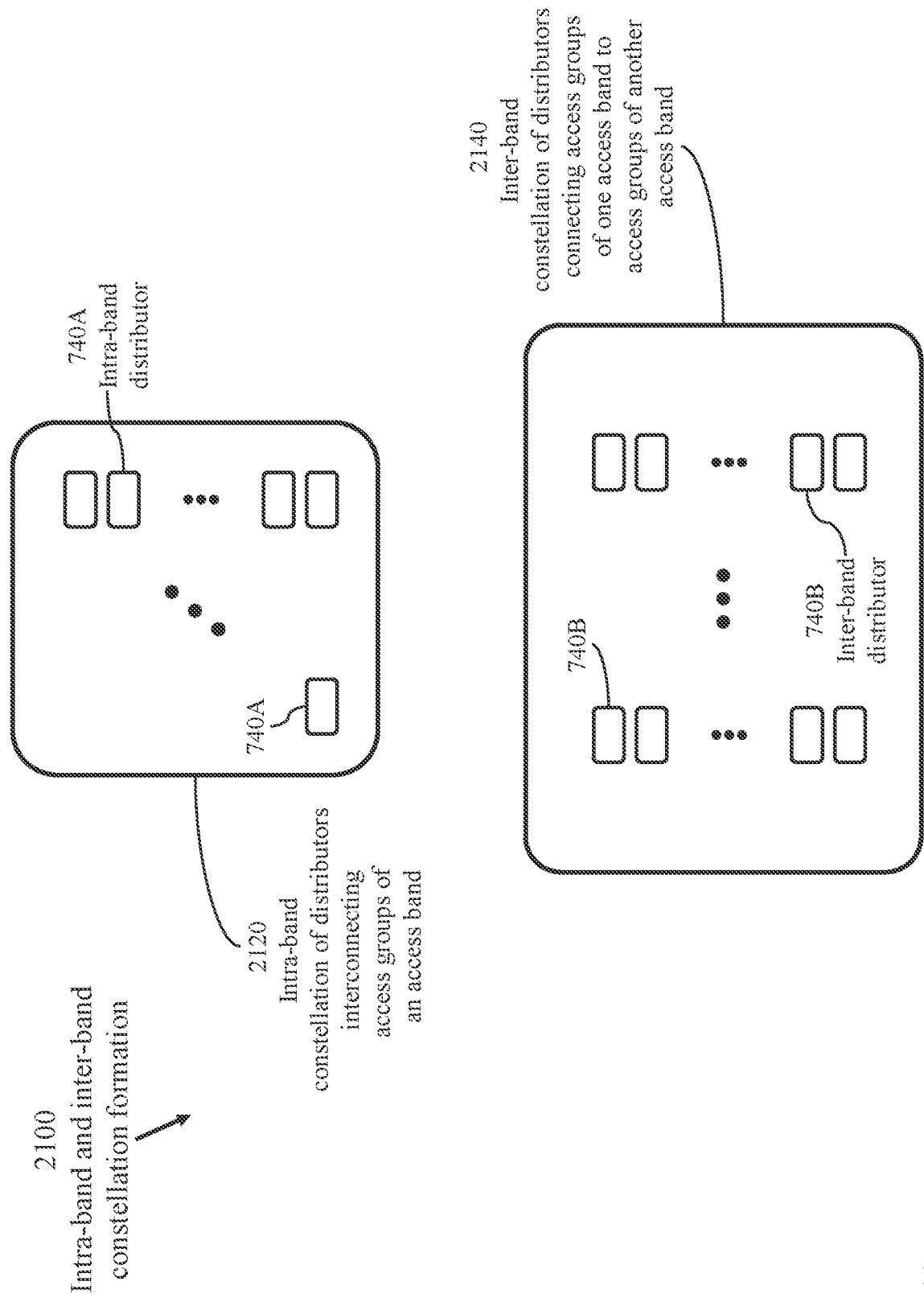
FIG. 21 illustrates constituent distributors of the intra-band constellation and the inter-band constellation of FIG. 19.

FIG. 21 illustrates the form 2100 of the constellations of distributors. Mutual fusion of the connector groups 460 of the intra-band constellation 1920 forms $(\Omega \times (\Omega-1))/2$ intra-band distributors 740A each connecting to a respective pair of access groups 420 of a same access band. A distributor within an intra-band constellation of distributors is referenced as an intra-band distributor. An intra-band constellation 2120 of intra-band distributors comprises $(\Omega \times (\Omega-1))/2$ intra-band distributors.

An inter-band constellation 1940 comprises distributors connecting access-groups of an access-band to access-groups of another access-band. Fusion of each connector group 460 of the first access-band to each connector group 460 of the second access-band forms $\Omega^2$ inter-band distributors 740B each connecting to a respective pair of access groups 420 of different access bands. A distributor within an inter-band constellation of distributors is referenced as an inter-band distributor. An inter-band constellation 2140 of inter-band distributors comprises $\Omega^2$ inter-band distributors.

Figure 22:
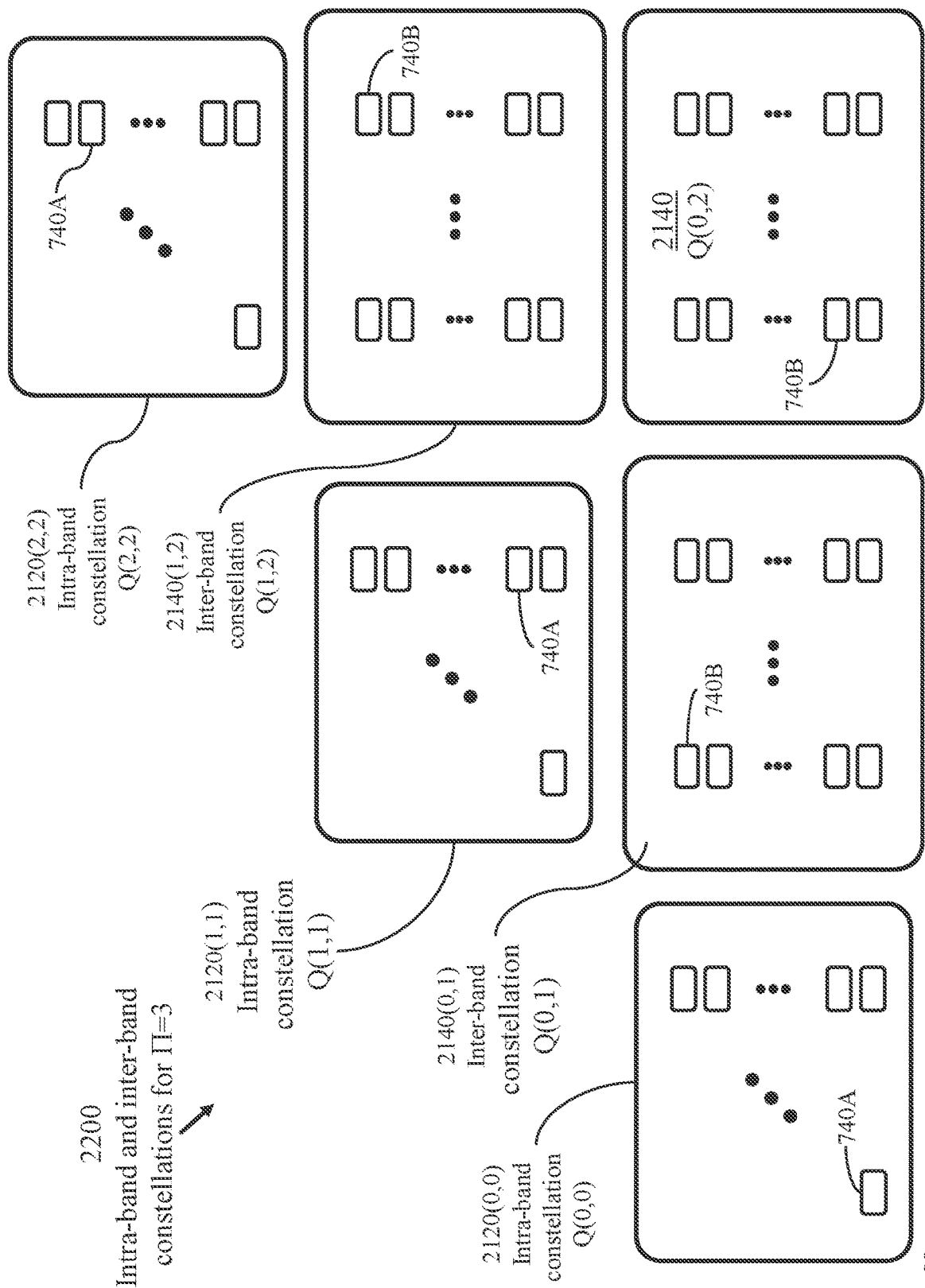
FIG. 22 is a representation of complementing intra-band and inter-band constellations of a contiguous network indicating constituent distributors of each formed constellation.

FIG. 22 is a representation 2200 of complementing intra-band constellations 2120 and inter-band constellations 2140 of a contiguous network, for $\Pi=3$, indicating constituent intra-band distributors 740A and inter-band distributors 740B.

Figure 23:
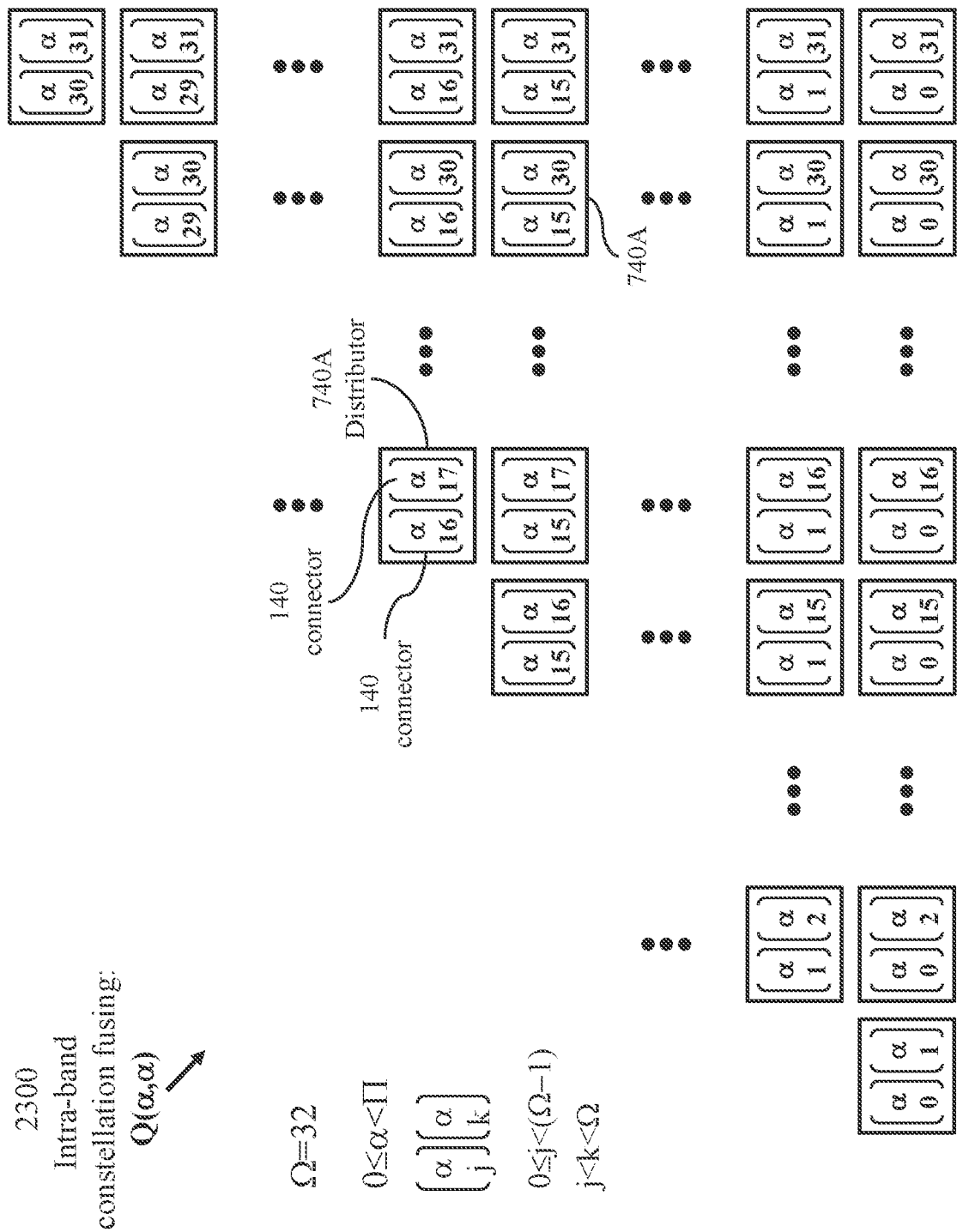
FIG. 23 details a configuration of an intra-band constellation.

FIG. 23 details a configuration 2300 of an intra-band constellation 2120 for a case of $\Omega=32$. The constellation comprises $(\Omega \times (\Omega-1))/2$ distributors 740A each connecting to a respective pair of access groups. An intra-band constellation $Q(\alpha,\alpha)$, $0 \leq \alpha < \Pi$, comprises distributors 740A connecting to access-group pairs of indices $\{(\alpha \times \Omega+j), (\alpha \times \Omega+k)\}$ for all integers j and k in the range $0 \leq j < (\Omega-1)$ and $j < k < \Omega$. For $\Omega=32$ and $\alpha=0$, the indices of the access-group pairs are $\{j,k\}$, $0 \leq j < 31$ and $j < k < 32$. For $\Omega=32$ and $\alpha=15$, the indices of the access-group pairs are $\{j,k\}$, $480 \leq j < 511$ and $480 < k < 512$. The notation [α j] [α k] in FIG. 23 denotes an intra-band distributor fusing a connector group of index $(\alpha \times \Omega+j)$ and a connector group of index $(\alpha \times \Omega+k)$.

Figure 24:
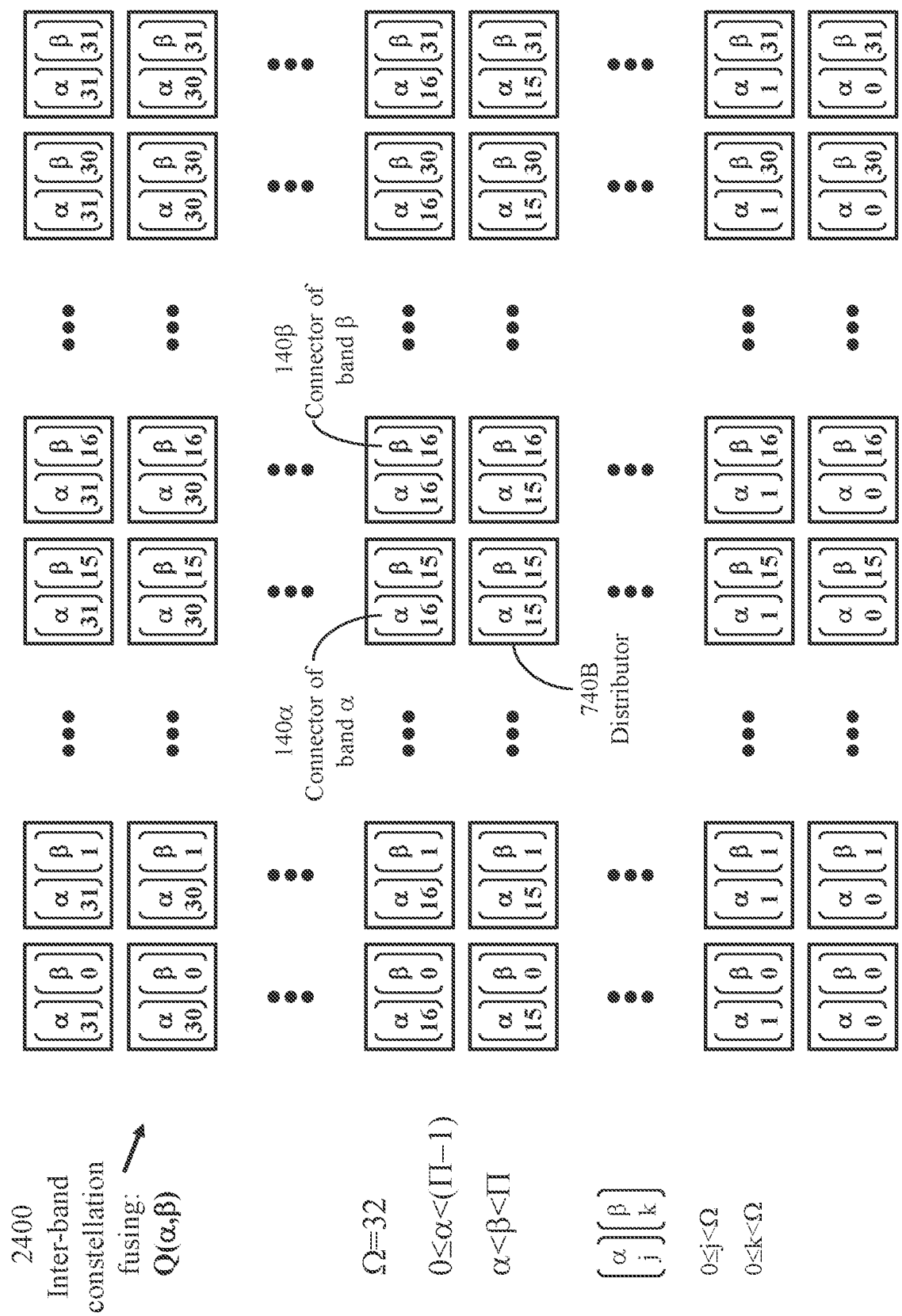
FIG. 24 details a configuration of an inter-band constellation.

FIG. 24 details a configuration 2400 of an inter-band constellation 2140 for the case of $\Omega=32$. The constellation comprises $\Omega^2$ distributors 740B each connecting to a respective pair of access groups. An inter-band constellation $Q(\alpha, \beta)$, $0 \leq \alpha < (\Pi-1)$, $\alpha < \beta < \Pi$, comprises distributors 740B connecting to access-group pairs of indices $\{(\alpha \times \Omega+j), (\beta \times \Omega+k)\}$ for all integers j and k in the range $0 \leq j < \Omega$ and $0 \leq k < \Omega$. For $\Omega=32$, $\alpha=0$, $\beta=1$, the indices of the access-group pairs are $\{j,k\}$, $0 \leq j < 32$ and $32 \leq k < 64$. For $\Omega=32$, $\alpha=14$, and $\beta=15$, the indices of the access-group pairs are $\{j,k\}$, $448 \leq j < 480$ and $480 \leq k < 512$. The notation [α j] [β k] in FIG. 24 denotes an inter-band distributor fusing a connector group of index $(\alpha \times \Omega+j)$, belonging to connector-band $\alpha$, and a connector group of index $(\beta \times \Omega+k)$, belonging to connector-band $\beta$.

Figure 25:
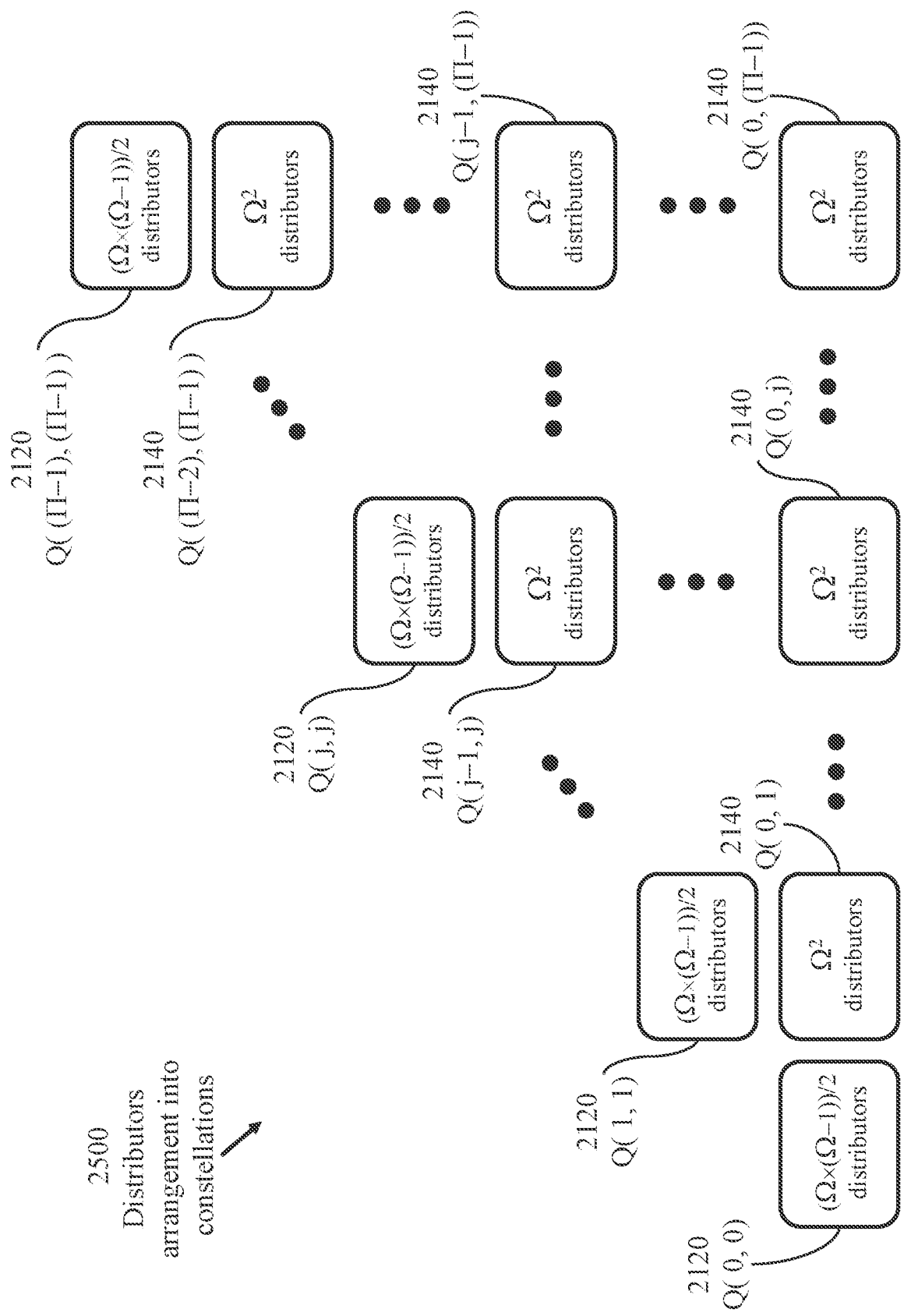
FIG. 25 illustrates arrangement of distributors of a large-scale network into spatially distributed constellations, in accordance with an embodiment of the present invention.

FIG. 25 illustrates arrangement 2500 of distributors of a large-scale network into spatially distributed constellations comprising $\Pi$ intra-band constellations $Q(\alpha,\alpha)$, $0 \leq \alpha < \Pi$, (reference 2120) and $((\Pi \times (\Pi-1))/2$ inter-band constellations $Q(\alpha,\beta)$, $0 \leq \alpha < (\Pi-1)$, $\alpha < \beta < \Pi$ (reference 2140). Each intra-band constellation 2120 comprises at most $(\Omega \times (\Omega-1))/2$ distributors and each inter-band constellation 2140 comprises at most $\Omega^2$ distributors.

Figure 26:
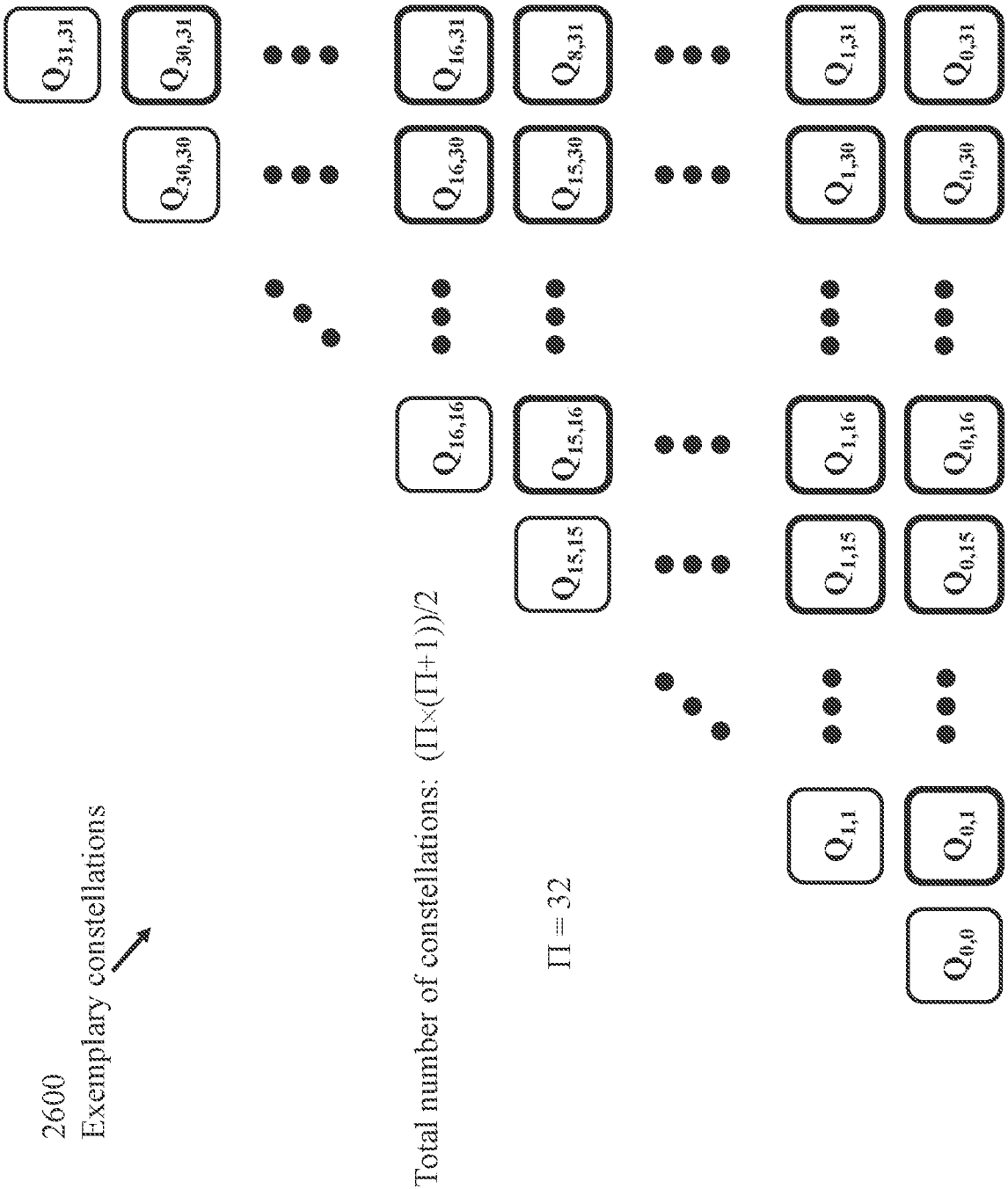
FIG. 26 further illustrates the constellations of FIG. 25.

FIG. 26 illustrates a plurality 2600 of constellations of distributors interconnecting 32 access groups.

Figure 27:
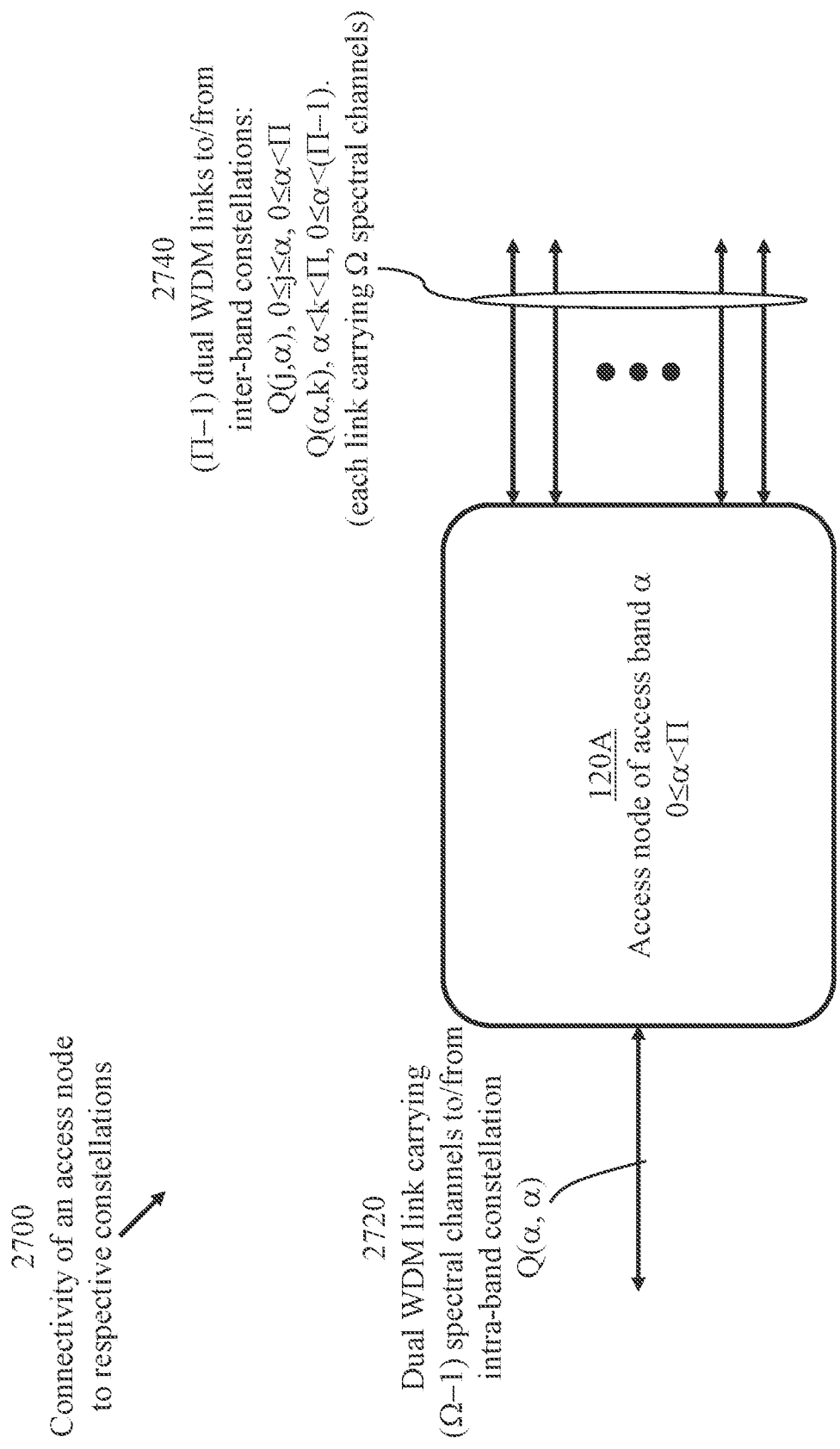
FIG. 27 illustrates connectivity of an access node of a specific access-band to a respective intra-band constellation and a respective set of inter-band constellations, in accordance with an embodiment of the present invention.

FIG. 27 illustrates connectivity 2700 of an access node of a specific access-band 1820 to a respective intra-band constellation 2120 and a respective set of inter-band constellations 2140. Each access node 120 connects to an intra-band constellation 2120 and $(\Pi-1)$ inter-band constellations 2140.

An access node 120 of an access group 420 belonging to an access band of index $\alpha$, $0 \leq \alpha < \Pi$, connects to an intra-band constellation 2120, denoted $Q(\alpha, \alpha)$, through a dual WDM link 2720 carrying $(\Omega-1)$ spectral bands (spectral channels) and connects to each of $(\Pi-1)$ inter-band constellations 2140 through a respective dual WDM link 2740 carrying $\Omega$ spectral channels. The $(\Pi-1)$ inter-band constellations are determined as:

$Q(j,\alpha)$, $0 \leq j \leq \alpha$, for $0 \leq \alpha < \Pi$, and $Q(\alpha,k)$, $\alpha < k < \Pi$, for $0 \leq \alpha < (\Pi-1)$.

Referring to FIG. 26, with $\Pi=32$, an access node 120 of an access group 420 belonging to access band of index 0, i.e., $\alpha=0$, connects to constellations:

$Q(j,\alpha)$, $0 \leq j \leq \alpha$, which is $Q(0,0)$, and $Q(\alpha,k)$, $\alpha < k < \Pi$, which are $\{Q(0,1), Q(0,2), \ldots, Q(0, 31)\}$.

An access node 120 of an access group 420 belonging to access band of index 16, i.e., $\alpha=16$, connects to constellations:

$Q(j,\alpha)$, $0 \leq j \leq \alpha$, which are $\{Q(0,16), Q(1, 16), \ldots, Q(16,16)\}$, and $Q(\alpha,k)$, $\alpha < k < \Pi$, which are $\{Q(16,17), Q(16, 18), \ldots, Q(16,31)\}$.

An access node 120 of an access group 420 belonging to access band of index 31, i.e., $\alpha=31$, connects to constellations:

$Q(j,\alpha)$, $0 \leq j \leq \alpha$, which are $\{Q(0,31), Q(1, 31), \ldots, Q(31,31)\}$.

Since $\alpha$ does not meet the requirement $0 \leq \alpha < (\Pi-1)$, $Q(j,\alpha)$, $0 \leq j \leq \alpha$, covers all relevant constellations for the access band of index 31.

Figure 28:
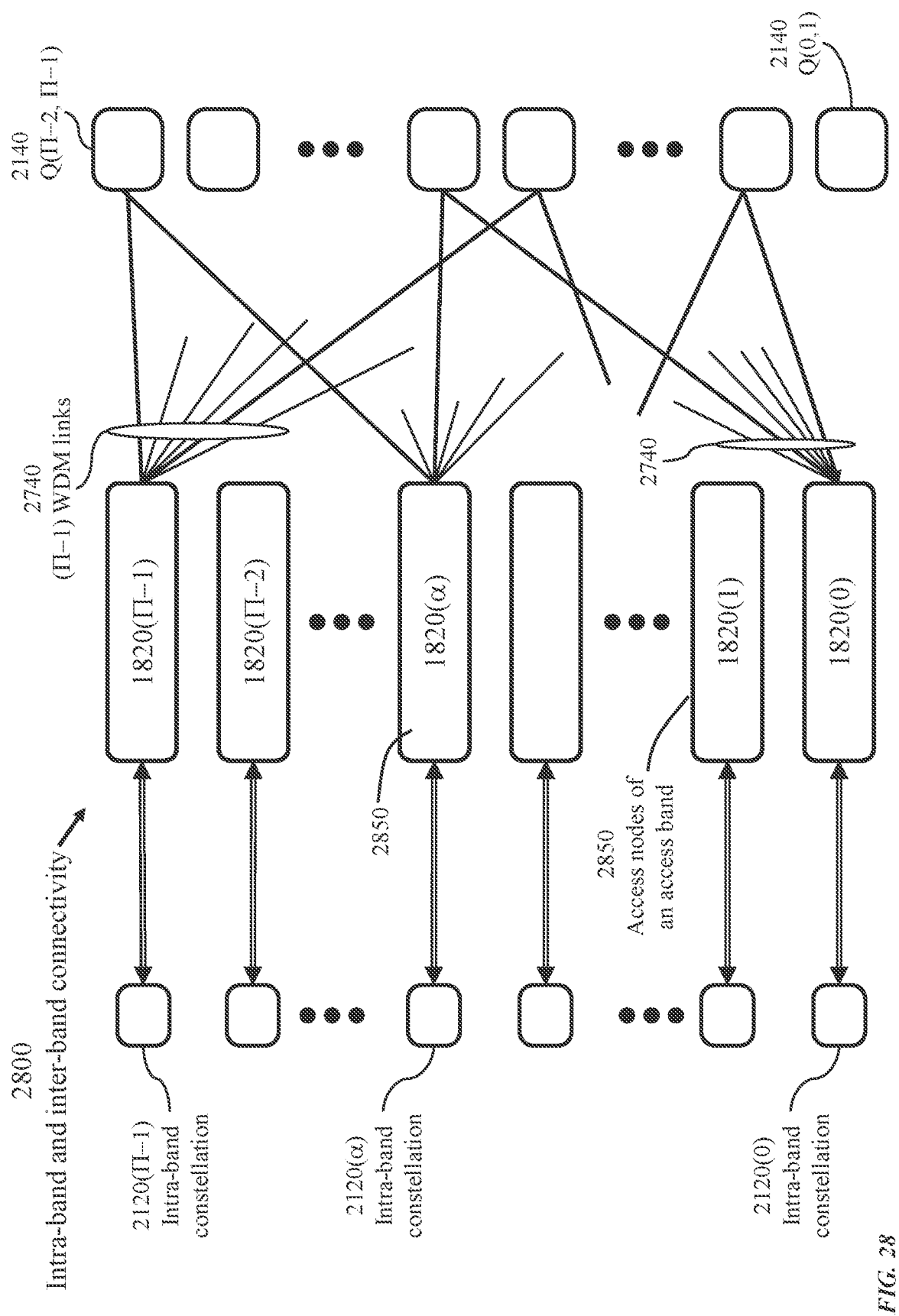
FIG. 28 illustrates global network connectivity of all access bands to intra-band constellations and inter-band constellations, in accordance with an embodiment of the present invention.

FIG. 28 illustrates global network connectivity 2800 of all access bands 1820 to intra-band constellations 2120 and inter-band constellations 2140. The access bands 1820 are individually identified as 1820(0) to 1820($\Pi$-1). As described above, the network comprises p access groups 420 and corresponding μ connector groups 460. The access groups are organized into $\Pi$ access bands 1820 and the connector groups are organized into $\Pi$ corresponding connector bands 1840. Each connector group 460 is fused with each other connector group so that each pair of connector groups 460 has one common distributor. Distributors combining connectors of a same connector group form an intra-band constellation. Distributors combining connectors of a pair of different connector bands form an inter-band constellation as illustrated in FIG. 21. Thus, mutual fusing of the p connector groups 460 produces $\Pi$ intra-band constellations 2120 and $(\Omega \times (\Omega-1))/2$ inter-band constellations 2140.

As illustrated in FIG. 28, each access node 120 of an access band 1820 has one dual WDM link 2720 carrying $(\Omega-1)$ dual channels to an intra-band constellation and $(\Pi-1)$ dual WDM links 2740, each carrying $\Omega$ dual channels to a respective inter-band constellation.

Figure 29:
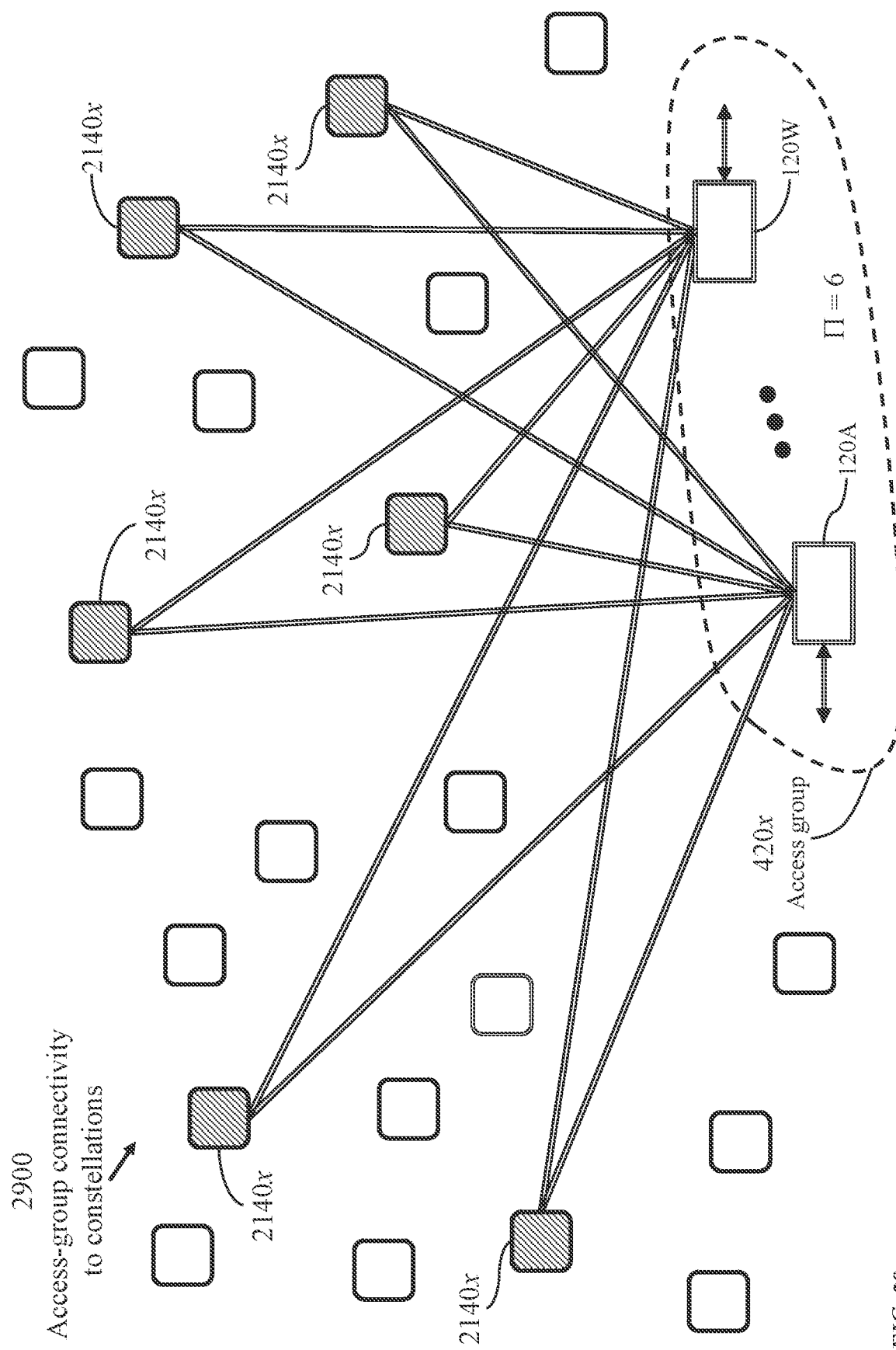
FIG. 29 illustrates connectivity of an access group to a respective set of constellations, in accordance with an embodiment of the present invention.

FIG. 29 illustrates connectivity 2900 of an access group 420x, comprising a number of access nodes 120 (120A, ..., 120W), to a respective set of constellations of a network. An access group 420 of index x, $0 \leq x < \mu$, belongs to an access band 1820 of index $\alpha$, $\alpha = \lfloor x/\Omega \rfloor$. The constellations to which each access node of the access group connects are determined as described in FIG. 27. The network comprises Π intra-band constellations 2120 and (Π×(Π−1))/2 inter-band constellations 2140. In the example of FIG. 29, Π=6. Hence, the network comprises 6 intra-band constellations 2120 and 15 inter-band constellations 2140.

Each access node of the access group connects to the same six constellations. One of the six constellations is an intra-band constellation 2120x and the remaining five constellations are inter-band constellations 2140x. Each access node of the access group 420x connects to the intra-band constellation 2120x through a dual WDM link carrying (Ω−1) dual channels and connects to each of the five inter-band constellations 2140x through a dual WDM link carrying Ω dual channels. Detailed connectivity of a dual WDM link to distributors of a constellation is illustrated in FIGS. 33 to 41.

Figure 30:
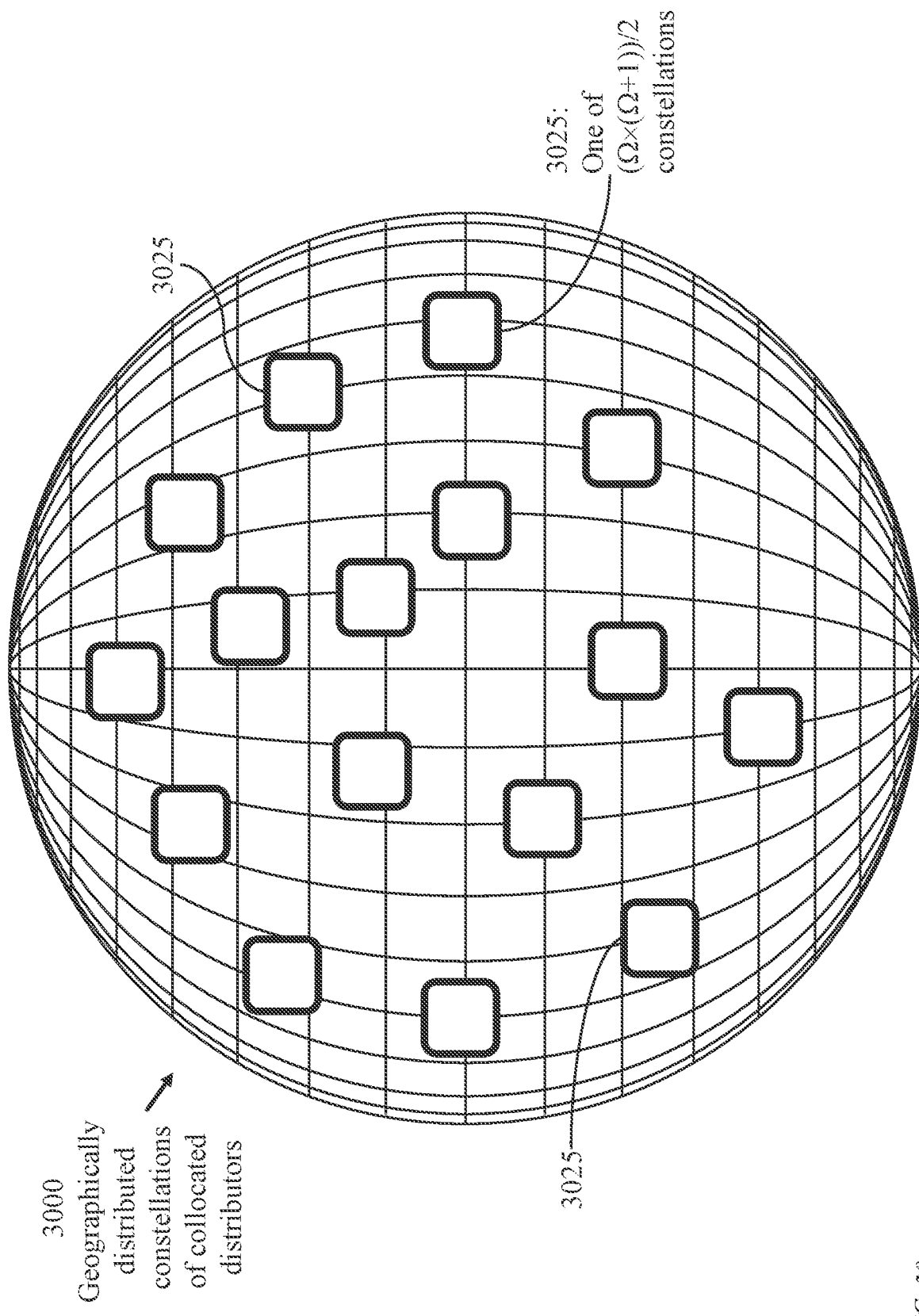
FIG. 30 illustrates a plurality of geographically distributed constellations of collocated distributors, in accordance with an embodiment of the present invention.

FIG. 30 illustrates a plurality 3000 of geographically distributed constellations of collocated distributors 3025. A constellation 3025 may be an intra-band constellation 2120 or an inter-band constellation 2140. Arrangement of the distributors into constellations 3025 is preferable to individual placement of the distributors. The distributors of a constellation are collocated.

In a network of global coverage, the access nodes 120 are naturally spread as illustrated in FIG. 8 for proximity to respective data sources and sinks. As illustrated in FIG. 9, the distributors may be geographically spread over a wide area. In order to exploit WDM economy, a layer of spectral routers (also known as optical cross-connectors) may be interposed between the access nodes and the distributors. However, arranging the distributors into constellations as described above eliminates the need for a layer of cross connectors.

Figure 31:
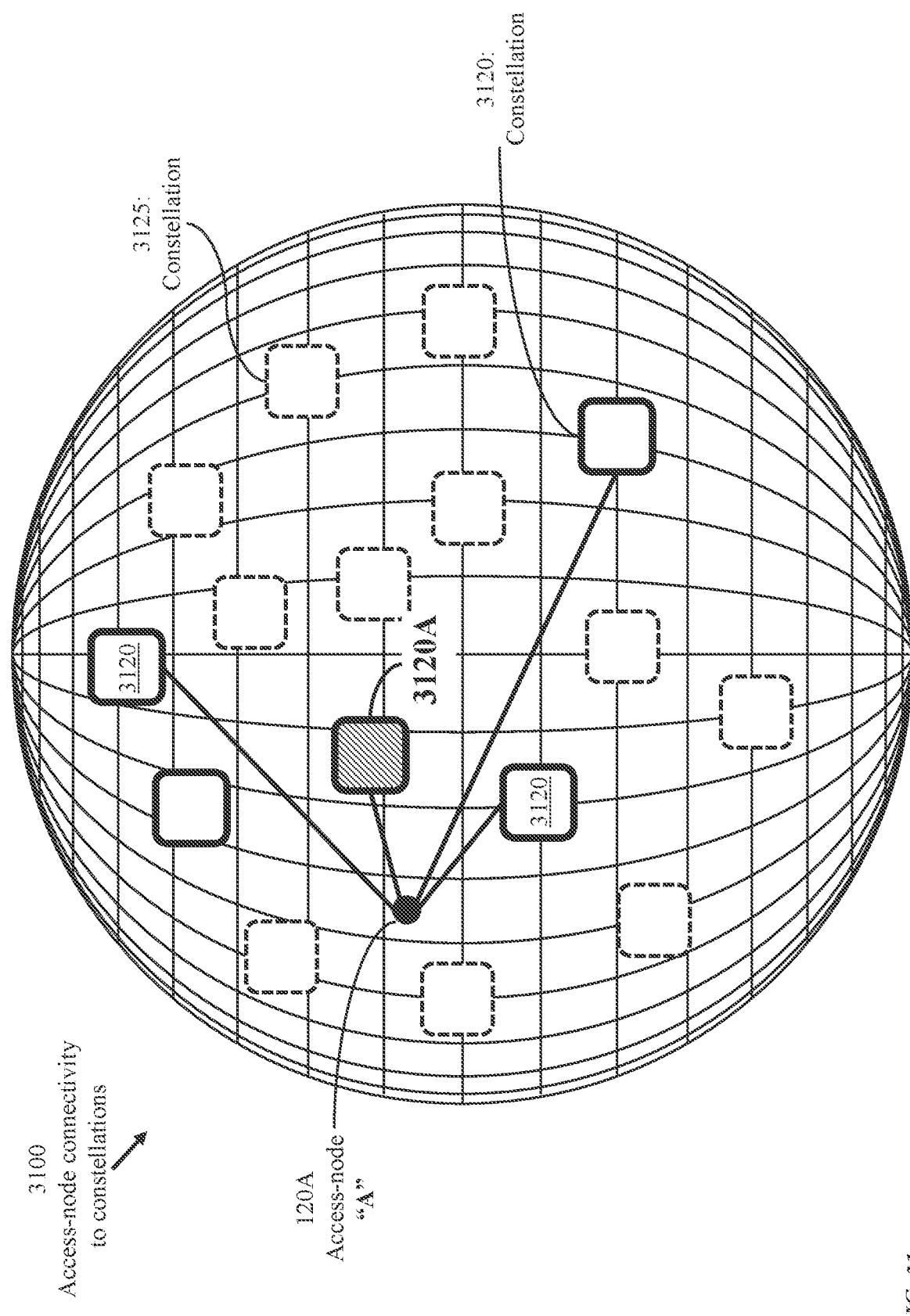
FIG. 31 illustrates connectivity of a first access node, belonging to a first access band, to a first set of constellations of which four constellations are indicated, in accordance with an embodiment of the present invention.

FIG. 31 illustrates connectivity 3100 of a first access node 120A, belonging to a first access band, to a first set of constellations 3120 of which four constellations 3120 are indicated. The remaining constellations 3125 connect to access nodes of other access bands.

Figure 32:
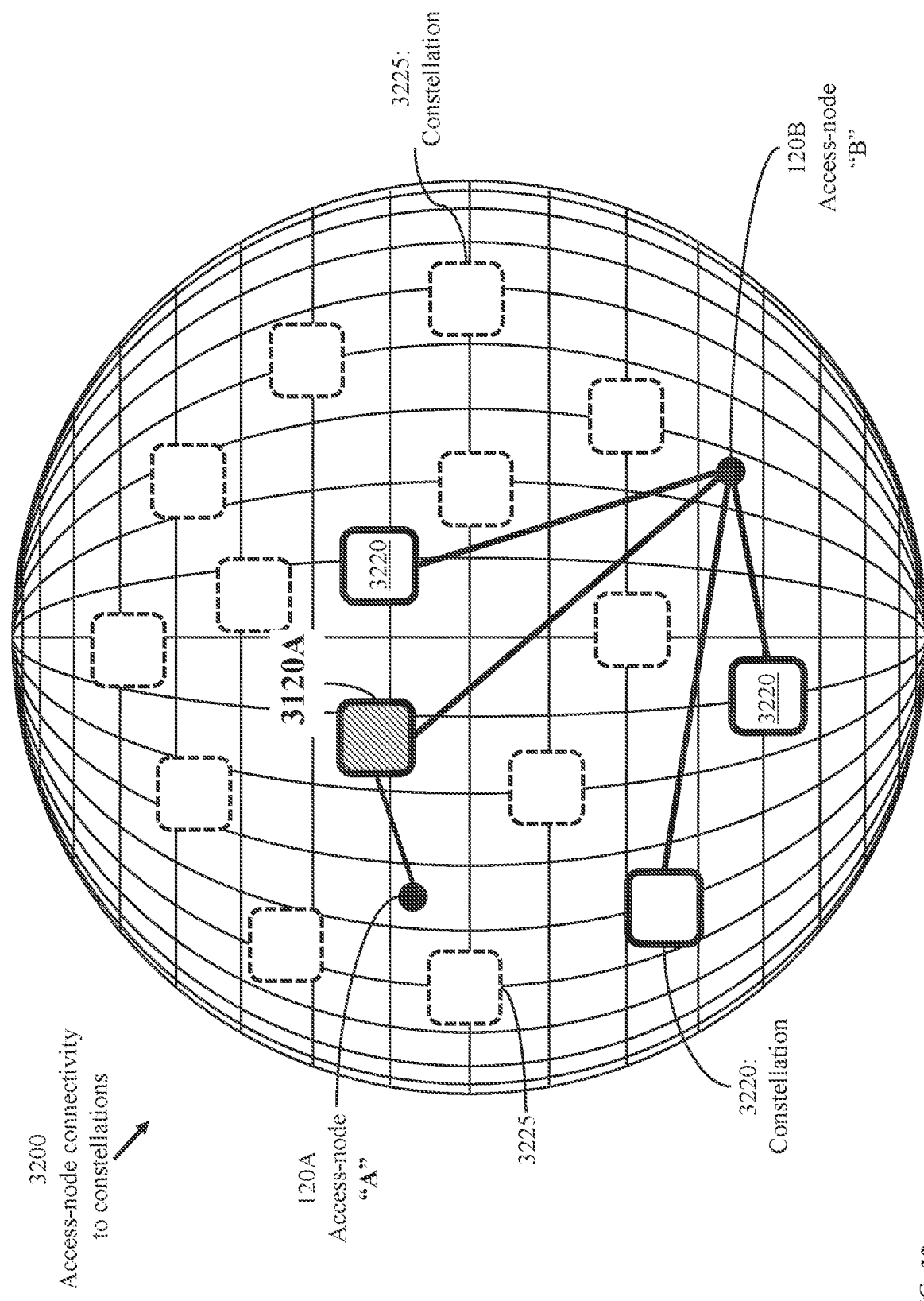
FIG. 32 illustrates connectivity of a second access node, belonging to a second access band, to a second set of constellations of which four constellations are indicated, with the first set of constellations and the second set of constellations having one common constellation, in accordance with an embodiment of the present invention.

FIG. 32 illustrates connectivity 3200 of a second access node 120B, belonging to a second access band, to a second set of constellations 3220 of which four constellations 3220 are indicated. The remaining constellations 3225 connect to access nodes of other access bands. The first set of constellations 3120 and the second set of constellations 3220 intersect in one constellation 3120A. Thus, each access node 120 of the first access band has a path to each access node 120 of the second access band traversing only one distributor of the common constellation 3120A.

As described above, each pair of access groups 420 connects to a common distributor 740. Consequently, each pair of access groups 420 connects to a common constellation and each pair of access nodes 120 belonging to different access groups 420 connects to a common constellation. Access node 120A of FIG. 31 has a dual WDM link to constellation 3120A and access node 120B of FIG. 32 has a dual WDM link to constellation 3120A.

As illustrated in FIG. 27, each access node 120 connects to an intra-band constellation through a respective dual WDM link 2720 carrying (Ω−1) dual spectral channels and connects to each of (Π−1) inter-band constellations through a respective dual WDM link 2740 carrying Ω dual channels.

FIG. 33 illustrates internal connectivity 3300 of an inter-band constellation 2140. An inter-band constellation 2140 connects each access node 120 of an access band 1820 of index α, denoted 1820(α), to each access node of an access band 1820 of index β, denoted 1820(β), 0≤α<(Π−1), α<β<Π, through a respective distributor 740. An access band comprises Ω access groups 420 each comprising a respective number of access nodes 120 which are generally geographically distributed. The inter-band constellation connects each access node 120 of each access group 420 of index x, α×Ω≤x≤(α×Ω+Ω−1), to each access node 120 of each access group of index y, β×Ω≤y≤β×Ω+Ω−1. A distributor connecting to an access group 420 of index x and an access group 420 of index y is herein referenced as D(x,y).

Each access node 120 of access band 1820(α) connects to a respective dual WDM link 3310 carrying Ω dual spectral channels 3316 which connects to a respective spectral demultiplexer 3312 and a spectral multiplexer 3314. A dual WDM link 3310 connecting an access node 120 of an access group 420 of index x, α×Ω≤x≤(α×Ω+Ω−1), is referenced as 1310(x). A spectral demultiplexer connecting to dual WDM link 3310(x) is referenced as 3312(x). A spectral multiplexer connecting to dual WDM link 3310(x) is referenced as 3314(x).

Each access node 120 of access band 1820(β) connects to a respective dual WDM link 3320 carrying Ω dual spectral channels 3326 which connects to a respective spectral demultiplexer 3322 and a spectral multiplexer 3324. A dual WDM link 3320 connecting an access node 120 of an access group 420 of index y, β×Ω≤y≤(β×Ω+Ω−1), is referenced as 3320(y). A spectral demultiplexer connecting to dual WDM link 3320(y) is referenced as 3312(y). A spectral multiplexer connecting to dual WDM link 3320(y) is referenced as 3314(y).

A spectral demultiplexer 3312(x) separates incoming channels of a WDM link 1310(x) into Ω channels (upstream channels od dual channels 3316) each directed to a distributor of a respective set of distributors. Each of the Ω channels of an access node of access group of index x, α×Ω≤x≤(α×Ω+Ω−1), connects to a respective distributor D(x, y), β×Ω≤y≤(β×Ω+Ω−1). The spectral multiplexer 3314(x) combines Ω channels directed to an access node of the access group of index x, from distributors D(x, y), β×Ω≤y≤ (β×Ω+Ω−1) to be transferred through WDM link 3310(x) to the access node.

Likewise, a spectral demultiplexer 3322(y) separates incoming channels of a WDM link 3320(y) into Ω channels each directed to a distributor of a respective set of distributors. Each of the Ω channels of an access node of access group of index y, β×Ω≤y≤(β×Ω+Ω−1), connects to a respective distributor D(x, y), α×Ω≤x≤(α×Ω+Ω−1). The spectral multiplexer 3324(y) combines Ω channels directed to an access node of the access group of index y from distributors D(x, y), α×Ω≤x≤(α×Ω+Ω−1) to be transferred through WDM link 3320(y) to the access node.

Figure 34:
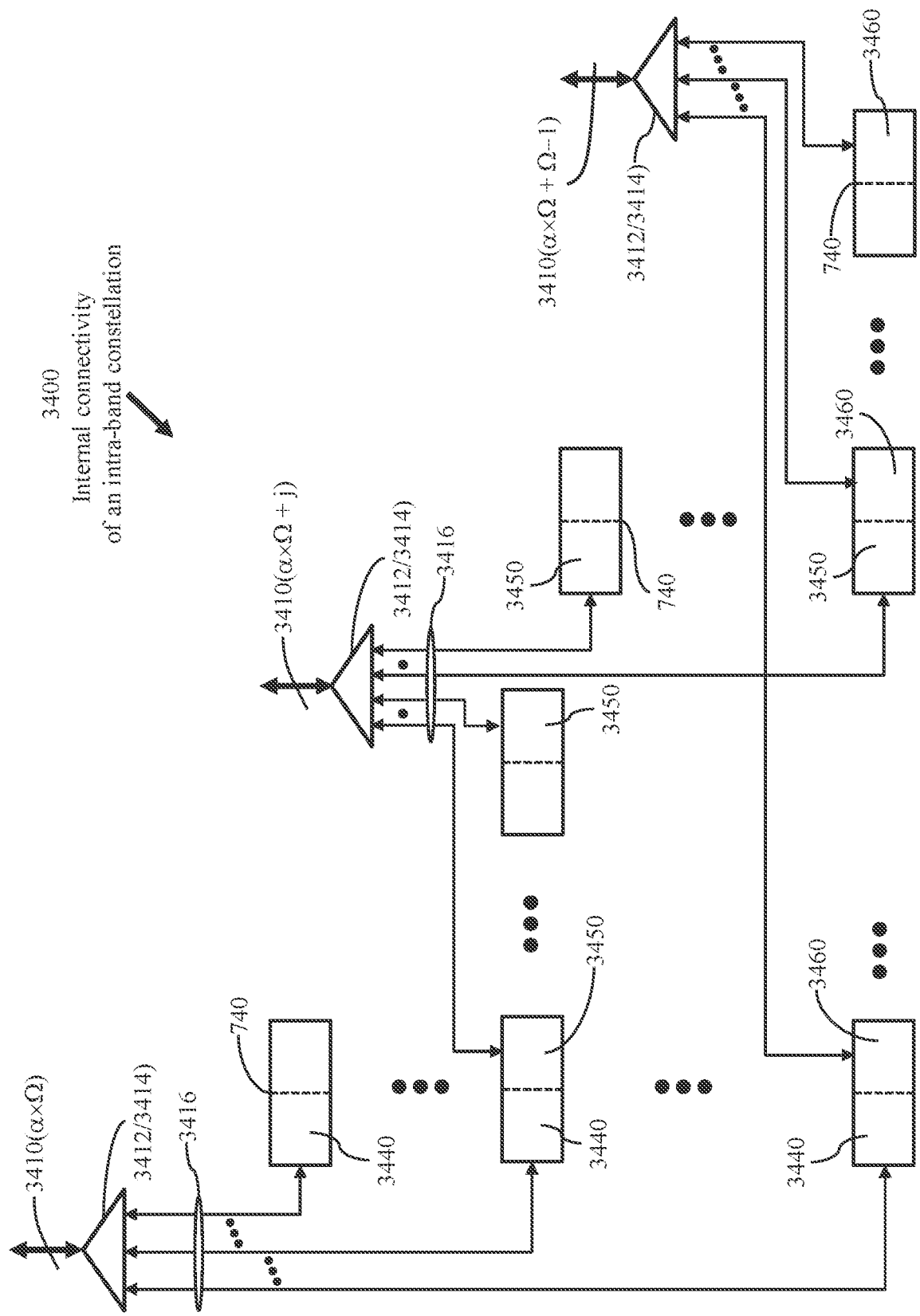
FIG. 34 illustrates internal connectivity of an intra-band constellation, in accordance with an embodiment of the present invention.

FIG. 34 illustrates an internal connectivity 3400 of an intra-band constellation 2120. An intra-band constellation 2120 connects each access node 120 of an access group of an access band to each access node 120 of each other access group of the same access band through a respective distributor 740. Each access node 120 of access band 1820(α), 0≤α<Π, connects to an intra-band constellation through a respective dual WDM link 3410 carrying (Ω−1) dual spectral channels which connects to a respective spectral demultiplexer 3412 and a spectral multiplexer 3414. A dual WDM link 3410 connecting an access node 120 of an access group 420 of index x, α×Ω≤x≤(α×Ω+Ω−1), is referenced as 3410(x). A spectral demultiplexer connecting to dual WDM link 3410(x) is referenced as 3412(x). A spectral multiplexer connecting to dual WDM link 3410(x) is referenced as 3414(x). Access groups 420 of indices α×Ω, (α×Ω+j), and (α×Ω+Ω−1), identified as 3440, 3450, and 3460, respectively, connect to respective distributors 740 as indicated.

As described above, an intra-band constellation Q(α,α), 0≤α<Π, comprises distributors 740 connecting to access-group pairs of indices (j, k) for all integers j and k in the range α×Ω≤j<(α×Ω+Ω−1) and j<k<(α×Ω+Ω).

A spectral demultiplexer 3412(x) separates incoming channels of a WDM link 3410(x) into (Ω−1) channels each directed to a distributor of a respective set of distributors. Each of the (Ω−1) channels of an access node of access group of index x, α×Ω≤x≤(α×Ω+Ω−1), connects to one of distributors:

$D(r,x)$, α×Ω≤r<x, for x≠α×Ω, and $D(x,y)$, x<y≤(α×Ω+Ω−1), for x≠(α×Ω+Ω−1).

The spectral multiplexer 3414(x) combines (Ω−1) channels directed to an access node of the access group of index x, from the same distributors D(r, y) and D(x, y), to be transferred through WDM link 3410(x) to the access node.

Figure 35:
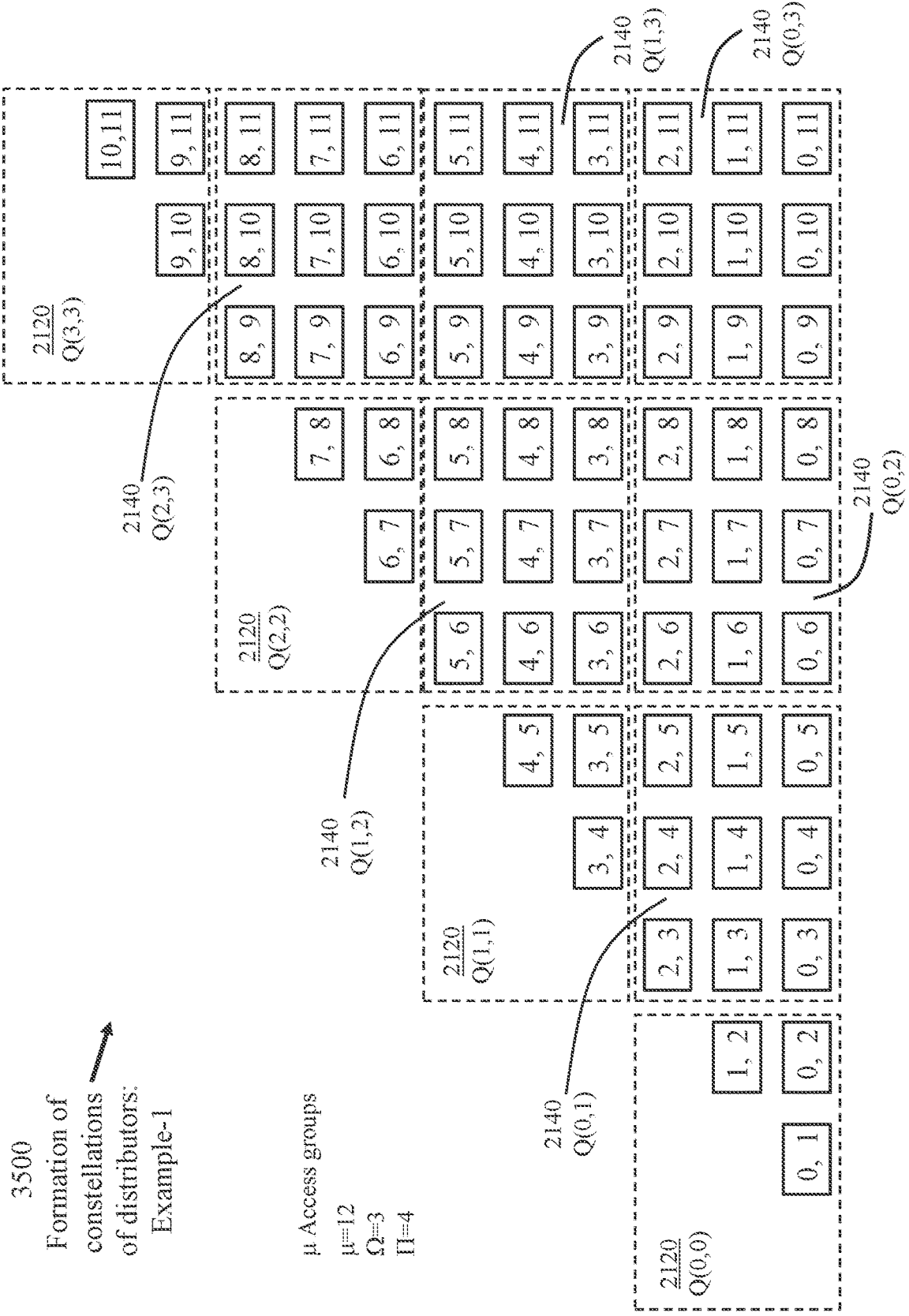
FIG. 35 illustrates a first example of constellations of distributors for a network comprising 12 access groups arranged into four access bands.

FIG. 35 illustrates a first example 3500 of constellations of distributors for a network comprising 12 access groups (μ=12) arranged into four access bands (Π=4). Indices of access-groups connecting to each distributor are indicted. The network comprises Π intra-band constellations 2120, each comprises (Ω×(Ω−1))/2 distributors, and (Π×(Π−1))/2 inter-band constellations, each comprising $Ω^2$ distributors. The intra band distributors are labeled Q(0,0), Q(1,1), Q(2,2), and Q(3,3). The inter-band distributors are labeled Q(0,1), Q(0,2), Q(0,3), Q(1,2), Q(1,3), and Q(2,3). A distributor connecting to a first access group 420, comprising $m_1$ access nodes 120, and a second access group 420, comprising $m_2$ access nodes 120, comprises a distributing mechanism supporting at least ($m_1+m_2$) dual ports.

FIG. 36 illustrates a second example 3600 of constellations of distributors for a network comprising 12 access groups (μ=12) arranged into three access bands (Π=3). The network comprises three intra-band constellations 2120, labeled Q(0,0), Q(1,1), and Q(2,2), and three inter-band constellations 2140 labeled Q(0,1), Q(0,2), and Q(1,2).

FIG. 37 illustrates internal connectivity 3700 of the inter-band constellation of FIG. 33, with Ω=4, Π=3, α=0, and β=2. The inter-band constellation connects each access node 120 of an access band 1820(0), to each access node of access band 1820(2). With Ω=4, the constellation connects each access node 120 of each access group 420 of index x, 0≤x≤3, to each access node 120 of each access group of index y, 8≤y≤11. Each access node 120 of access band 1820(0) connects to a respective dual WDM link 3310, carrying four dual spectral channels, which connects to a respective spectral demultiplexer 3312 and a spectral multiplexer 3314.

A spectral demultiplexer 3312(x), 0≤x≤3, separates incoming channels of a WDM link 3310(x) into four channels each directed to one of distributors D(x,8), D(x,9), D(x,10), and D(x,11). The spectral multiplexer 3314(x) combines four channels from distributors D(x,8), D(x,9), D(x,10), and D(x,11) to be transferred through WDM link 3310(x) to the access node.

Likewise, a spectral demultiplexer 3322(y), 8≤y≤11, separates incoming channels of a WDM link 3320(y) into four channels each directed to one of distributors D(0,y), D(1,y), D(2,y), and D(3,y). A spectral multiplexer 3324(y) combines four channels from distributors D(0,y), D(1,y). D(2,y), and D(3,y) to be transferred through WDM link 3320(y) to the access node.

For each value of x, 0≤x≤3, the illustrated spectral demultiplexer 3312(x), is one of $m_x$, $m_x$>1, spectral demultiplexers and the spectral multiplexer 3314(x) is one of $m_z$ spectral multiplexers connecting to $m_x$ access nodes 120 of an access group 420 of index x of the access band of index 0.

Figure 38:
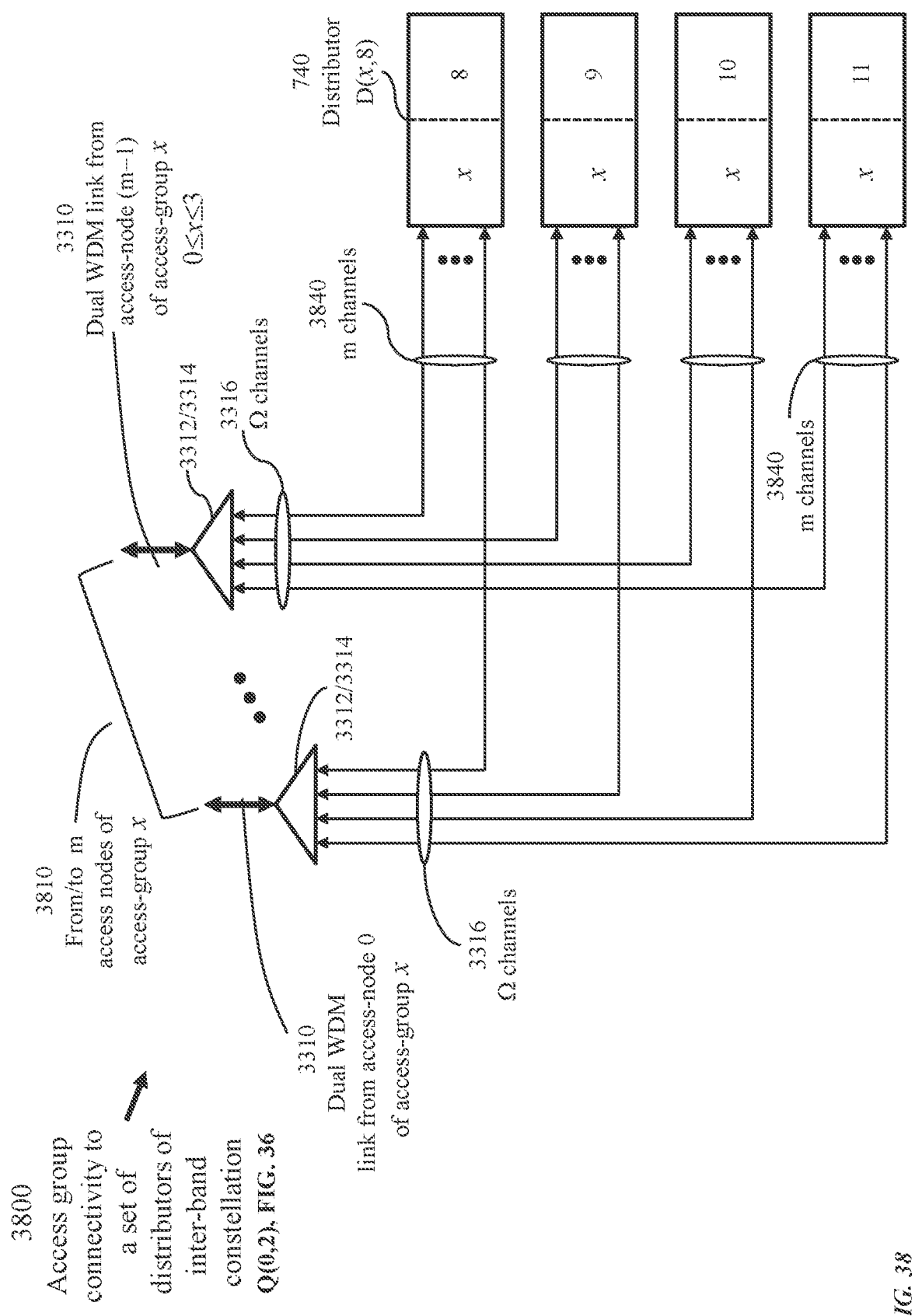
FIG. 38 illustrates connectivity of an access group of a first access band to respective distributors of the inter-band constellation of FIG. 37.

FIG. 38 illustrates access-group connectivity 3800 of an access-group of a first access band to distributors of an inter-band constellation Q(0,2), with Ω=4 (FIG. 36). Each dual WDM link of a set 3810 of m dual WDM links 3310 from access nodes 120 of an access group 420 of the first access band carries Ω dual channels. Each dual link 3310 connects to a spectral demultiplexer 3312 which separates the Ω upstream channels and directs each upstream channel to one of Ω distributors 740 individually identified as D(x,8), D(x,9), D(x,10), and D(x,11), 0≤x<4. Each spectral multiplexer 3314 combines channels from distributors D(x,8), D(x,9), D(x,10), and D(x,11), 0≤x<4, to form a WDM signal to be transmitted to a respective access node of the access group of the first access band. Thus, each of distributors D(x,8), D(x,9), D(x,10), and D(x,11) connects to m dual channels 3840, one dual channel from/to each of the access nodes of the access group.

Figure 39:
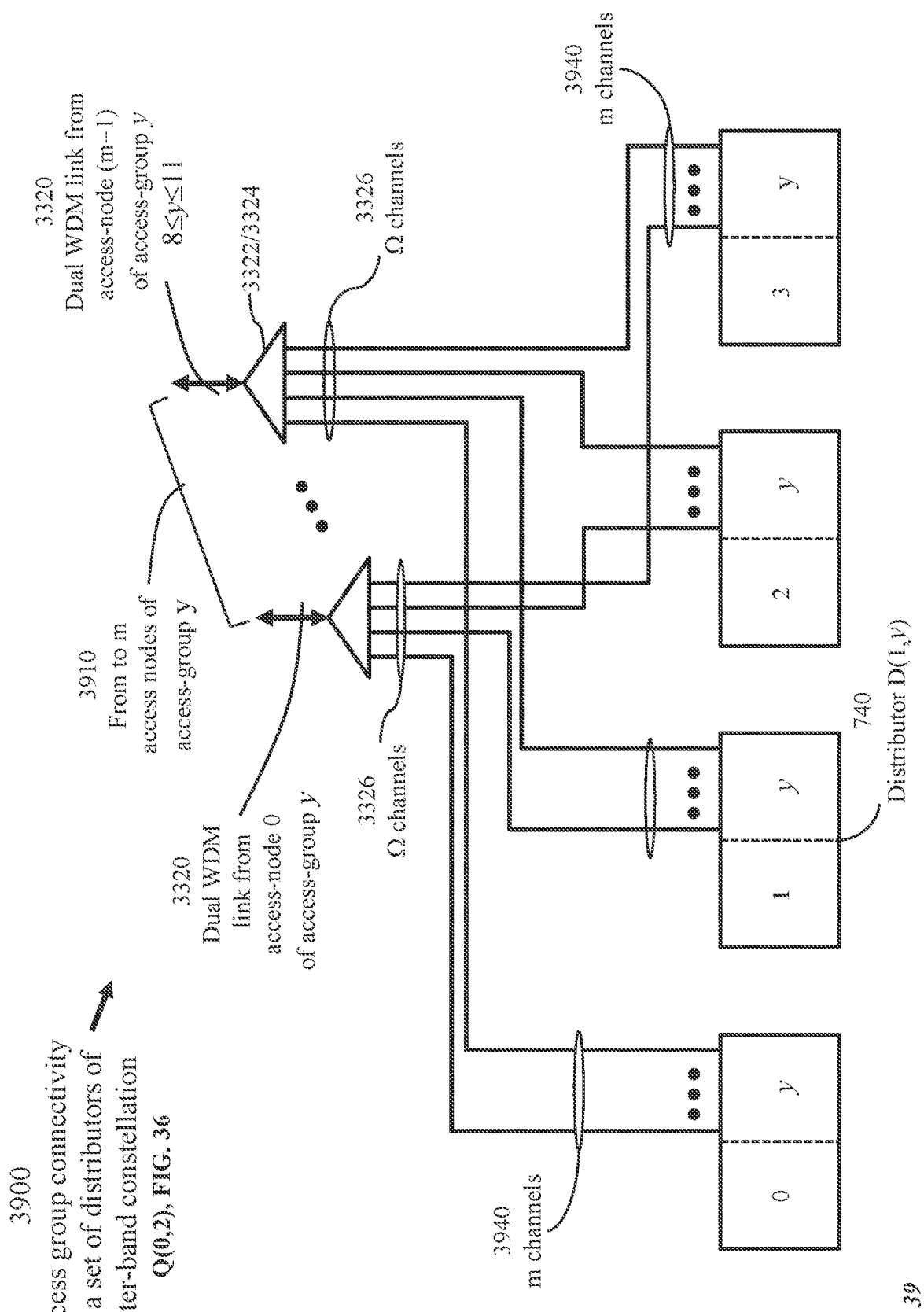
FIG. 39 illustrates connectivity of an access group of a second access band to respective distributors of the inter-band constellation of FIG. 37.

FIG. 39 illustrates access-group connectivity 3900 of an access-group of a second access band to distributors of the inter-band constellation Q(0,2), with Ω=4 (FIG. 36). Each dual WDM link of a set 3910 of m dual WDM links 3320 from access nodes 120 of an access group 420 of the second access band carries Ω dual channels. Each dual link 3320 connects to a spectral demultiplexer 3322 which separates the Ω upstream channels and directs each upstream channel to one of Ω distributors 740 individually identified as D(0,y), D(1,y), D(2,y), and D(3,y), 8≤y<12. Each spectral multiplexer 3324 combines channels from distributors D(0,y), D(1,y), D(2,y), and D(3,y), 8≤y<12, to form a WDM signal to be transmitted to a respective access node of the access group of the second access band. Thus, each of distributors D(0,y), D(0,y), D(0,y), and D(0,y), connects to m dual channels 3940, one dual channel from/to each of the access nodes of the access group.

Figure 40:
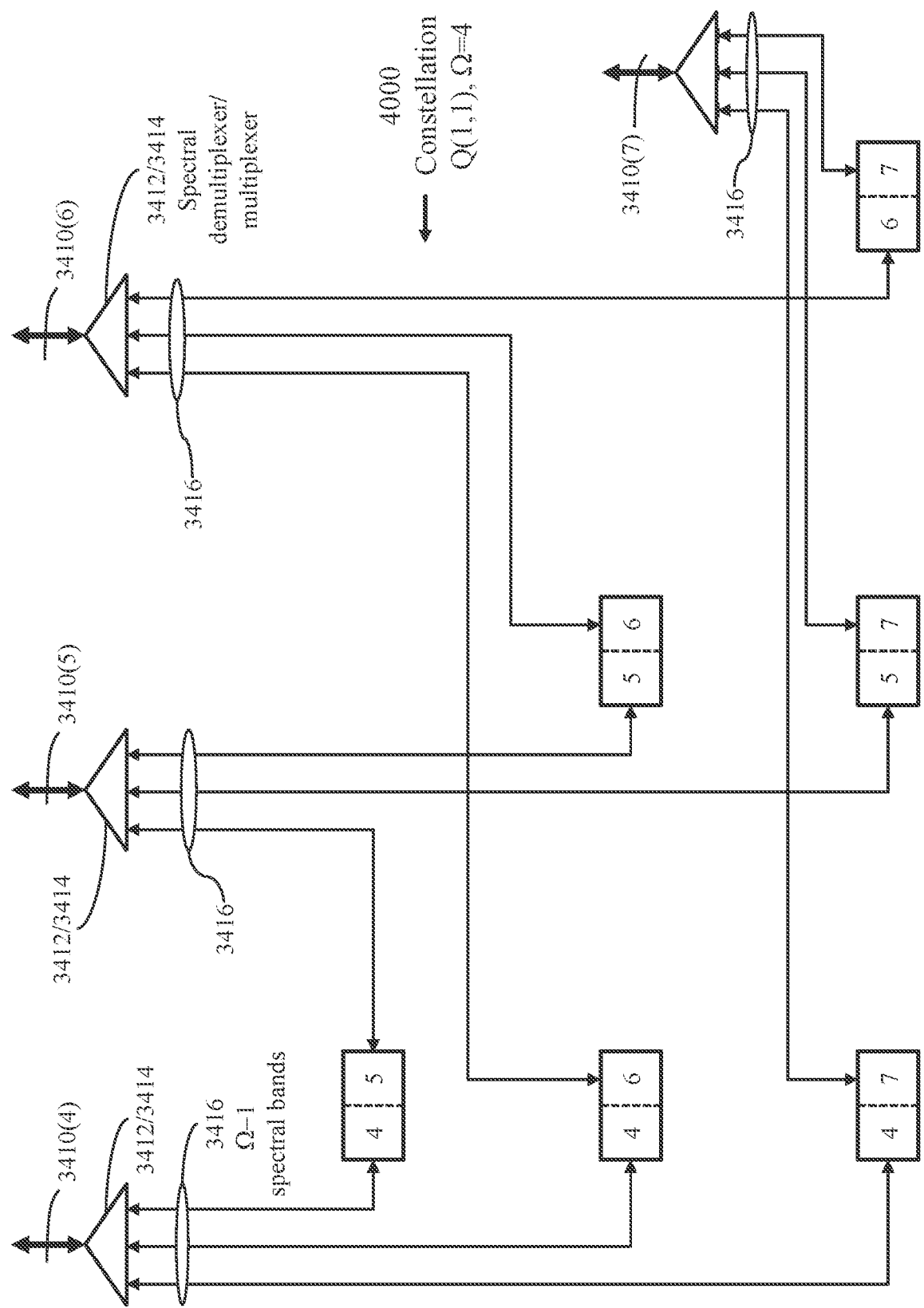
FIG. 40 illustrates internal connectivity of a specific intra-band constellation, in accordance with an embodiment of the present invention.

FIG. 40 illustrates internal connectivity 4000 of intra-band constellation for Ω=4, Π=3, and α=1 (Q(1,1), FIG. 36). The intra-band constellation connects each access node 120 of each access group 420 of access band 1820(1) to each access node 120 of each other access group 420 of the same access band.

Each access node 120 of access band 1820(1) connects to an intra-band constellation through a respective dual WDM link 3410 carrying (Ω−1) dual spectral channels which connects to a respective spectral demultiplexer 3412 and a respective spectral multiplexer 3414. Intra-band constellation Q(1,1) comprises distributors D(x,y) for all integers x and y in the range 4≤x<7 and x<y<8.

A spectral demultiplexer 3412(x) separates incoming channels of a WDM link 3410(x) into (Ω−1) channels each directed to a distributor of a respective set of distributors. Each of the (Ω−1) channels of an access node of access group of index x, α×Ω≤x≤(α×Ω+Ω−1), connects to one of distributors:

$D(r,x)$, α×Ω≤r<x, for x≠α×Ω, and $D(x,y)$, x<y≤(α×Ω+Ω−1), for x≠(α×Ω+Ω−1).

A spectral multiplexer 3414(x) combines (Ω−1) channels directed to an access node of the access group of index x, from the same distributors D(r, x) and D(x, y), to be transferred through WDM link 3410(x) to the access node.

For x=4, 4<y≤7, each of (Ω−1) channels 3416 connects to one of distributors D(4,5), D(4,6), and D(4,7).

For x=5, 5<y≤7, each of (Ω−1) channels 3416 connects to one of distributors D(4,5), D(4,6), and D(4,7).

For x=6, 6<y≤7, each of (Ω−1) channels 3416 connects to one of distributors D(4,6), D(5,6), and D(6,7).

For x=7, each of (Ω−1) channels 3416 connects to one of distributors D(4,7), D(5,7), and D(6,7).

FIG. 41 illustrates internal connectivity 4100 of a large-scale inter-band constellation 2140, Q(2,11), Ω=32, Π>11. The inter-band constellation 2140 connects each access node 120 of a first access band of index 2 (α=2) to each access node of a second access band of index 11 (β=11) through a respective distributor 740. The inter-band constellation connects each access node 120 of each access group of index x, 64≤x≤95, to each access node 120 of each access group of index y, 352≤y≤383.

A spectral demultiplexer 3312(x), 64≤x≤95, separates incoming channels of a WDM link from an access node of the first access band into Ω channels each directed to a distributor of a respective set of distributors. Each of the Ω channels of an access node of access group of index x connects to a respective distributor D(x, y), 352≤y≤383.

The spectral multiplexer 3314(x) combines Ω channels directed to an access node, of the access band of index 2, from distributors of a respective set of distributors to be transferred through a WDM link 3310 directed to the access node.

Likewise, a spectral demultiplexer 3322(y) separates incoming channels from an access node of the second access band into Ω channels each directed to a distributor of a respective set of distributors. Each of the Ω channels of an access node of access group of index y, 352<y<383, connects to a respective distributor D(x, y), 64≤x≤95. The spectral multiplexer 3324(y) combines Ω channels directed to an access node, of the access band of index 11, from distributors of a respective set of distributors to be transferred through a WDM link 3320 directed to the access node.

Figure 42:
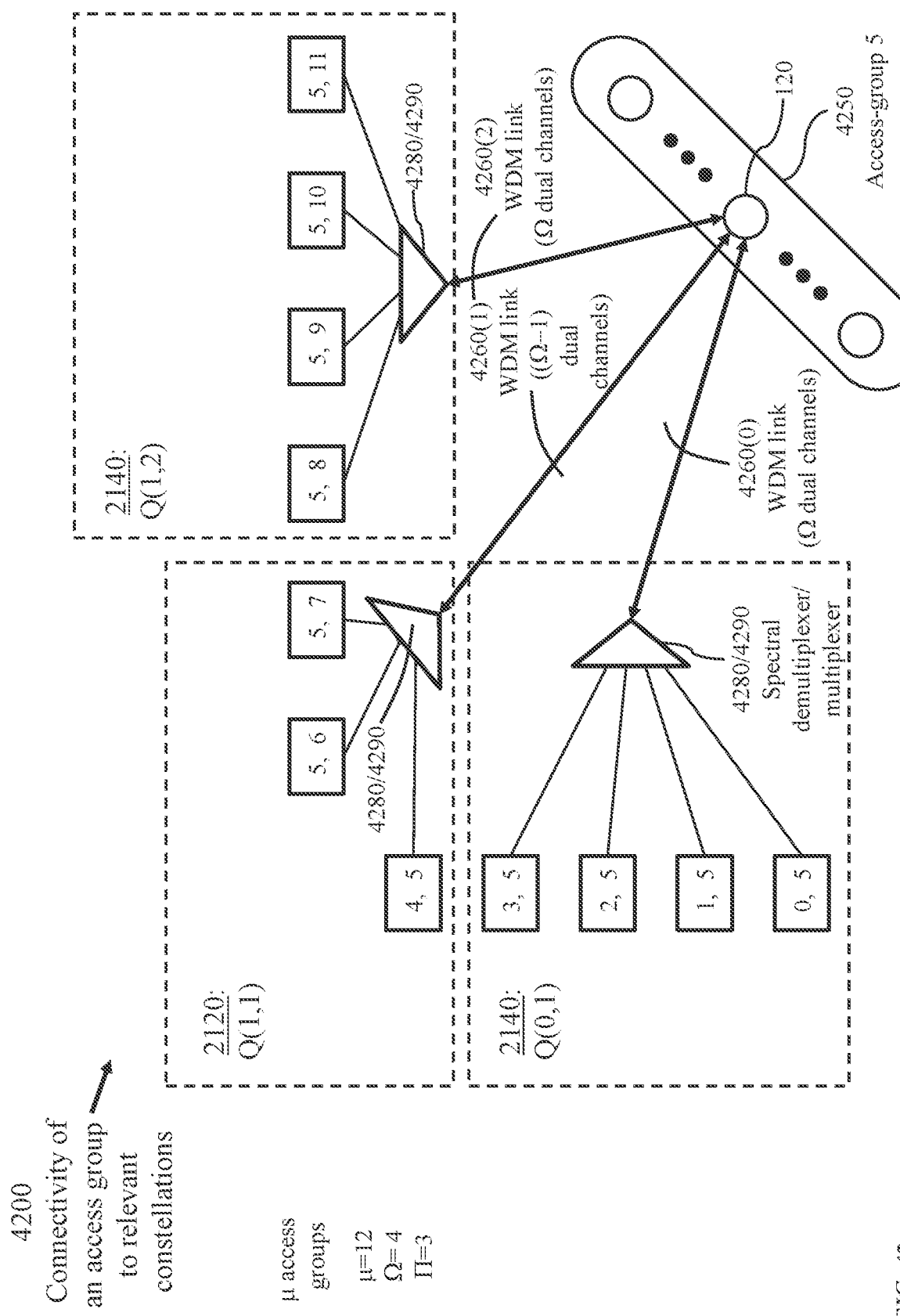
FIG. 42 illustrates connectivity of an access group to relevant constellations, in accordance with an embodiment of the present invention.

FIG. 42 details connectivity 4200 of an access group to relevant constellations of the network of FIG. 36 which comprises 12 access groups 420 (μ=12) arranged into three access bands (Π=3), each access band comprising four access groups 420 (Ω=4). As indicated in FIG. 36, access group 420(5) connects to (μ−1) distributors D(0,5), D(1,5), D(2,5), D(3,5), D(4,5), D(5,6), D(5,7), D(5,8), D(5,9), D(5,10), and D(5,11) which span three constellations: 2140 labeled Q(0,1), 2120 labeled Q(1,1), and 2140 labeled Q(1,2). Each access node 120 of access group 420(5) connects to each of the (μ−1) distributors. The illustrated access node 120x has Π dual WDM links 4260(0), 4260(1), and 4260(2) to the three constellations. Each of dual WDM links 4260(0) and 4260(2) connecting to inter-band constellations 2140 labeled Q(0,1) and Q(1,2) carries Ω dual channels. Dual WDM link 4260(1) to intra-band constellation 2120 labeled Q(1,1) carries (Ω−1) dual spectral channels.

Spectral demultiplexer 4280 of constellation Q(0,1) separates the Ω upstream spectral channels of dual WDM link 4260(0) and directs each channel to an input port of one of distributors D(0,5), D(1,5), D(2,5), and D(3,5). Spectral multiplexer 4290 of constellation Q(0,1) combines the Ω downstream spectral channels, each emanating from an output port of one of distributors D(0,5), D(1,5), D(2,5), and D(3,5), into the dual WDM link 4260(0).

Likewise, spectral demultiplexer 4280 of constellation Q(1,1) separates the (Ω−1) upstream spectral channels of dual WDM link 4260(1) and directs each channel to an input port of one of distributors D(4,5), D(5,6), and D(5,7). Spectral multiplexer 4290 of constellation Q(1,1) combines the (Ω−1) downstream spectral channels, each emanating from an output port of one of distributors D(4,5), D(5,6), and D(5,7), into the dual WDM link 4260(1). Spectral demultiplexer 4280 of constellation Q(1,2) separates the Ω upstream spectral channels of dual WDM link 4260(2) and directs each channel to an input port of one of distributors D(5,8), D(5,9), D(5,10), and D(5,11). Spectral multiplexer 4290 of constellation Q(1,2) combines the Ω downstream spectral channels, each emanating from an output port of one of distributors D(5,8), D(5,9), D(5,10), and D(5,11), into the dual WDM link 4260(2).

Figure 43:
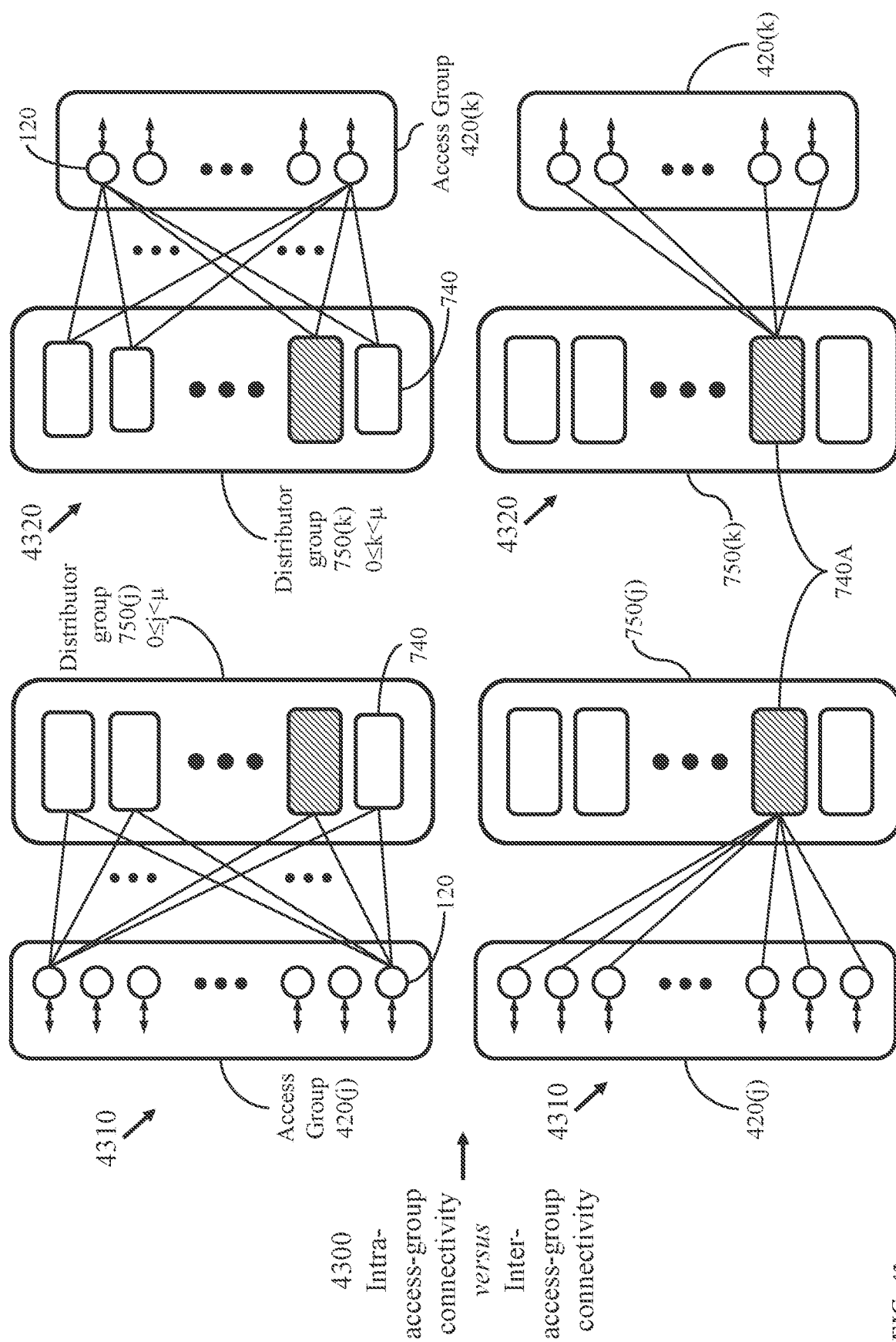
FIG. 43 illustrates multiple paths, each traversing a single distributor, from a first access node to a second access node of the same access group and a path, traversing a single distributor, from the first access node to a third access node of a different access group, in accordance with an embodiment of the present invention.

FIG. 43 illustrates paths 4300 through a pair of fused three-stage networks. A first three-stage network 4310 comprises an access group 420(j) of access nodes interconnecting through a distributor group 750(j), 0≤j<μ. A second three-stage network 4320 comprises an access group 420(k) of access nodes interconnecting through a distributor group 750(k), 0≤k<μ, j≠k. The two networks 4310 and 4320 have a common distributor 740A. Any access node 120 of access group 420(j) may transfer data to any other access node 120 of access group 420(j) through any of (μ−1) distributors of distributor group 750(j). Likewise, any access node 120 of access group 420(k) may transfer data to any other access node 120 of access group 420(k) through any of (μ−1) distributors of distributor group 750(k). Any access node 120 of access group 420(j) may transfer data to any access node of access group 420(k), and vice versa, through the common distributor 740A. Since each pair of distributor groups 750 of the entire network has a respective common distributor (Table-I, above), each access node of the network has a path to each other access node traversing a respective single distributor.

Figure 44:
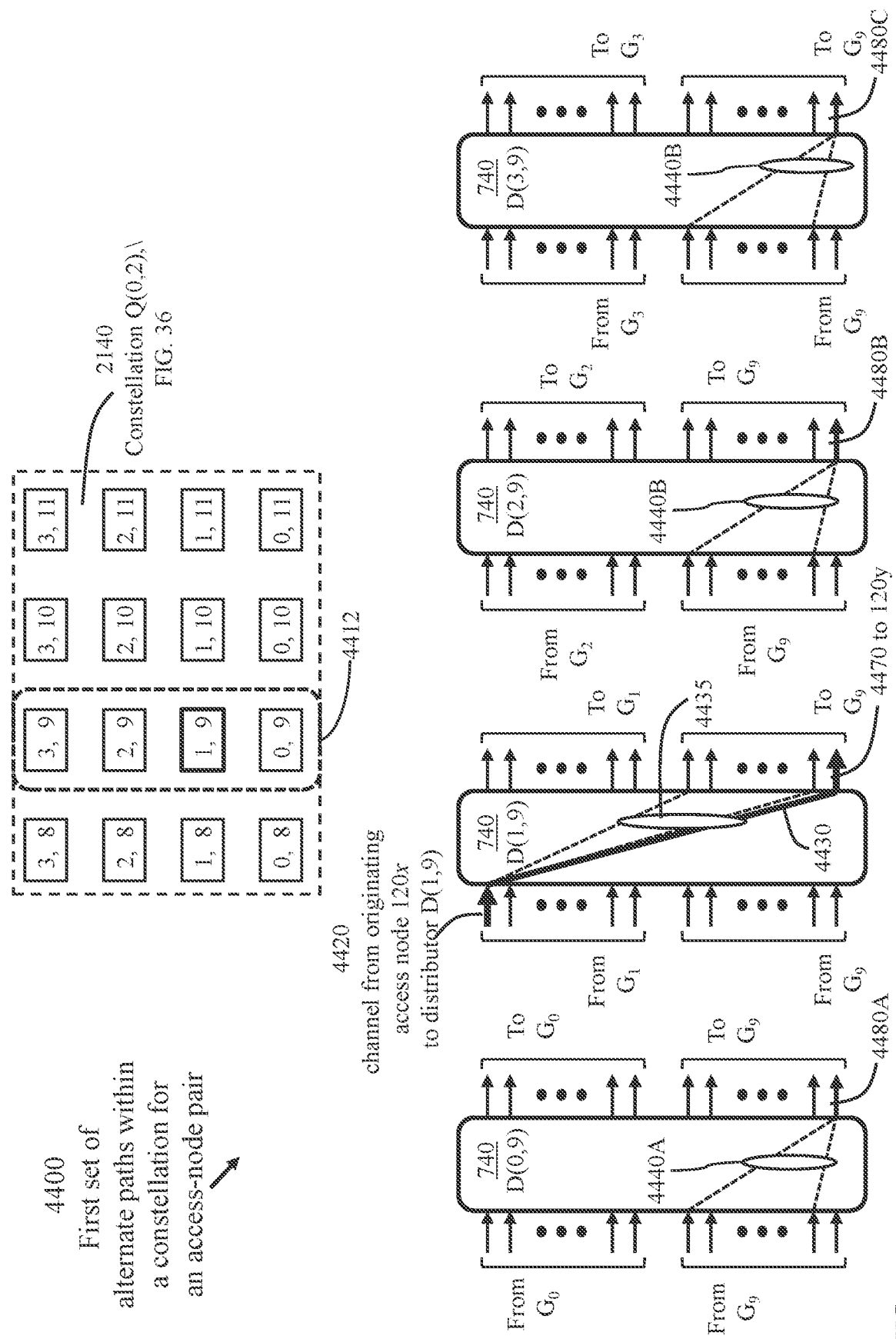
FIG. 44 illustrates a set of alternate paths within an inter-band constellation for a specific pair of access nodes, in accordance with an embodiment of the present invention.

FIG. 44 illustrates a set 4400 of alternate paths for a specific pair of access nodes within an inter-band constellation 2140. Constellation 2140, Q(0,2) of the arrangement of constellations of FIG. 36, connects to access band 1820(0), which contains access groups 420 of indices 0, 1, 2, and 3, and access band 1820(2), which contains access groups 420 of indices 8, 9, 10, and 11. Each distributor within constellation Q(0,2) connects to an access group 420 of access band 1820(0) and an access group of access band 1820(2). Distributor D(1,9) connects to $m_1$ dual channels, each connecting to a respective access node of access group 420(1), denoted $G_1$, and $m_9$ dual channels, each connecting to a respective access node of access group 420(9), denoted $G_9$, $m_j$ being the number of access nodes of an access group 420 of index j; $m_j$>1, 0≤j<μ. Distributor D(1,9) provides a path from any access node 120 of access groups $G_1$ and $G_9$ to any access node 120 of access groups $G_1$ and $G_9$. As illustrated, an access node 120x of access group $G_1$ connects to an access node 120y of access group $G_9$ traversing distributor D(1,9). Networkwide, each access node of any access group has a path to each access node of each other access group traversing only one distributor. Each access node has (μ−1) parallel paths, each traversing one distributor, to each other access node within a same access group.

Figure 45:
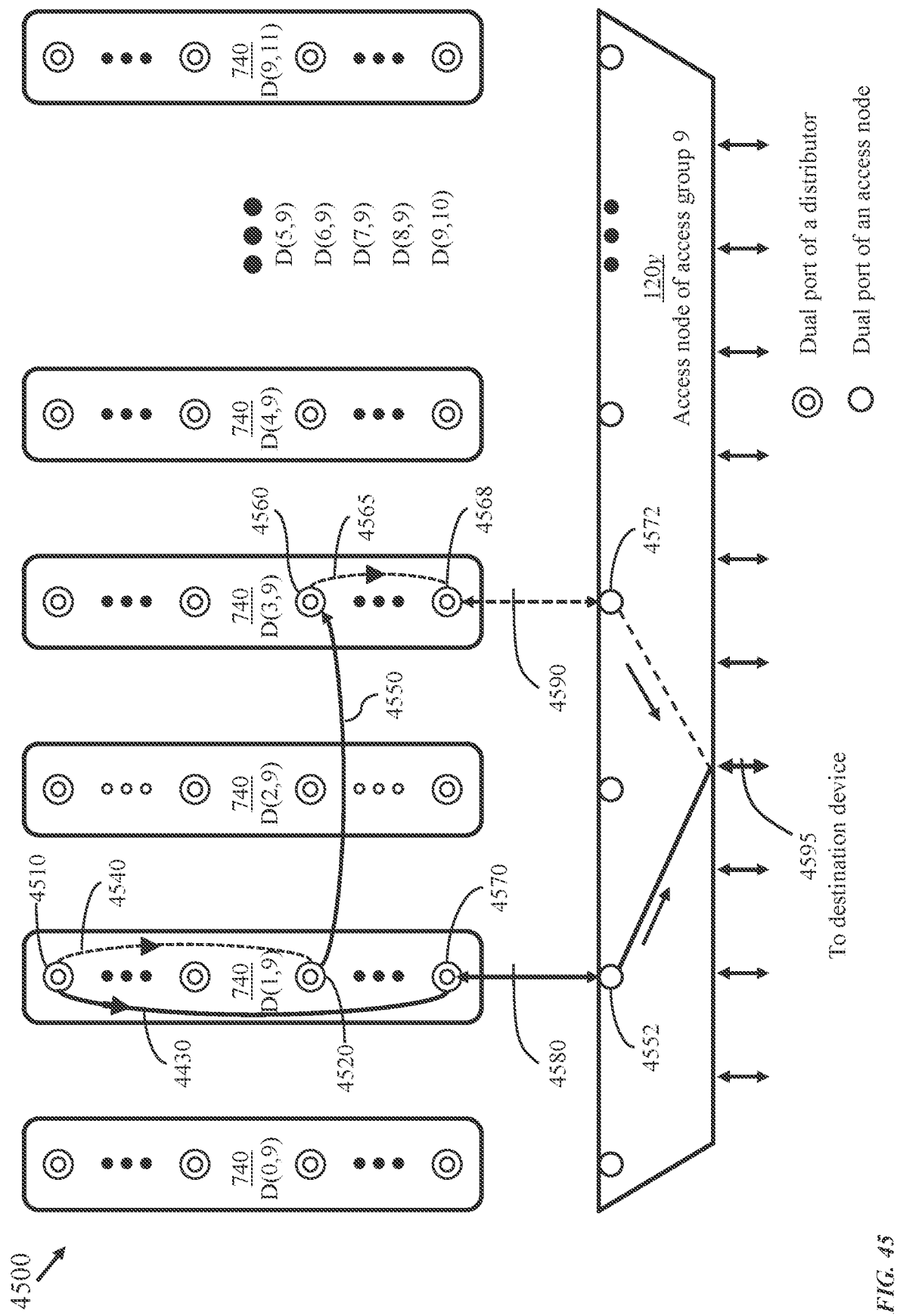
FIG. 45 details a path of the set of alternate paths of FIG. 44.
Figure 46:
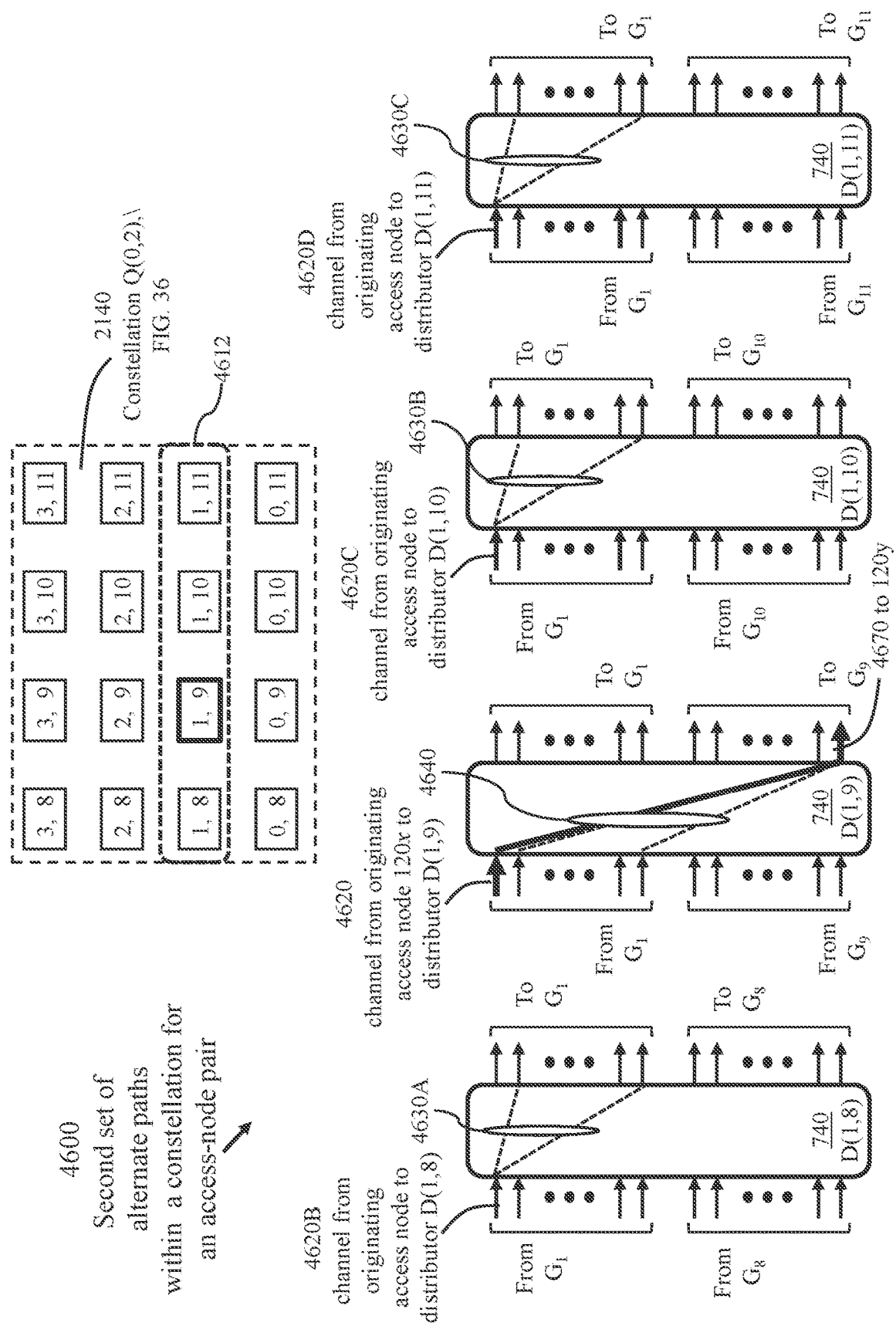
FIG. 46 illustrates another set of alternate paths within the inter-band constellation for the specific pair of access nodes, in accordance with an embodiment of the present invention.
Figure 47:
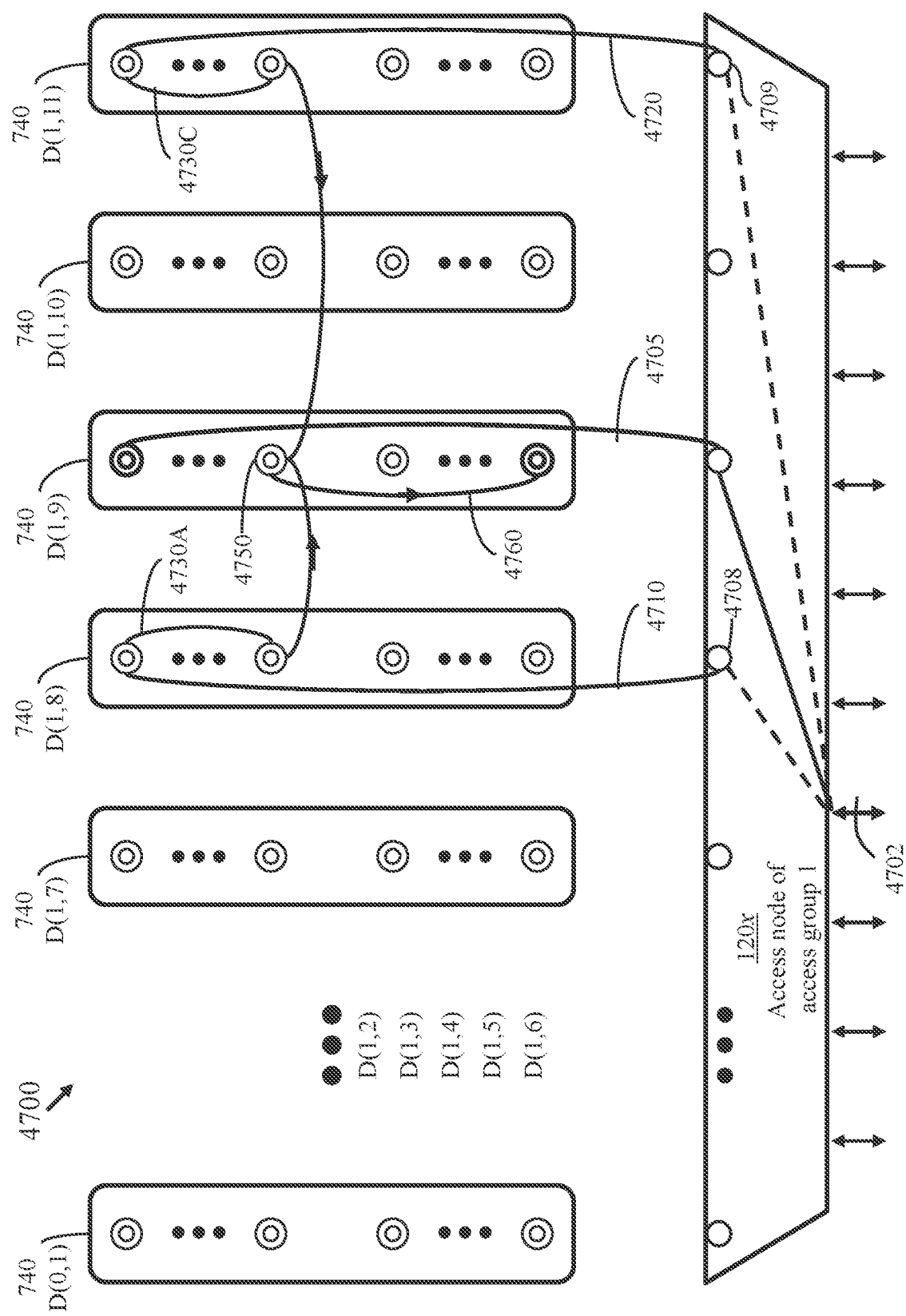
FIG. 47 details two paths of the set of alternate paths of FIG. 46.
Figure 48:
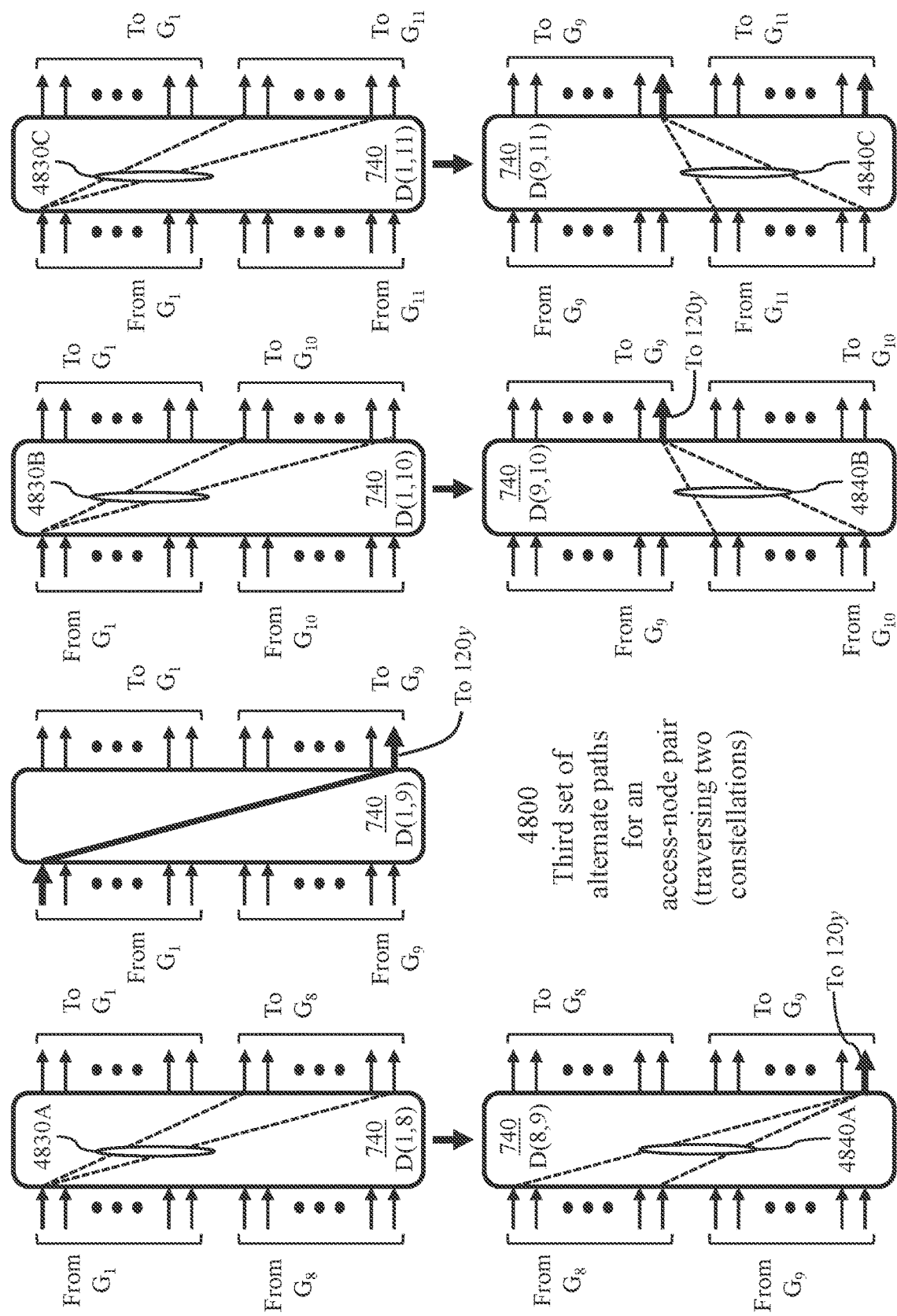
FIG. 48 illustrates a set of alternate paths traversing two constellations for a specific pair of access nodes.
Figure 49:
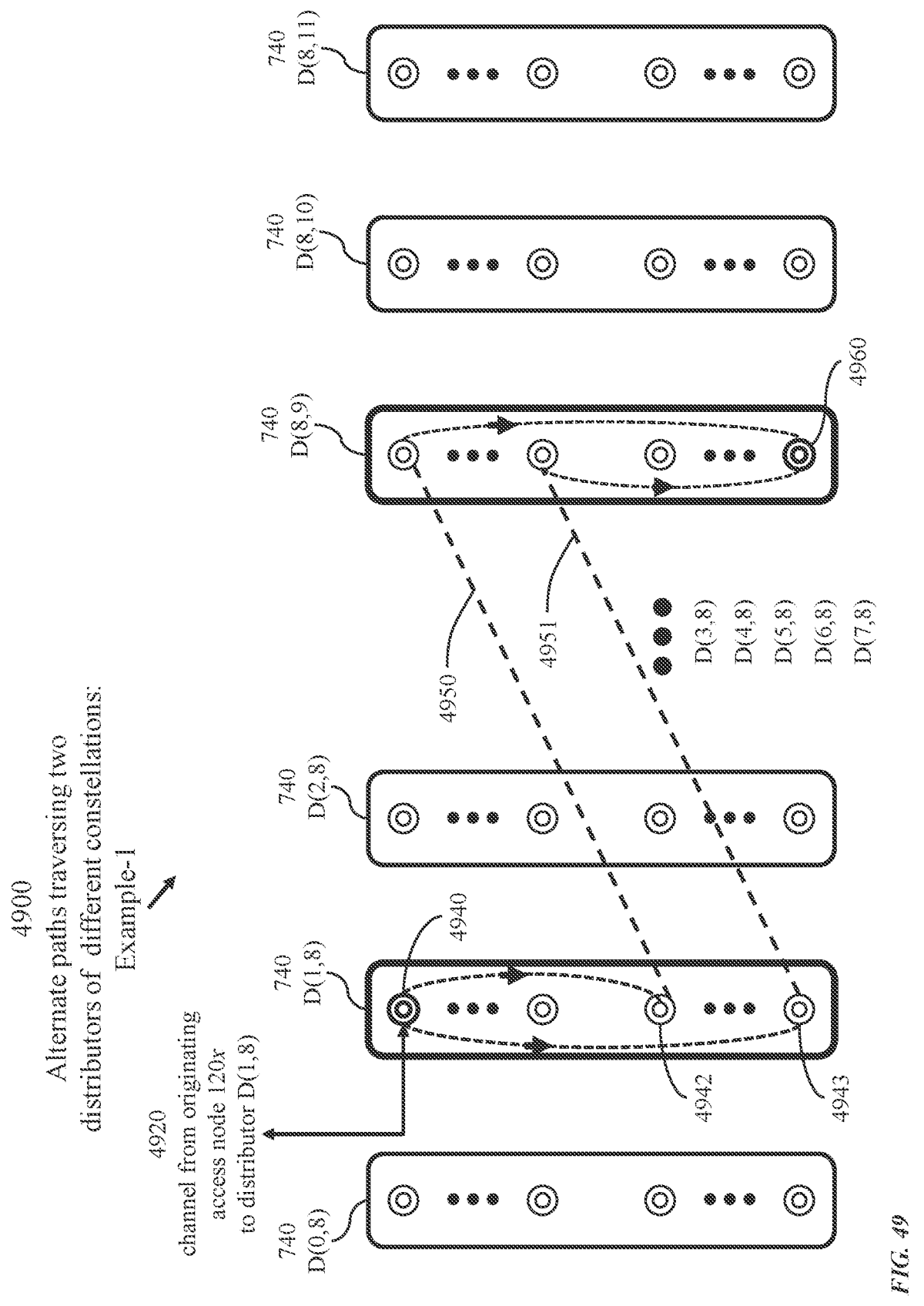
Figure 50:
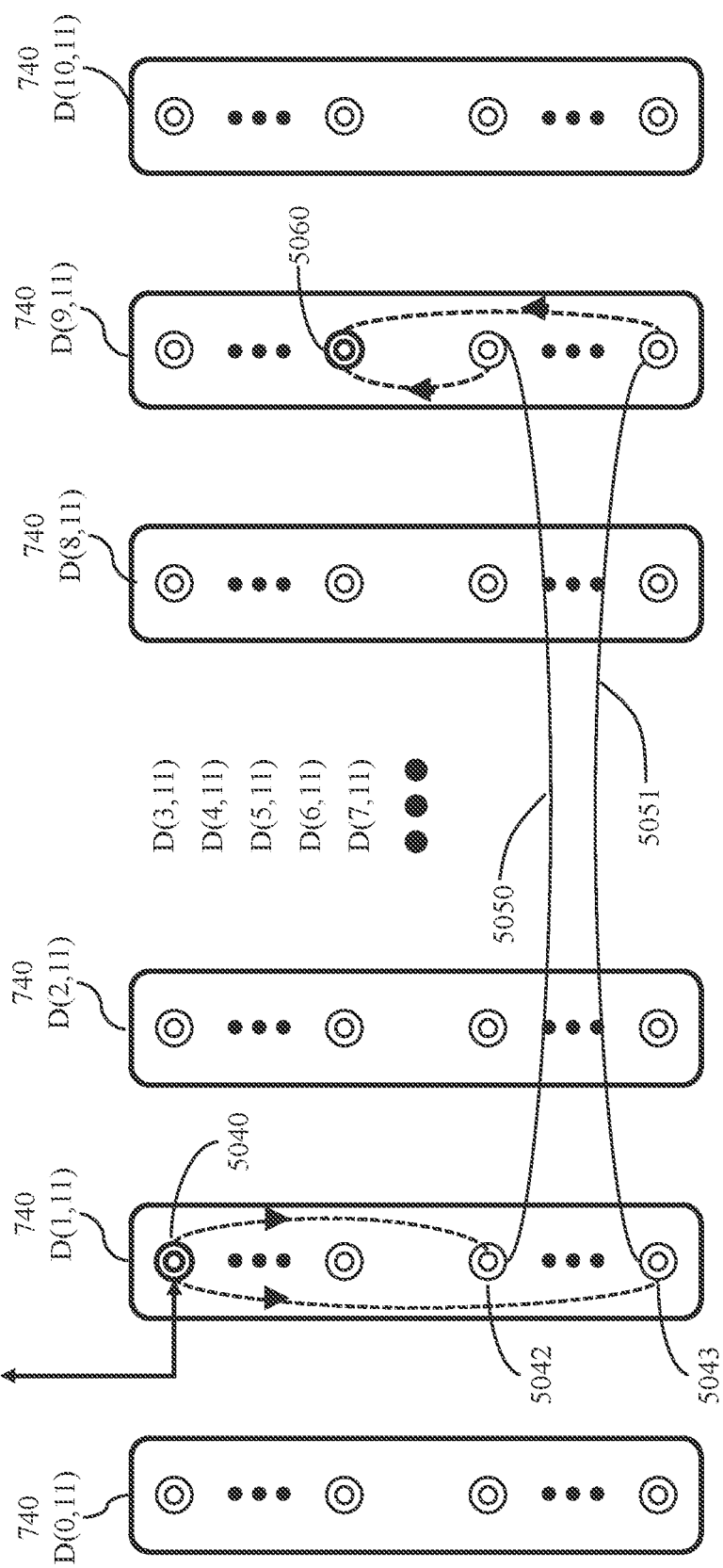
FIG. 50 details two paths traversing a second distributor pair of the set of alternate paths of FIG. 48.

With spatial data-traffic-rate imbalance, a proportion of data traffic for an access-node pair may be transferred through an alternate path traversing two distributors which may belong to one constellation or two constellations. FIG. 44 and FIG. 45 illustrate a case of alternate paths through a first subset of distributors of constellation Q(0,2). FIG. 46 and FIG. 47 illustrate a case of alternate paths through a second subset of distributors of constellation Q(0,2). FIG. 48, FIG. 49 and FIG. 50 illustrate a case of alternate paths through constellations Q(0,2) and Q(2,2).

Path 4430 connecting access node 120x to access node 120y through distributor D(1,9) may be unavailable due to:

(i) the channel 4470 to access node 120y being fully occupied with data from other access nodes of access group $G_1$ or access group $G_9$;
(ii) the channel 4420 from access node 120x being fully occupied with data directed to other access nodes of access-group $G_1$ or access-group $G_9$;
(iii) the flow rate from access-node 120x to access-node 120y exceeding the capacity of a single spectral channel (of 20 Gb/s, for example); or
(iv) internal temporal vacancy mismatch of the incoming channel 4420 from access-node 120x and outgoing channel 4470 to access-node 120y.

For case (i), access node 120x has paths to all access nodes 120 connecting to distributor D(1,9). Each access node 120 of access group 420(9) has a path to each of (μ−1) distributors D(0,9), D(1,9), D(2,9), D(3,9), D(4,9), D(5,9), D(6,9), D(7,9), D(8,9), D(9,10), and D(9,11), as illustrated in FIG. 36, of which the subset 4412 of distributors D(0,9), D(1,9), D(2,9), and D(3,9) belongs to constellation Q(0,2). Thus, access node 120x of access group 420(1) may establish any of multiple compound paths to access node 120y through distributors D(0,9), D(1,9), D(2,9), and D(3,9) of constellation Q(0,2), or through any of distributors D(4,9), D(5,9), D(6,9), D(7,9), D(8,9), D(9,10), and D(9,11) of constellations Q(1,2) and Q(2,2).

Paths 4435 through D(1,9) connect access node 120x of access group $G_1$ to ports connecting to access group $G_9$. Any of internal paths 4440A through distributor D(0,9) connects an access node 120 of access group $G_9$ to a port having a channel 4480A to access node 120y of access group $G_9$. Any of internal paths 4440B through distributor D(2,9) connects an access node 120 of access group $G_9$ to a port having a channel 4480B to access node 120y of access group $G_9$. Any of internal paths 4440C through distributor D(3,9) connects an access node 120 of access group $G_9$ to a port having a channel 4480C to access node 120y of access group $G_9$.

FIG. 45 illustrates alternate-paths details 4500. A path 4430 through D(1,9) connects access node 120x of access group $G_1$ to access node 120y of access group $G_9$. A dual port 4510 of distributor D(1,9) connects to channel 4420 from originating access node 120x. A dual port 4570 of distributor D(1,9) connects to dual channel 4480 to a dual port 4552 of destination access node 120y. A dual channel 4595 connects destination access node 120y to a destination device.

Any of the distributors of FIG. 45, other than distributor D(1,9) may be used to complete a compound path from originating access-node 120x of access group $G_1$ to destination access node 120y of access-group $G_9$. A compound path traversing distributor D(1,9) and distributor D(3,9) to destination access node 120y is illustrated. A path 4435 through D(1,9) connects access node 120x of access group $G_1$ to an intermediate dual port 4520 of distributor D(1,9). A path 4550 through an intermediate access node connects dual port 4520 to a dual port 4560 of distributor D(3,9). A path 4565 through distributor D(3,9) transfers signals to dual port 4568 which connects to a dual port 4572 of destination access node 120y through channel 4590.

For case (ii), FIG. 46 illustrates alternate paths from access node 120x to access node 120y. Access node 120x of access group 420(1) has paths to each of (μ−1) distributors D(0,1), D(1,2), D(1,3), D(1,4), D(1,5), D(1,6), D(1,7), D(1,8), D(1,9), D(1,10), and D(1,11), as illustrated in FIG. 36 of which the subset 4612 of distributors D(1,8), D(1,9), D(1,10), and D(1,11) belongs to constellation Q(0,2). Thus, access node 120x may establish any of multiple compound paths to access node 120y through distributors D(1,8), D(1,9), D(1,10), and D(1,11) of constellation Q(0,2), or through any of distributors D(0,1), D(1,2), D(1,3), D(1,4), D(1,5), D(1,6), and D(1,7), of constellations Q(0,0) and Q(0,1).

Any of internal paths 4630A through distributor D(1,8) connects originating access node 120x of access group $G_1$ to an access node of access group $G_1$. Likewise, any of internal paths 4630B through distributor D(1,10) connects originating access node 120x to an access node of access group $G_1$. Any of internal paths 4630C through distributor D(1,11) connects originating access node 120x to an access node of access group $G_1$. Any of internal paths 4640 through distributor D(1,9) connects an access node of access group G1 to destination access node 120y of access group G9.

FIG. 47 details two paths 4700 of the set of alternate paths of FIG. 46. Originating access node 120x of access group 420(1) has a path to each of the (μ−1) distributors illustrated in FIG. 47 of which the subset 4612 of distributors D(1,8), D(1,9), D(1,10), and D(1,11) belongs to constellation Q(0, 2).

Source access-node 120x connects to a dual port of distributor D(1,8) through dual channel 4710. An internal path 4730A (one of paths 4630A) connects access node 120x to an intermediate port of distributor D(1,8) which connects to a corresponding port 4750 of distributor D(1,9) through an intermediate access node. An internal path 4760 through distributor D(1,9) leads to a port connecting to destination access node 120y.

Likewise, source access-node 120x connects to a dual port of distributor D(1,11) through dual channel 4720. An internal path 4730C (one of paths 4630C) connects access node 120x to an intermediate port of distributor D(1,11) which connects to port 4750 of distributor D(1,9) through an intermediate access node. Internal path 4760 through distributor D(1,9) leads to the port connecting to destination access node 120y.

FIG. 48 illustrates a set 4800 of alternate paths traversing two constellations for the specific pair of access nodes 120x and 120y. Originating access node 120x of access group 420(1) has paths to (μ−1) distributors D(0,1), D(1,2), D(1,3), D(1,4), D(1,5), D(1,6), D(1,7), D(1,8), D(1,9), D(1,10), and D(1,11).

Internal paths 4830A through a distributor D(1,8) connect originating access node 120x to all access nodes 120 of access-group $G_8$. Internal paths 4840A through distributor D(8,9) of intra-band constellation Q(2,2) of FIG. 36 connect all access nodes 120 of access-group $G_8$ to destination access node 120y.

Internal paths 4830B through a distributor D(1,10) connect originating access node 120x to all access nodes 120 of access-group $G_{10}$. Internal paths 4840B through distributor D(9,10) of intra-band constellation Q(2,2) of FIG. 36 connect all access nodes 120 of access-group $G_{10}$ to destination access node 120y.

Internal paths 4830C through a distributor D(1,11) connect originating access node 120x to all access nodes 120 of access-group $G_{11}$. Internal paths 4840C through distributor D(9,11) of intra-band constellation Q(2,2) of FIG. 36 connect all access nodes 120 of access-group $G_{11}$ to destination access node 120y.

Other alternate paths may be established through distributor pairs: {D(0,1), D(0,9)}, {D(1,2), D(2,9)}, {D(1,3), D(3,9)}, (D(1,4), D(4,9)}, D(1,5), D(5,9)}, {D(1,6), D(6,9)}, and {D(1,7), D(7,9)}.

FIG. 49 details two paths 4900 traversing a first distributor pair of the set of alternate paths of FIG. 48. The originating access-node 120x connects to dual port 4940 of distributor D(1,8). An internal path may be established through distributor D(1,8) to an intermediate dual port 4942. A path 4950 may then be established through an intermediate access node from dual port 4942 to distributor D(8,9). An internal path through distributor D(8,9) leads to port 4960 which connects to destination access node 120y.

An internal path may be established through distributor D(1,8) to another intermediate dual port 4943. A path 4951 may then be established through an intermediate access node from dual port 4943 to distributor D(8,9). An internal path through distributor D(8,9) leads to port 4960 which connects to destination access node 120y.

FIG. 50 details two paths 5000 traversing a second distributor pair of the set of alternate paths of FIG. 48. The originating access-node 120x connects to dual port 5040 of distributor D(1,11). An internal path may be established through distributor D(1,11) to an intermediate dual port 5042. A path 5050 may then be established through an intermediate access node from dual port 5042 to distributor D(9,11). An internal path through distributor D(9,11) leads to port 5060 which connects to destination access node 120y.

An internal path may be established through distributor D(1,11) to another intermediate dual port 5043. A path 5051 may then be established through an intermediate access node from dual port 5043 to distributor D(9,11). An internal path through distributor D(9,11) leads to port 5060 which connects to destination access node 120y.

Network Growth

The access nodes of the network are arranged into a number $\mu$ of access groups, $\mu>1$, where each access group comprises a number of access nodes not exceeding a predetermined upper bound m, m>1, as illustrated in FIG. 4. The number $\mu$ of access groups is the number of constituent three-stage networks of the overall contiguous network.

The access groups are arranged into a specified number $\Pi$ of access bands, $\Pi>1$. Preferably, the number $\mu$ of access groups is selected to be a target number of access groups in preparation for network growth. Preferably, the number m of access nodes per access group is selected to be a target number of access nodes in preparation for individual access-group growth. Preferably, each access band is assigned a same number, $\Omega$, of access groups which is then determined as: $\Omega=\lceil\mu/\Pi\rceil$, where $\lceil R \rceil$ is the nearest integer exceeding a real number R. Generally, $\Omega$ may be selected as $\Omega \geq \lceil\mu/\Pi\rceil$.

For example, with $\Pi=20$, and a target number of access groups of 470, $\Omega=\lceil 470/20\rceil=24$. However, the network may be initially provisioned to have 280 access groups, with a mean value of the number of access groups per access band of 14. Thus, during any stage of network growth, an access band assigned up to 24 access groups may have several vacant (place holder) access groups reserved for future expansion with the access band initially comprising less than the predetermined number $\Omega$ of access groups.

With partially provisioned access bands, generally having unequal numbers of access group, a dual multichannel link to a specific intra-band constellation would carry a number of spectral channels equal to a number of present (provisioned) access groups of the specific intra-band constellation minus one. Each dual multichannel link from an access node belonging to either of two access bands connecting to a specific inter-band constellation would carry a number of spectral channels equal to a number of present access groups of the other access band.

Figure 51:
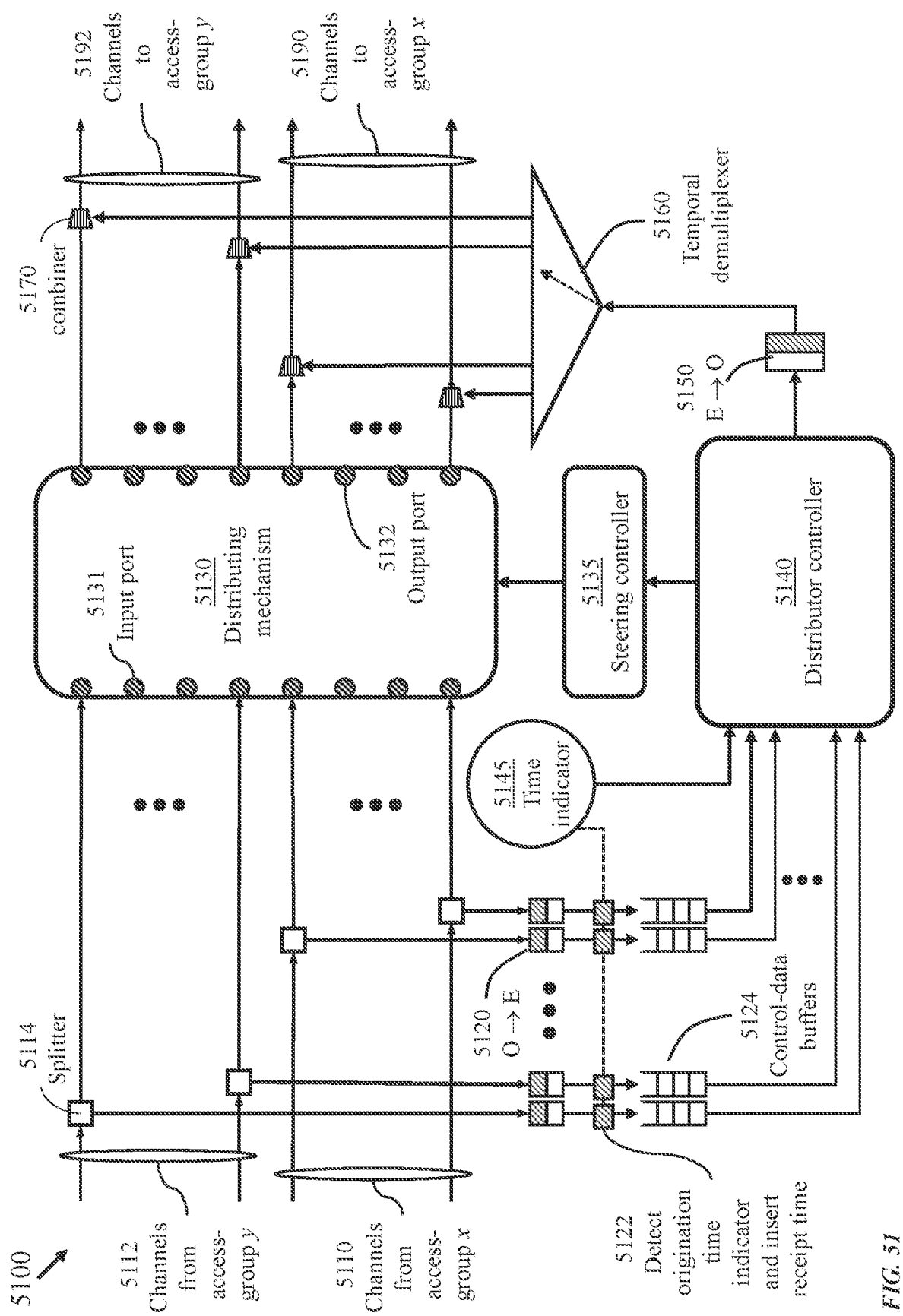
FIG. 51 illustrates a first configuration of an optical distributor, in accordance with an embodiment of the present invention.

For example, for the case of $\mu=12$, $\Pi=3$, and $\Omega=4$ (FIG. 36), if access group 420(5) is reserved for future use, then the access band 1820(1), which is intended to include access groups 420(4), 420(5), 420(6), and 420(7), would currently include only three access groups. Consequently, any access node of access band 1820(0) connects to constellation Q(0,1) through a WDM link carrying only three channels individually connecting to distributors D(x,4), D(x,6), and D(x,7), x being an index of an access group to which the access node belongs. Any access node of access band 1820(2) connects to constellation Q(1,2) through a WDM link carrying three channels individually connecting to distributors D(4,y), D(6,y) and D(7,y), y being an index of an access group to which the access node belongs Distributor Configuration FIG. 51 illustrates a first configuration 5100 of an optical distributor comprising an optical distributing mechanism 5130, a set of input ports 5131, a set of output ports 5132, a local time indicator 5145, a distributor controller 5140, and a steering controller 5135. The Steering controller 5135 directs data from an input port 5131 to an output port 5132 according to instructions from the distributor controller 5140.

Distributor controller 5140 comprises at least one hardware processor and memory devices storing software instructions causing the at least one processor to perform control functions including scheduling paths establishment through distributing mechanism 5130 and exchanging control messages with access nodes connecting to the distributing mechanism 5130.

A set 5110 of upstream channels from access nodes of a first access group 420 of index x, $0 \leq x < \mu$, connects to a first set of input ports 5131. A set 5112 of upstream channels from access nodes of a second access group 420 of index y, $0 \leq y < \mu$, connects to a second set of input ports 5131. A set 5190 of downstream channels directed to the access nodes of the first access group connects to a first set of output ports 5132. A set 5192 of downstream channels directed to the access nodes of the second access group connects to a second set of output ports 5132.

Each upstream channel 5110 or 5112 carries an optical signal from a respective access node 120 modulated with content data and control data. The content data is directed to other access nodes and the control data is directed to distributor controller 5140 and includes an indication of time according to a time indicator of the respective access node.

Figure 52:
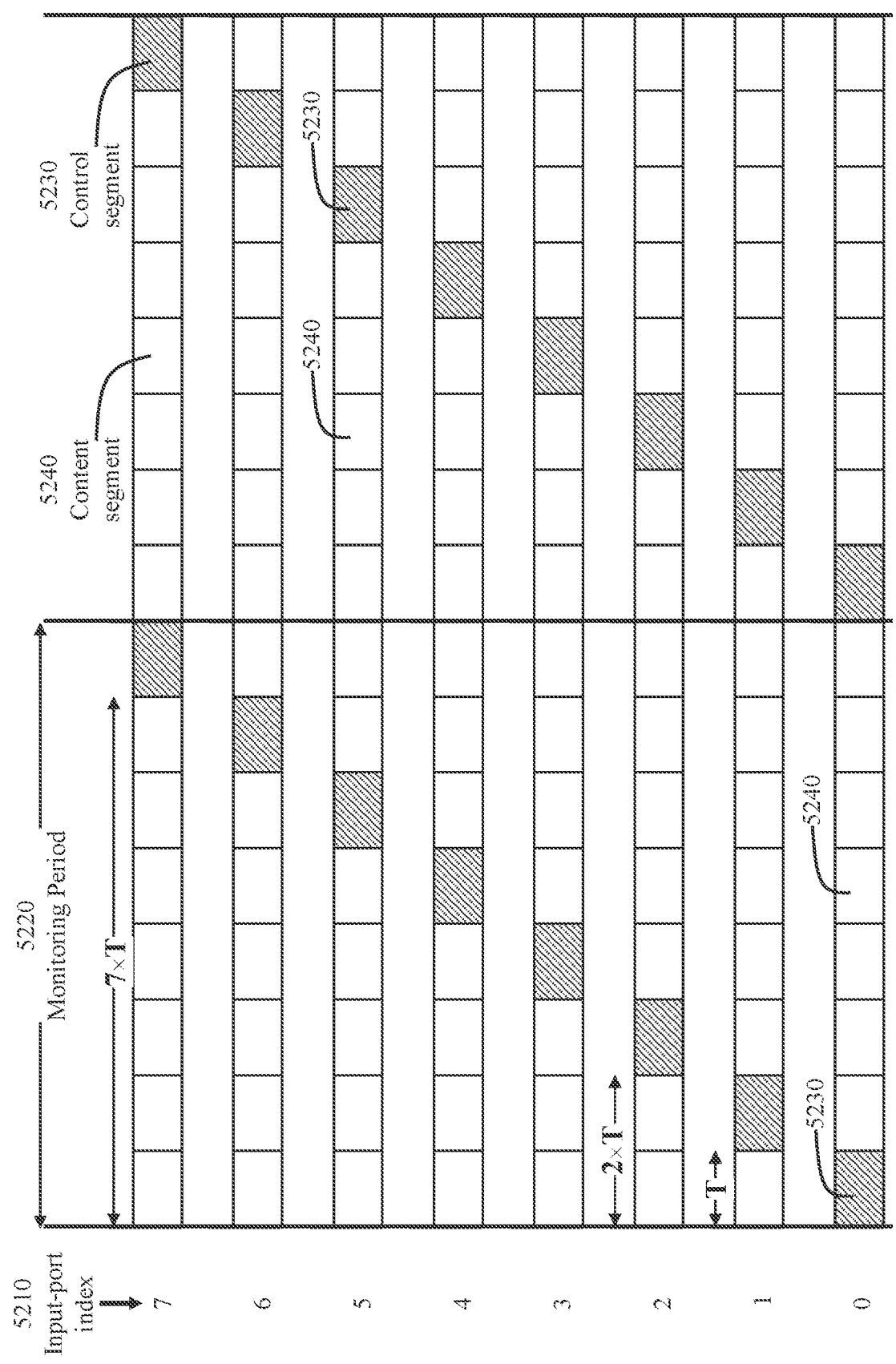
FIG. 52 illustrates an exemplary organization of a cyclic monitoring period into content time slots and at least one control time slot, in accordance with an embodiment of the present invention.

FIG. 52 illustrates an exemplary organization of a monitoring period 5220 into a number of time slots at least equal to the number of dual ports of a distributor connecting to access nodes. The duration, T, of a time slot may be of the order of 0.1 to 1.0 microseconds. The time slots of a monitoring period comprise content time slots 5240 and at least one control time slot 5230. Each input port 5131 of the distributor 5100 is allocated at least one control time slot per timing period. The illustrated monitoring period 5220 comprises 8 time slots indexed as 0 to 7. Content data segments are transferred from input ports 5131 to output ports 5132 during scheduled content time slots which change according to data-traffic spatial-temporal variation. A control data segment is communicated from an input port 5131 to distributor controller 5140 during a respective predetermined control time slot 5230 of duration T. For example, control data segments from an input port 5131 of index j (reference 5210) are transferred to the distributor controller 5140 during a time slot of index j of each monitoring period 5220, $0 \leq j < 8$.

In each of distributor configurations of FIGS. 51, 54, 55, 57, and 58, the data of a control segment 5230 may include a time indication at an originating access node, flow-rate-allocation requests to specified destination access nodes, and messages from the originating access node to other access nodes. In each of distributor configurations of FIGS. 54, 55, 57, and 58, the data of a content segment 5240 includes content data (payload data) in addition to an indication of a cyclic segment identifier within a monitoring period 5220.

Figure 53:
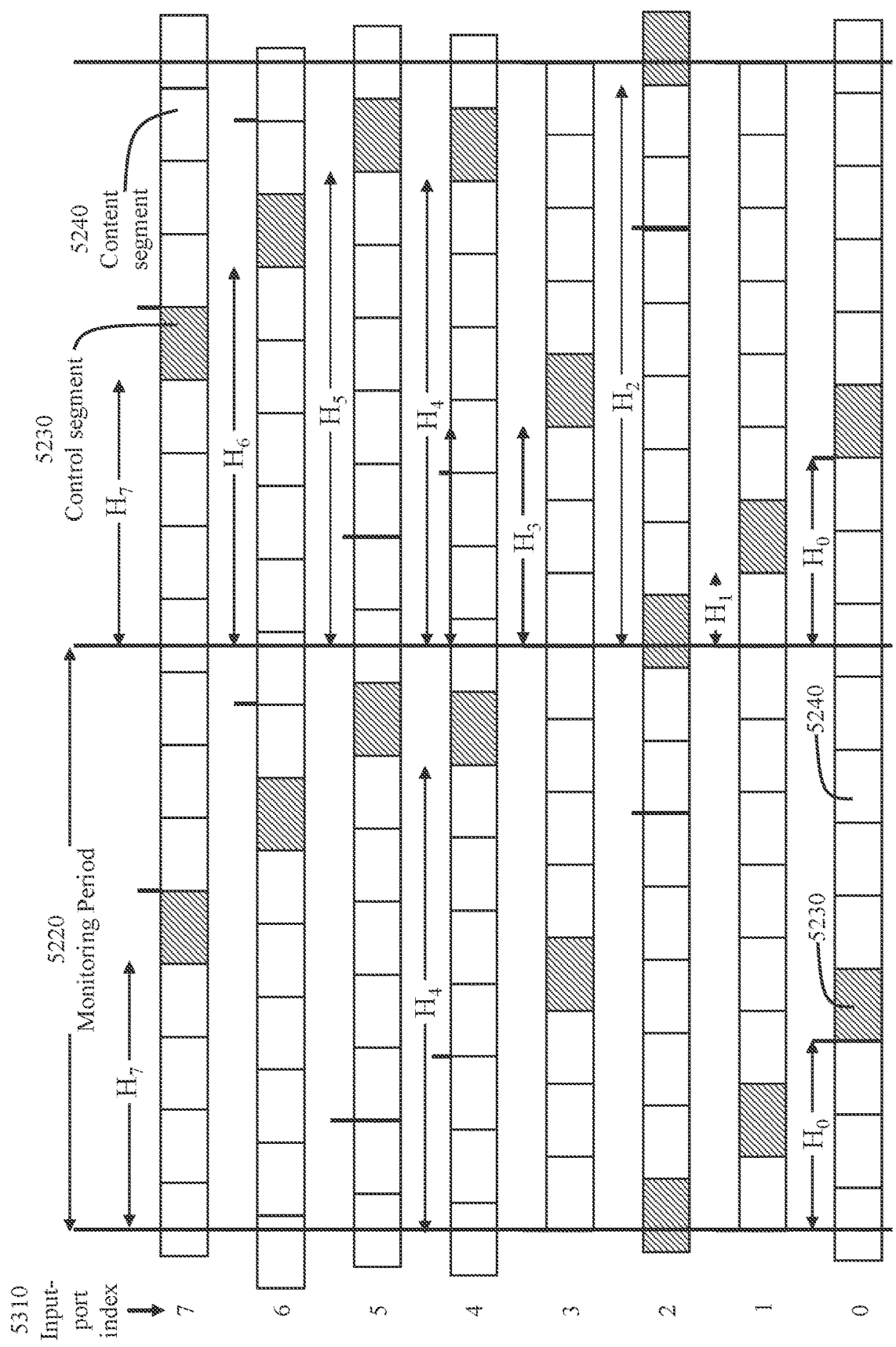
FIG. 53 illustrates a case where control time slots of signals received at input ports of a distributor are not time aligned to respective designated time slots of a reference monitoring period.

FIG. 53 illustrates a case where control time slots of signals received at input ports 5131 of the distributor are not time aligned to respective designated time slots of reference monitoring period 5220. The temporal discrepancy between misaligned control segments and designated time slots of control segments for signals received at input ports 5131 need be determined and communicated to respective originating access nodes 120 to restore time alignment. In the illustrated example, the instants of time of control segments 5230 detected from signals received at the input ports 5131 are $H_0$, $H_1$, $H_2$, ..., $H_7$, while the corresponding designated instants of time are 0, T, 2T, ..., 7T, T being the duration of a time slot of a monitoring period 5220.

Each upstream channel, 5110 or 5112, connects to a respective 1:2 optical splitter 5114 which directs predetermined portions of power of an upstream optical signal to a respective input port 5131 and a respective optical-to-electrical (O-E) convertor 5120 of an array of O-E converters. The output electrical signal of each O-E converter is directed to a respective detector 5122 of an array of detectors which detects upstream control data, which includes a time indication at an originating access node, and forms a control data segment including receipt time according to a local time indicator 5145. The control data segments are placed in control-data buffers 5124 to be presented to distributor controller 5140. Preferably, the upstream control data are sent regularly at a predetermined rate. Thus, the control buffers 5124 would be short buffers, each with a highest expected occupancy of a very small number (two, for example) of control data segments.

The distributor controller 5140 computes schedules for flow-rate allocations and generates downstream control data to be sent, together with downstream content data collected at the output ports 5132, to destination access nodes of the first access-group and the second access-group. An electrical-to-optical converter 5150 produces optical signals carrying the downstream control data. A temporal demultiplexer 5160 cyclically supplies to optical combiners 5170 control segments directed to the destination access nodes. Each optical combiner 5170 receives an optical signal carrying downstream content data from a respective output port 5132 and inserts corresponding downstream control data received through the temporal demultiplexer 5160.

Figure 54:
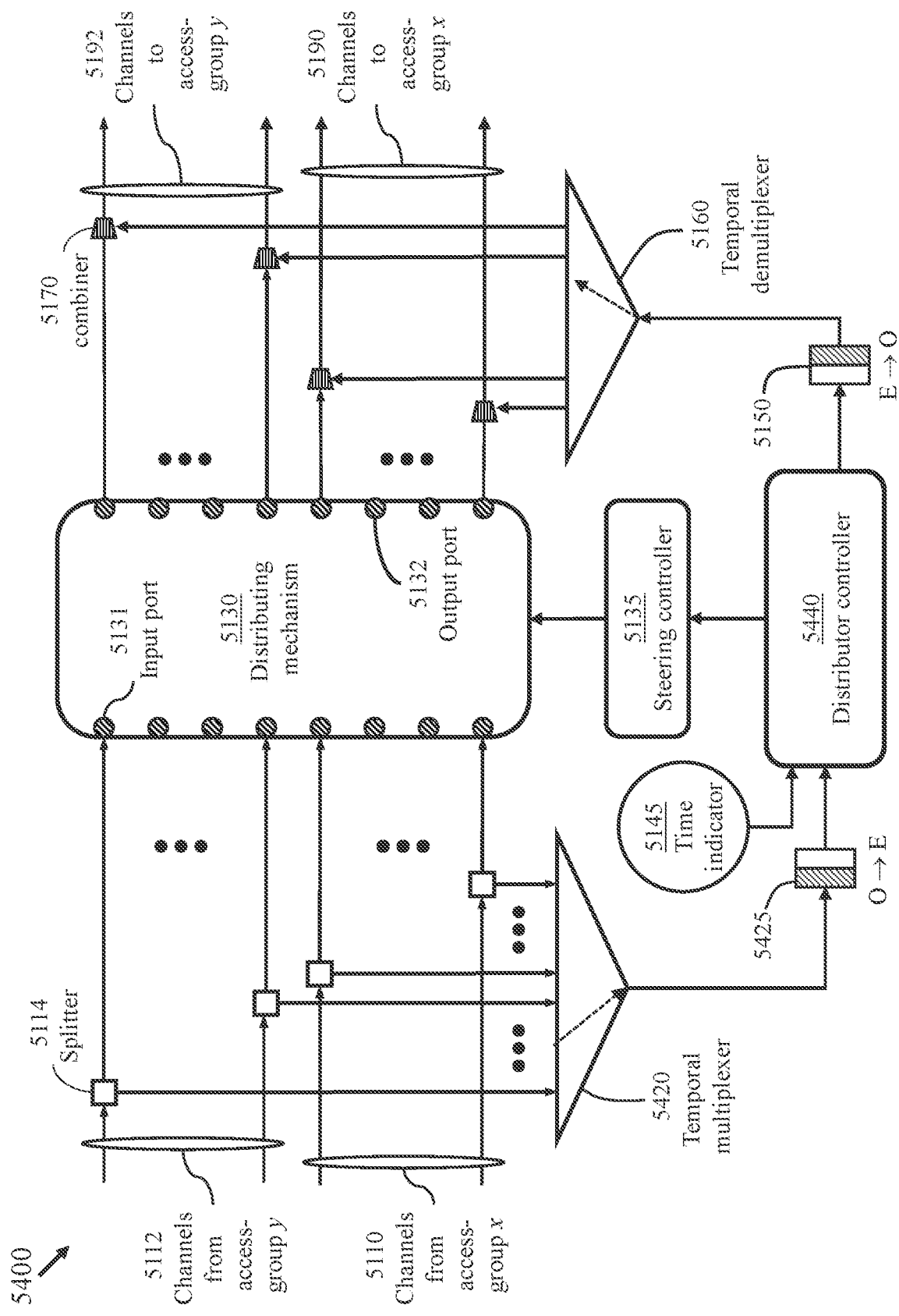
FIG. 54 illustrates a second configuration of an optical distributor, in accordance with an embodiment of the present invention.

FIG. 54 illustrates a second configuration 5400 of an optical distributor. As in the configuration of FIG. 51, configuration 5400 comprises an optical distributing mechanism 5130, a set of input ports 5131, a set of output ports 5132, a local time indicator 5145, a distributor controller 5440, and a steering controller 5135. The Steering controller 5135 directs data from an input port 5131 to an output port 5132 according to instructions from the distributor controller 5440.

Each upstream channel, 5110 or 5112, connects to a respective 1:2 optical splitter 5114 which directs a predetermined portion of power of each upstream optical signal to a temporal multiplexer 5420. The temporal multiplexer 5420 cyclically connects optical splitters 5114, connecting to upstream channels from access group 420 of index x, $0 \le x < \mu$, and access group 420 of index y, $0 \le y < \mu$, to an optical-to-electrical converter 5425 during designated control time slots within each monitoring period as illustrated in FIG. 52. The optical-to-electrical (O-E) convertor 5425 receives optical-signal portions (samples) captured during successive time slots of each monitoring period 5220 and produces corresponding electric signals to be supplied to distributor controller 5440.

If the control time slots of upstream signals received at input ports 5131 of the distributor are time aligned to respective designated time slots of reference monitoring period 5220 as illustrated in FIG. 52, the output of the temporal multiplexer 5420 would be a sequence of control segments 5230 originating from the access nodes of access-group 420 of index x and access-group 420 of index y. If the control time slot of an upstream signal from a specific access node 120 is not time-aligned to a respective designated control time slot, the captured optical signal portion during the respective designated time slot need be examined to determine the temporal discrepancy and instruct the specific access node to correct transmission time to the distributor accordingly. The data of a control segment 5230 may include: time indication at originating access node, flow-rate-allocation requests to specified destination access nodes, and messages from an originating access node to other access nodes.

Figure 55:
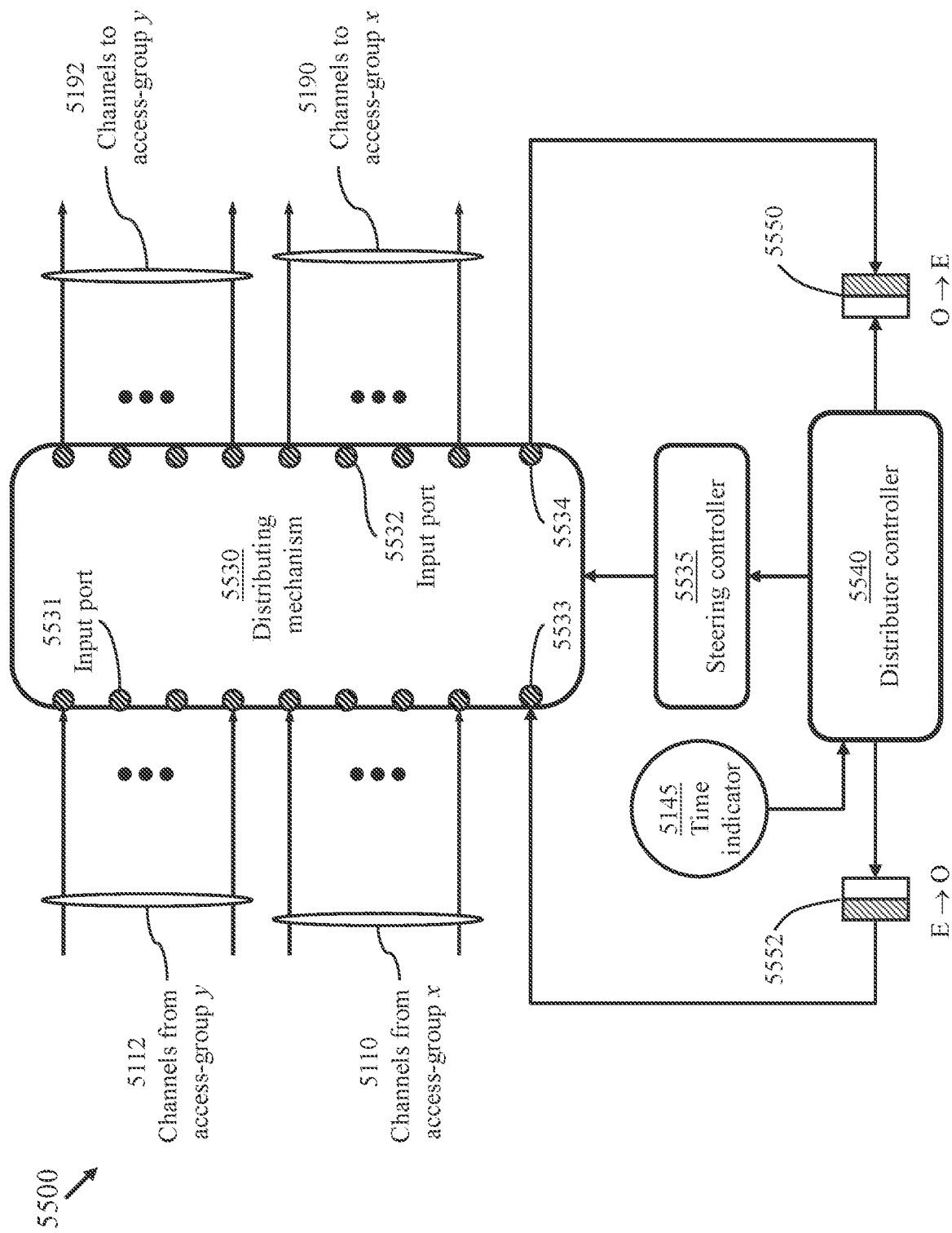
FIG. 55 illustrates a third configuration of an optical distributor, in accordance with an embodiment of the present invention.

FIG. 55 illustrates a third configuration 5500 of an optical distributor. Configuration 5500 comprises a distributor controller 5540, steering controller 5535, a local time indicator 5145, an optical distributing mechanism 5530 which supports input ports 5531, output ports 5532, an input port 5533 connecting to output of distributor controller 5540, and an output port 5534 connecting to input of distributor controller 5540. As in configurations 5100 and 5400, distributor controller 5540 uses local time indicator 5145 for temporal alignment of upstream signals.

Distributor controller 5540 comprises at least one hardware processor and memory devices storing software instructions causing the at least one processor to perform control functions including scheduling paths establishment through distributing mechanism 5530 and exchanging control messages with access nodes connecting to the distributing mechanism 5530.

Steering controller 5535 directs signals from input ports 5531 to output ports 5532 according to instructions from the distributor controller 5540. Additionally, steering controller 5535 cyclically directs upstream control signals from input ports 5531 to output port 5534 which connects to distributor controller 5540 through an optical-to-electrical converter 5550. The distributor controller 5540 sends downstream control signals to input port 5533 through electrical-to-optical converter 5552. Steering controller 5535 cyclically directs downstream control signals from input port 5533 to output ports 5532. Thus, rather than using temporal multiplexer 5420 and temporal demultiplexer 5160 of the configuration of FIG. 54, the upstream control signals are communicated from input ports 5531 to the distributor controller 5540 and the downstream control signals are communicated from the distributor controller 5540 to the output ports 5532 through the distributing mechanism 5530.

Figure 56:
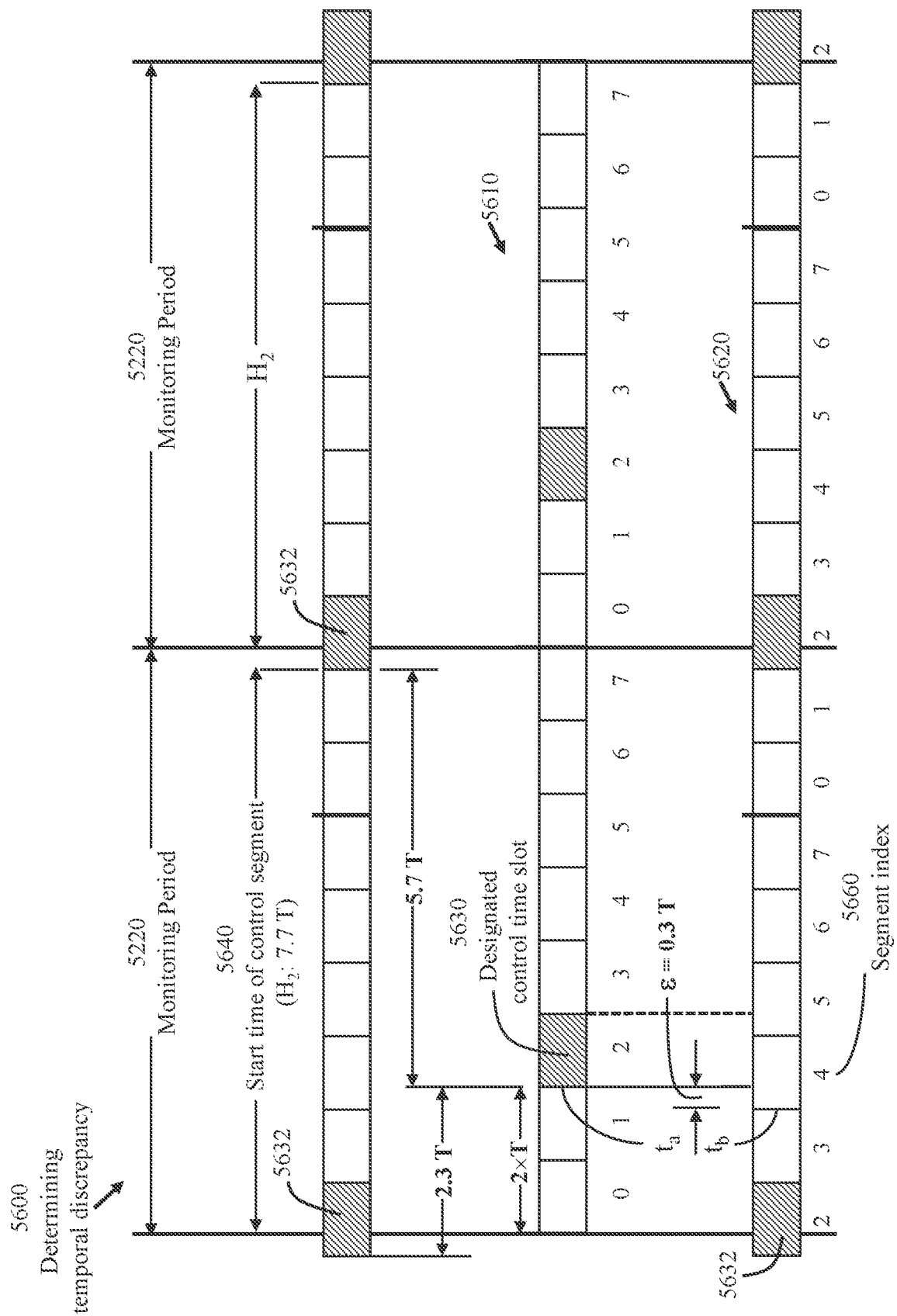
FIG. 56 illustrates temporal misalignment of a signal received at a distributor from a specific access node.

FIG. 56 illustrates temporal misalignment 5600 of a signal received at a distributor from a specific access node connecting to input port of index 2 of distributing mechanism 5130 or 5530. As illustrated in FIG. 52, the monitoring period 5220 is organized into a number of time slots where during each time slot an access node transmits a control segment 5230 or a content segment 5240. The time slots within a monitoring period are indexed as j, 0≤j<p, where the integer p at least equals the total number of input ports connecting to upstream channels from subtending access nodes and input ports connecting to a controller of a distributor; p>4. A cyclic time slot of index j is (arbitrarily) assigned to an input port of index j. Thus, time slot 5630 is designated as a control time slot for a signal stream originating from an access node connecting to an input port of index 2.

In the distributor configuration of FIG. 51, temporal alignment is based on detecting the start time of a control segment within a monitoring period. In the distributor configuration of FIG. 54 and the distributor configuration of FIG. 55, temporal alignment is based on identifying content of an upstream signal during a corresponding designated control time slot.

Referring to FIG. 51, a detector 5122 detects the start time 5640 of a control segment within a monitoring period. As illustrated in FIG. 53, the actual start time of a control segment for an input port of index j is denoted $H_j$, 0≤j<p. With the start time of a control segment for an input port of index j set to be j×T, T being the duration of a time slot, the temporal discrepancy of a received signal directed to an input port of index j is determined as: $\theta_j = (j \times T - H_j)$.

If the magnitude of θj exceeds a predefined permissible value (0.01×T, for example), an access node originating the signal would be instructed to adjust transmission; adding a delay of:

$\theta_j$ if $\theta_j > 0.0$; or $(p \times T + \theta_j)$, otherwise.

In the example of FIG. 26, j=2, p=8, $H_2$=7.7×T. Hence $\theta_2$=−5.7×T, and the requisite added delay at the originating access node is (8×T−5.7×T)=2.3×T.

Referring to FIG. 54, distributor controller 5440 examines a portion of the output signal of optical-to-electrical converter 5425 during each time slot of the monitoring period 5220. In the configuration of FIG. 51, the output signal of each optical-to-electrical converter 5120 is examined to determine the start time of a control segment according to a reading time indicator 5145. In the configuration of FIG. 54, the distributor controller 5440 examines a portion of the output signal of optical-to-electrical converter 5425 during each reference time slot of the monitoring period to detect:
 (a) an index of a segment, which may be a control segment or a content segment; and
 (b) a displacement of the start time of the segment from the start time of a corresponding reference time slot.

For a reference time slot of index x, 0≤x<p, a detected index y, 0≤y<p, and a displacement ε, the temporal discrepancy of a received signal directed to an input port of index j is determined as: $\theta_j = (y - x - \varepsilon)$. If the magnitude of θj exceeds the predefined permissible value, an access node originating the signal is instructed to adjust transmission time; adding a delay of:

$\theta_j$, if $\theta_j > 0.0$; or $(p \times T + \theta_j)$, otherwise.

In the example of FIG. 56, x=2, y=4, ε=−0.3×T; hence $\theta_j$=2.3×T.

Referring to FIG. 55, distributor controller 5540 examines a portion of the output signal of optical-to-electrical converter 5550 during each reference time slot of the monitoring period to detect an index of a segment and a displacement of the start time of the segment from the start time of a corresponding reference time slot. The temporal discrepancy of a received signal and transmission-time adjustment at an originating access node are determined as described above with reference to FIG. 54.

Figure 57:
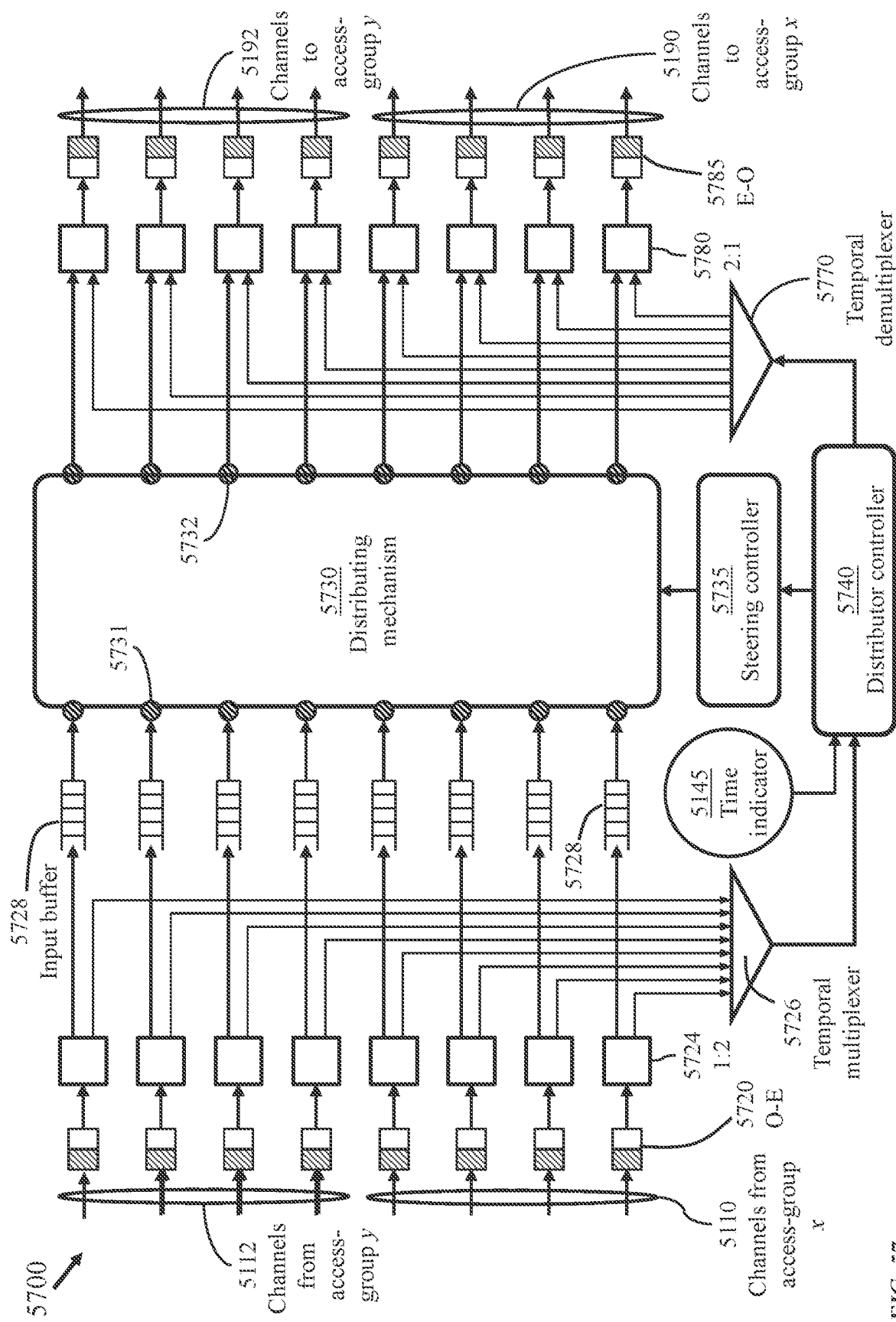
FIG. 57 illustrates a first configuration of an electronic distributor, in accordance with an embodiment of the present invention.

FIG. 57 illustrates a first configuration 5700 of an electronic distributor comprising an electronic distributing mechanism 5730, a set of input ports 5731, a set of output ports 5732, a local time indicator 5145, a steering controller 5735, and a distributor controller 5740. The steering controller 5735 directs data from an input port 5731 to an output port 5732 according to instructions from the distributor controller 5740.

A set 5110 of upstream channels from access nodes of a first access group 420 of index x connects to a first set of 1:2 fan-out units 5724. A set 5112 of upstream channels from access nodes of a second access group 420 of index y connects to a second set of 1:2 fan-out units 5724. Each 1:2 fan-out unit connects to temporal multiplexer 5726 and an input buffer 5728 of an input port 5731. The temporal multiplexer 5726 cyclically connects output data from the 1:2 fan-out units 5724 to distributor controller 5740 during designated control time slots within each monitoring period 5220.

Each upstream channel 5110 or 5112 carries an optical signal from a respective access node 120 modulated with upstream data organized into periodic monitoring periods 5220 as illustrated in FIG. 52. Each monitoring period 5220 is organized into content time slots 5240 and at least one control time slot 5230. The data of a control segment 5230 may include: time indication at originating access node, flow-rate-allocation requests to specified destination access nodes, and messages from an originating access node to other access nodes. The data of a content segment includes content data (payload data) in addition to an indication of a cyclic segment identifier (0 to (p−1)) within a monitoring period 5220.

A set 5190 of downstream channels directed to the access nodes of the first access group connects to a first set of electrical-to-optical converters 5785. A set 5192 of downstream channels directed to the access nodes of the second access group connects to a second set of electrical-to-optical converters 5785. Each electrical-to-optical converter 5785 receives output of a 2:1 temporal multiplexer 5780. Each 2:1 temporal multiplexer receives content data from an output port 5732 and control data from distributor controller 5740 through temporal demultiplexer 5770.

The distributor controller 5740 examines a portion of the output signal of temporal multiplexer 5726 during each reference time slot of the monitoring period to detect an index of a segment, which may be a control segment or a content segment, and a displacement of the start time of the segment from the start time of a corresponding reference time slot as described above with reference to FIG. 54. For a reference time slot of index x, 0≤x<p, a detected index y, 0≤y<p, and a displacement ε, the temporal discrepancy of a received signal directed to an input port 5731 of index x is determined as: $\theta_j = (y - x - \varepsilon)$.

If the magnitude of θj exceeds the predefined permissible value (a small fraction of time-slot duration T), an access node originating the signal is instructed to adjust transmission time; adding a delay of: $\theta_j$, if $\theta_j > 0.0$; or $(p \times T + \theta_j)$, otherwise.

Figure 58:
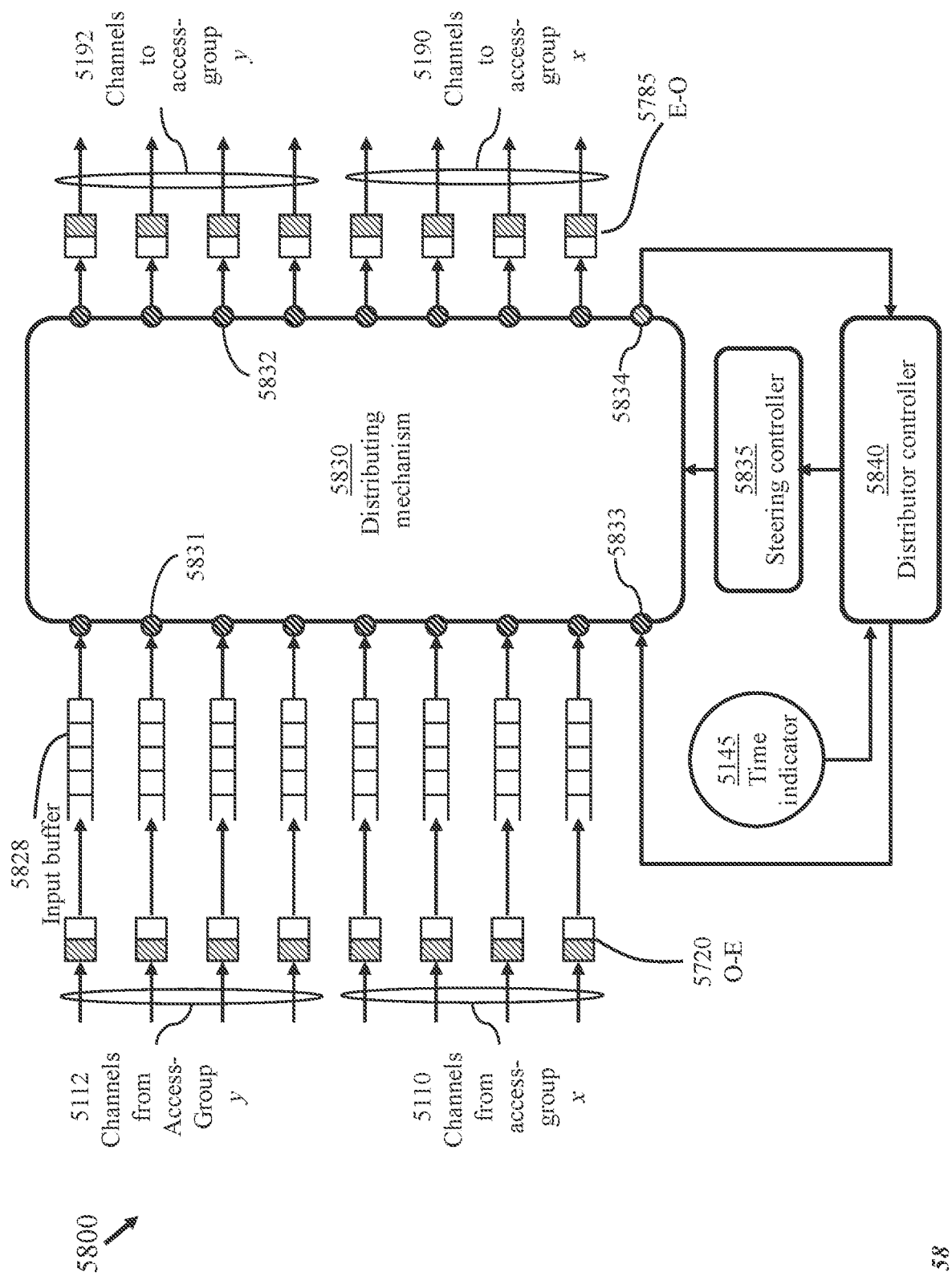
FIG. 58 illustrates a second configuration of an electronic distributor, in accordance with an embodiment of the present invention.

FIG. 58 illustrates a second configuration 5800 of an electronic distributor comprising an electronic distributing mechanism 5830, a set of input ports 5831 connecting to upstream channels 5110 and 5112, a set of output ports 5832 connecting to downstream channels 5190 and 5192, an input port 5833 connecting to output of distributor controller 5840, an output port 5834 connecting to input of distributor controller 5840, a steering controller 5835, and a distributor controller 5840. As in configurations 5700, a local time indicator 5145 is used for temporal alignment of upstream signals.

The steering controller 5835 directs data from input ports 5831 to output ports 5832 according to instructions from the distributor controller 5840. Additionally, steering controller 5835 cyclically directs upstream control signals from input ports 5831 to output port 5834, which connects to distributor controller 5840, and cyclically directs downstream control signals from input port 5833, which connects to distributor controller 5840, to output ports 5832. Thus, rather than using temporal multiplexer 5726 and temporal demultiplexer 5770 of the configuration of FIG. 57, the upstream control signals are communicated from input ports 5831 to the distributor controller 5840 and the downstream control signals are communicated from the distributor controller 5840 to the output ports 5532 through the distributing mechanism 5830.

Each of distributor controllers 5740 and 5840 comprises a respective set of hardware processors and memory devices storing software instructions causing the respective set of processors to perform control functions including scheduling paths establishment, through a respective distributing mechanism, and exchanging control messages with access nodes connecting to the respective distributing mechanism.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A contiguous network comprising:
    a plurality of access nodes arranged into a plurality of access groups, each access group comprising a respective set of access nodes, said plurality of access groups arranged into a plurality of access bands, each access band comprising a predetermined number of access groups;
    and
    a plurality of distributors arranged into a plurality of constellations comprising:
        an intra-band constellation for said each access band of said plurality of access bands configured to interconnect each pair of access groups of said each access band through a respective distributor; and
        an inter-band constellation for each pair of access bands of said plurality of access bands configured to interconnect each pair of access groups of different access bands through a respective distributor;
    wherein each access node of said each access group connects directly to each constellation that is configured to connect to said each access group through a respective dual multichannel link each channel of which connecting to a respective distributor;
thereby, each access node of each access group has multiple paths, each traversing a single distributor, to each access node of said each access group and a path traversing a single distributor to each access node of each other access group.

2. The contiguous network of claim 1 wherein said respective set of access nodes comprises a number of access nodes not exceeding a target upper bound m, m>1, and each distributor of said plurality of distributors is configured to scale to interconnect at least 2×m access nodes.

3. The contiguous network of claim 1 wherein said predetermined number of access groups, denoted $\Omega$, is determined as $\Omega \geq \lceil \mu/\Pi \rceil$, $\Pi$ being a specified number of access bands of said plurality of access bands, $\Pi>1$, $\mu$ being a target number of access groups of the plurality of access groups, $\mu \geq (2 \times \Pi)$.

4. The contiguous network of claim 1 wherein:
    said plurality of constellations comprises:
        $\Pi$ intra-band constellations, denoted $Q(\alpha, \alpha)$, $0 \leq \alpha < \Pi$; and
        $(\Pi \times (\Pi-1))/2$ inter-band constellations denoted $Q(\alpha, \beta)$, $0 \leq \alpha < (\Pi-1)$, $\alpha < \beta < \Pi$, $\alpha$ and $\beta$ being indices of access bands, the access bands being indexed sequentially as 0 to $(\Pi-1)$, $\Pi$ being a specified number of access bands of said plurality of access bands, $\Pi>1$,
    each access node belonging to access-band $\gamma$, $0 \leq \gamma < \Pi$, has a dual multichannel link to intra-band constellation $Q(\gamma, \gamma)$ and a dual multichannel link to each of inter-band constellations $Q(j,\gamma)$, $0 \leq j < \gamma$, for $\gamma > 0$, $Q(\gamma,k)$, $\gamma < k < \Pi$, for $\gamma < (\Pi-1)$.

5. The contiguous network of claim 1 wherein each distributor of said plurality of distributors comprises:
    a distributing mechanism; and
    a distributor controller employing a hardware processor configured to:
        schedule paths through the distributing mechanism; and
        exchange control data with all subtending access nodes coupled to the distributing mechanism.

6. The contiguous network of claim 5 wherein said distributor controller is coupled to a collocated distributor-time indicator and is configured to:
    communicate downstream time indications determined according to the collocated distributor-time indicator to a selected access node connecting to the distributing mechanism;
    receive upstream time indications from said selected access node determined according to an access-time indicator collocated with said selected access node; and
    instruct said selected access node to adjust timing of upstream data transmission based on discrepancy between the downstream time indications and the upstream time indications.

7. The contiguous network of claim 1 wherein said plurality of access groups comprises at least one vacant access group reserved for future network expansion; thereby, at least one access band comprises less than said predetermined number of access groups.

8. The contiguous network of claim 7 wherein:
    each dual multichannel link to a specific intra-band constellation carries a number of spectral channels equal to a number of present access groups of the specific intra-band constellation minus one; and
    each dual multichannel link from an access node belonging to either of two access bands connecting to a specific inter-band constellation carries a number of spectral channels equal to a number of present access groups of the other access band.

9. A contiguous network comprising:
    a plurality of access groups, each access group comprising a respective set of access nodes of a plurality of access nodes, said plurality of access groups arranged into a first number $\Pi$ of access bands, each access band comprising a second number $\Omega$ of access groups, $\Pi>1$, $\Omega>1$;
    and
    a plurality of distributors arranged into a number of intra-band constellations and a number of inter-band constellations;

wherein:
  each pair of access groups within said each access band connects to a respective distributor of an intra-band constellation corresponding to said each access band;
  each pair of access groups belonging to different access bands of each pair of access bands connects to a respective distributor of an inter-band constellation corresponding to said each pair of access bands; and
  each access node has a multichannel link of $(\Omega-1)$ dual channels to a respective intra-band constellation and a multichannel links of $\Omega$ dual channels to each of respective $(\Pi-1)$ inter-band constellations.

10. A contiguous network comprising:
  a plurality of access nodes arranged into a plurality of access groups clustered into access bands, each access group comprising a respective number of access nodes and each access band comprising a predetermined number of access groups; and
  a plurality of distributors, each distributor connecting to all access nodes of a respective pair of access groups of the plurality of access groups through spectral channels;
  said plurality of distributors clustered into constellations such that:
    all distributors connecting to access groups of said each access band are collocated to form an intra-band constellation corresponding to said each access band;
    all distributors connecting to access groups of each pair of access bands are collocated to form an inter-band constellation corresponding to said each pair of access bands; and
    each access node of said each access group has a direct dual multichannel link to each constellation formed to contain at least one distributor connecting to said each access group;
  thereby, each access node of each access group has multiple paths, each traversing a single distributor, to each access node of said each access group and a path traversing a single distributor to each access node of each other access group.

* * * * *